(12) United States Patent
Yamana et al.

(10) Patent No.: US 10,431,260 B2
(45) Date of Patent: Oct. 1, 2019

(54) INFORMATION PROCESSING APPARATUS, INFORMATION PROCESSING SYSTEM, AND INFORMATION PROCESSING METHOD

(71) Applicants: Hajime Yamana, Kanagawa (JP); Keiji Ohmura, Kanagawa (JP)

(72) Inventors: Hajime Yamana, Kanagawa (JP); Keiji Ohmura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/948,987

(22) Filed: Apr. 9, 2018

(65) Prior Publication Data

US 2018/0301171 A1  Oct. 18, 2018

(30) Foreign Application Priority Data

Apr. 13, 2017  (JP) ................. 2017-080046

(51) Int. Cl.
```
G11B 27/34      (2006.01)
G06T 11/60      (2006.01)
G06T 11/20      (2006.01)
G06Q 10/06      (2012.01)
```
(52) U.S. Cl.
CPC ......... G11B 27/34 (2013.01); G06Q 10/0631 (2013.01); G06T 11/206 (2013.01); G06T 11/60 (2013.01)

(58) Field of Classification Search
CPC ...... G11B 27/34; G06Q 10/0631; G06T 11/60
See application file for complete search history.

(56) References Cited

U.S. PATENT DOCUMENTS

| | | | |
|---|---|---|---|
| 7,664,780 B1* | 2/2010 | Beachy | G06Q 10/06 |
| | | | 707/600 |
| 2017/0228899 A1* | 8/2017 | Witriol | G06T 11/001 |

FOREIGN PATENT DOCUMENTS

| | | |
|---|---|---|
| JP | 2015-108904 | 6/2015 |
| JP | 2016-018571 | 2/2016 |

OTHER PUBLICATIONS

European Search Report; Application No. 18166263.6; dated Jun. 21, 2018.
Ingo Weber et al., Discovering and Visualizing Operation Processes with POD-Discovery and POD-Viz; 2015 45th IEEE/IFIP International Conference on dependable Systems and Networks.

* cited by examiner

*Primary Examiner* — Thai Q Tran
*Assistant Examiner* — Jose M Mesa
(74) *Attorney, Agent, or Firm* — Duft & Bornsen, PC

(57) ABSTRACT

An information processing apparatus includes circuitry configured to acquire time data relating to a state of an object in each process of an operation performed on the object, the operation including at least one process; calculate an achievement value indicating a state of each process, based on the time data acquired; compare the achievement value calculated with a reference value; and generate a chart that visually represents a result of comparison for each process. The visual representation of the result of comparison is different according to the result of comparison.

17 Claims, 55 Drawing Sheets

| PROCESS 1 | |
|---|---|
| WORK No. | DATE |
| 161213094326000001 | 2016/12/13 9:43:26 |
| 161213094326000002 | 2016/12/13 9:44:06 |
| 161213094326000003 | 2016/12/13 9:44:46 |
| 161213094326000004 | 2016/12/13 9:45:26 |
| 161213094326000005 | 2016/12/13 9:46:06 |
| 161213094326000006 | 2016/12/13 9:46:46 |
| 161213094326000007 | 2016/12/13 9:47:26 |
| 161213094326000008 | 2016/12/13 9:48:06 |
| 161213094326000009 | 2016/12/13 9:48:46 |
| 161213094326000010 | 2016/12/13 9:49:26 |
| ... | ... |

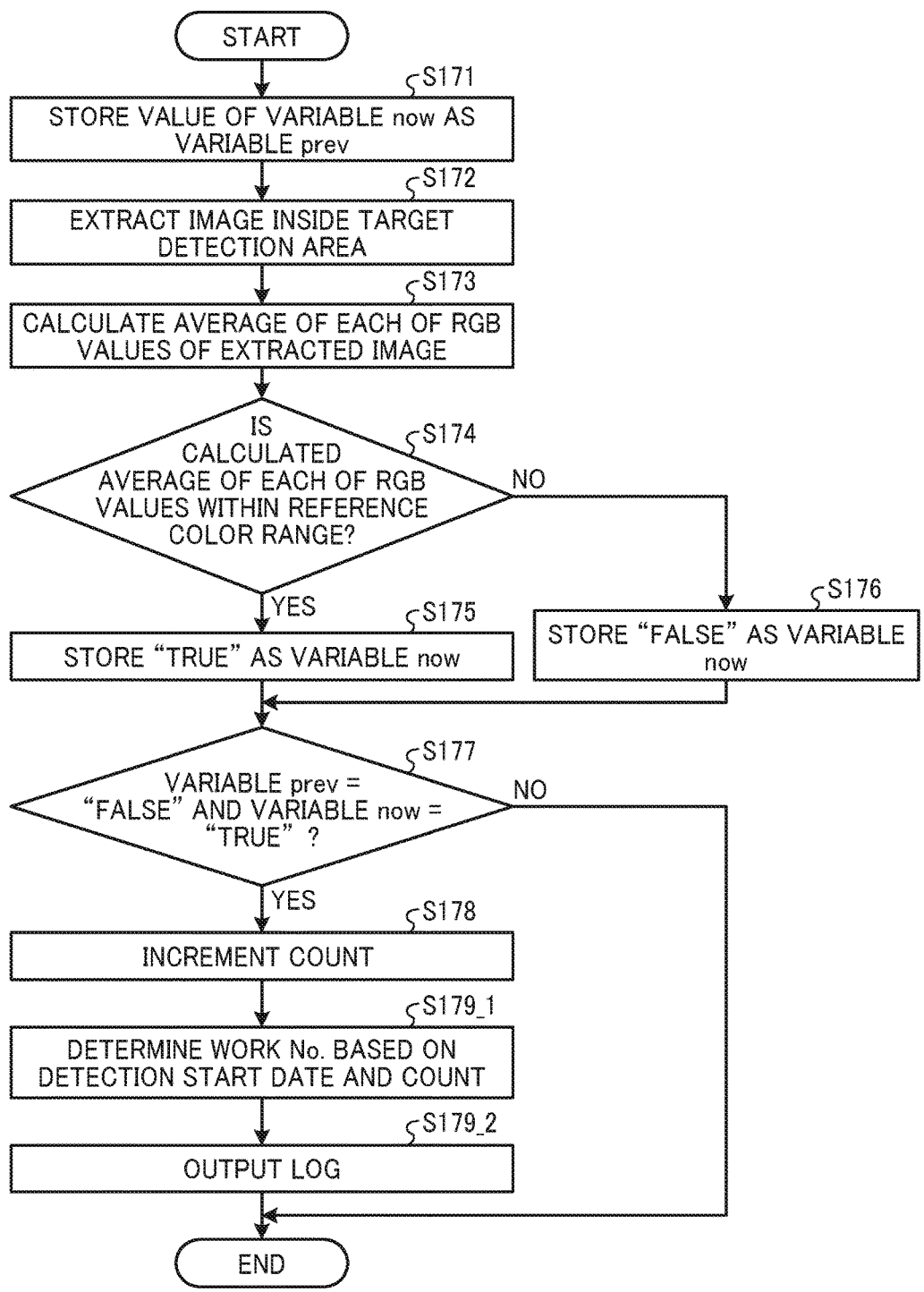

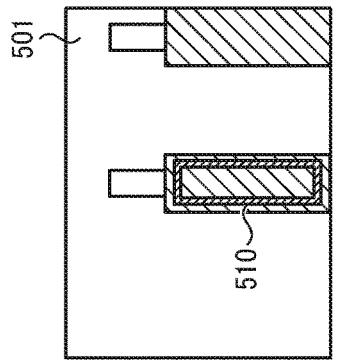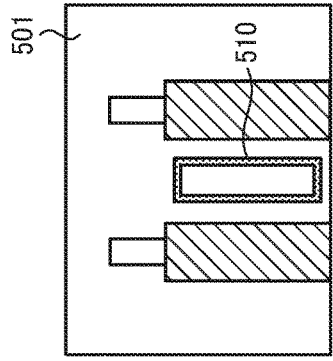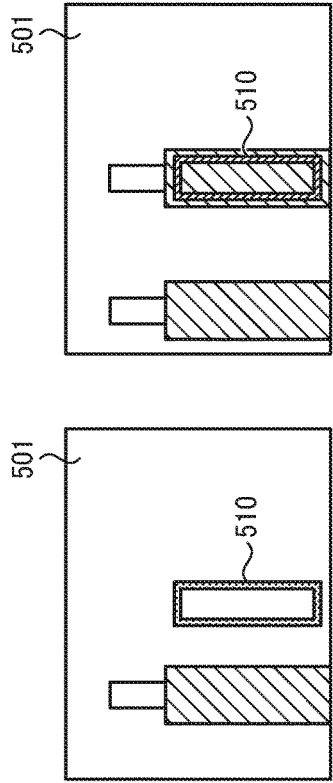

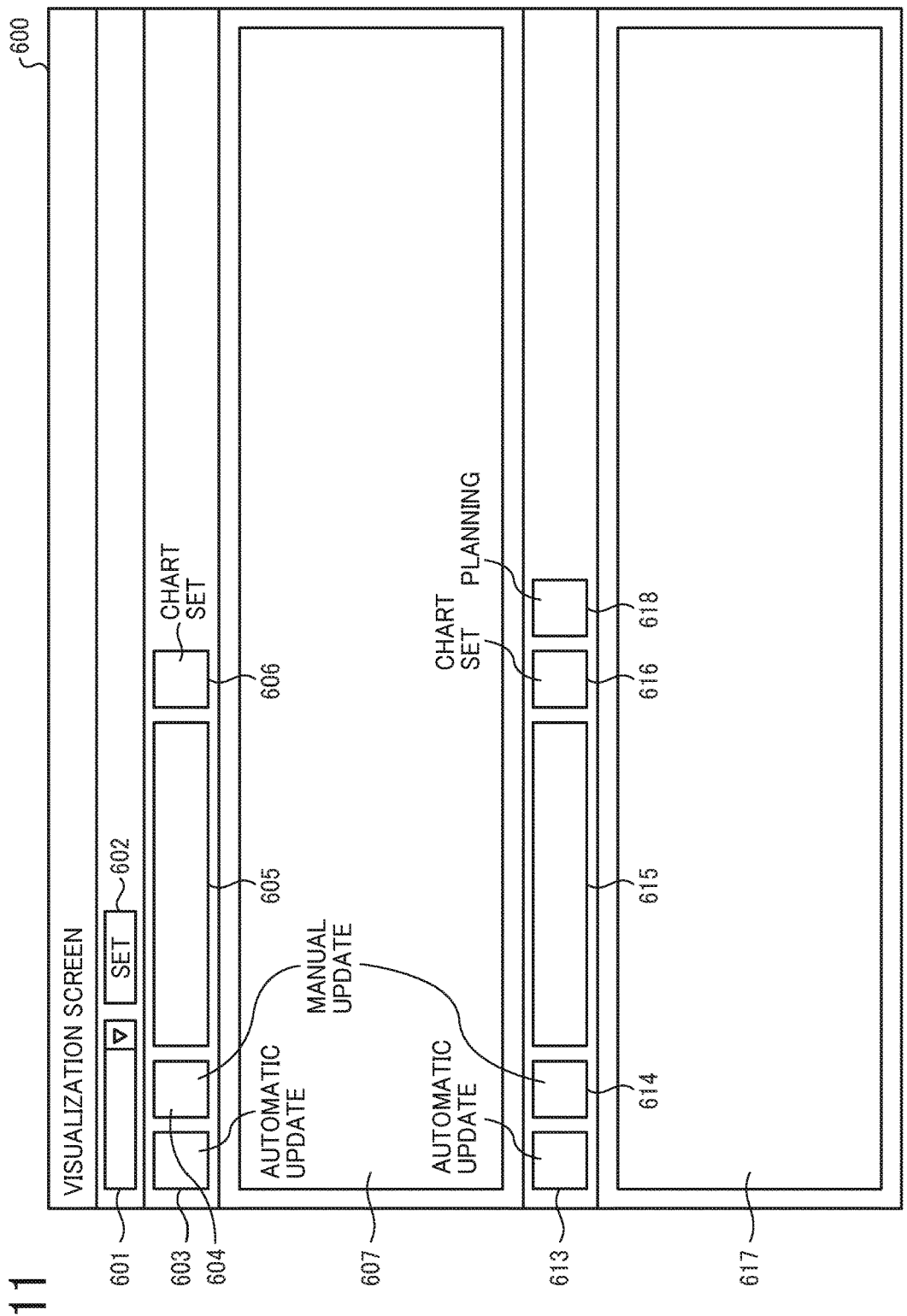

FIG. 13

```
[Line]
LineName=LINE 1                      ···TARGET LINE NAME
LogDirectory=C:¥ProcessLog¥Line1     ···LOG STORAGE LOCATION
MovieDirectory=C:¥MovieLog¥Line1     ···VIDEO STORAGE LOCATION
[Pr1]
PrName=PROCESS 1                     ···PROCESS NAME
DataCamNo=1                          ···DATA COLLECTING CAMERA No.
WindowNo=1                           ···DETECTION AREA No.
ViewCamNo=3                          ···VIEW CAMERA No.
[Pr2]
PrName=PROCESS 2                     ···PROCESS NAME
DataCamNo=2                          ···DATA COLLECTING CAMERA No.
WindowNo=1                           ···DETECTION AREA No.
ViewCamNo=4                          ···VIEW CAMERA No.
     ⋮
```
710

FIG. 14

☐ SPECIFY PERIOD
2017/1/1 0:00 − 2017/1/1 12:00

| PROCESS 1 | PROCESS 2 | ... |
|---|---|---|
| 2017/2/23 3:02 | 2017/2/23 3:08 | ... |
| 2017/2/23 3:06 | 2017/2/23 3:11 | ... |
| 2017/2/23 3:09 | 2017/2/23 3:13 | ... |
| 2017/2/23 3:14 | 2017/2/23 3:22 | ... |
| 2017/2/23 3:25 | 2017/2/23 3:30 | ... |
| 2017/2/23 3:28 | 2017/2/23 3:32 | ... |
| 2017/2/23 3:31 | 2017/2/23 3:35 | ... |
| 2017/2/23 3:34 | 2017/2/23 3:38 | ... |
| 2017/2/23 3:36 | 2017/2/23 3:41 | ... |
| 2017/2/23 3:40 | 2017/2/23 3:44 | ... |
| ... | ... | ... |

| | 3 | 4 | 5 | 6 | 7 | 8 | (TIME) |
|---|---|---|---|---|---|---|---|
| PROCESS 1 | 93 | 57 | 88 | 96 | 89 | 41 | |
| PROCESS 2 | 88 | 60 | 78 | 97 | 84 | 46 | |
| PROCESS 3 | 87 | 94 | 53 | 96 | 91 | 58 | |
| PROCESS 4 | 85 | 85 | 61 | 96 | 86 | 61 | |
| PROCESS 5 | 84 | 85 | 61 | 97 | 82 | 61 | |
| PROCESS 6 | 84 | 85 | 61 | 96 | 82 | 61 | |
| PROCESS 7 | 82 | 87 | 60 | 96 | 80 | 60 | |
| PROCESS 8 | 85 | 86 | 80 | 96 | 82 | 60 | |
| PROCESS 9 | 88 | 89 | 80 | 95 | 83 | 60 | |
| PROCESS 10 | 89 | 88 | 79 | 96 | 83 | 60 | |

| DATE | REQUIRED TIME (S) |
|---|---|
| 2017/2/23 3:02 | 241 |
| 2017/2/23 3:06 | 181 |
| 2017/2/23 3:09 | 301 |
| 2017/2/23 3:14 | 661 |
| 2017/2/23 3:25 | 181 |
| 2017/2/23 3:28 | 181 |
| 2017/2/23 3:31 | 181 |
| 2017/2/23 3:34 | 121 |
| 2017/2/23 3:36 | 241 |
| ... | ... |

FIG. 24

| PROCESS | IDEAL PRODUCTION |
|---|---|
| PROCESS 1 | 96 |
| PROCESS 2 | 97 |
| PROCESS 3 | 97 |
| PROCESS 4 | 96 |
| PROCESS 5 | 97 |
| PROCESS 6 | 96 |
| PROCESS 7 | 96 |
| PROCESS 8 | 96 |
| PROCESS 9 | 95 |
| PROCESS 10 | 96 |

FIG. 25

| | 3 | 4 | 5 | 6 | 7 | 8 | (TIME) |
|---|---|---|---|---|---|---|---|
| PROCESS 1 | 93 | 57 | 88 | 96 | 89 | 41 | |
| PROCESS 2 | 88 | 60 | 78 | 97 | 84 | 46 | |
| PROCESS 3 | 87 | 94 | 53 | 96 | 91 | 58 | |
| PROCESS 4 | 85 | 85 | 61 | 96 | 86 | 61 | |
| PROCESS 5 | 84 | 85 | 61 | 97 | 82 | 61 | |
| PROCESS 6 | 84 | 85 | 61 | 96 | 82 | 61 | |
| PROCESS 7 | 82 | 87 | 60 | 96 | 80 | 60 | |
| PROCESS 8 | 85 | 86 | 80 | 96 | 82 | 60 | |
| PROCESS 9 | 88 | 89 | 80 | 95 | 83 | 60 | |
| PROCESS 10 | 89 | 88 | 79 | 96 | 83 | 60 | |

FIG. 26

|  | 3 | 4 | 5 | 6 | 7 | 8 | (TIME) |
|---|---|---|---|---|---|---|---|
| PROCESS 1 | 93 | 57 | 88 | 96 | 89 | 41 | |
| PROCESS 2 | 88 | 60 | 78 | 97 | 84 | 46 | |
| PROCESS 3 | 87 | 94 | 53 | 96 | 91 | 58 | |
| PROCESS 4 | 85 | 85 | 61 | 96 | 86 | 61 | |
| PROCESS 5 | 84 | 85 | 61 | 97 | 82 | 61 | |
| PROCESS 6 | 84 | 85 | 61 | 96 | 82 | 61 | |
| PROCESS 7 | 82 | 87 | 60 | 96 | 80 | 60 | |
| PROCESS 8 | 85 | 86 | 80 | 96 | 82 | 60 | |
| PROCESS 9 | 88 | 89 | 80 | 95 | 83 | 60 | |
| PROCESS 10 | 89 | 88 | 79 | 96 | 83 | 60 | |

| | SETTING VALUE |
|---|---|
| PROCESS 1 | 95 |
| PROCESS 2 | 94 |
| PROCESS 3 | 91 |
| PROCESS 4 | 85 |
| PROCESS 5 | 105 |
| PROCESS 6 | 70 |
| PROCESS 7 | 60 |
| PROCESS 8 | 75 |
| PROCESS 9 | 92 |
| PROCESS 10 | 102 |

| | FIG. 29A |
|---|---|
| FIG. 29 | FIG. 29B |

741

| | IDEAL PRODUCTION |
|---|---|
| PROCESS 1 | 96 |
| PROCESS 2 | 97 |
| PROCESS 3 | 97 |
| PROCESS 4 | 96 |
| PROCESS 5 | 97 |
| PROCESS 6 | 96 |
| PROCESS 7 | 96 |
| PROCESS 8 | 96 |
| PROCESS 9 | 95 |
| PROCESS 10 | 96 |

730

| | 3 | 4 | 5 | 6 | 7 | 8 (TIME) |
|---|---|---|---|---|---|---|
| PROCESS 1 | 93 | 57 | 88 | 96 | 89 | 41 |
| PROCESS 2 | 88 | 60 | 78 | 97 | 84 | 46 |
| PROCESS 3 | 87 | 94 | 53 | 96 | 91 | 58 |
| PROCESS 4 | 85 | 85 | 61 | 96 | 86 | 61 |
| PROCESS 5 | 84 | 85 | 61 | 97 | 82 | 61 |
| PROCESS 6 | 84 | 85 | 61 | 96 | 82 | 61 |
| PROCESS 7 | 82 | 87 | 60 | 96 | 80 | 60 |
| PROCESS 8 | 85 | 86 | 80 | 96 | 82 | 60 |
| PROCESS 9 | 88 | 89 | 80 | 95 | 83 | 60 |
| PROCESS 10 | 89 | 88 | 79 | 96 | 83 | 60 |

CALCULATE DIFFERENCE

| | 3 | 4 | 5 | 6 | 7 | 8 (TIME) |
|---|---|---|---|---|---|---|
| PROCESS 1 | 3 | 39 | 8 | 0 | 7 | 55 |
| PROCESS 2 | 9 | 37 | 19 | 0 | 13 | 51 |
| PROCESS 3 | 10 | 3 | 44 | 1 | 6 | 39 |
| PROCESS 4 | 11 | 11 | 35 | 0 | 10 | 35 |
| PROCESS 5 | 13 | 12 | 36 | 0 | 15 | 36 |
| PROCESS 6 | 12 | 11 | 35 | 0 | 14 | 35 |
| PROCESS 7 | 14 | 9 | 36 | 0 | 16 | 36 |
| PROCESS 8 | 11 | 10 | 16 | 0 | 14 | 36 |
| PROCESS 9 | 7 | 6 | 15 | 0 | 12 | 35 |
| PROCESS 10 | 7 | 8 | 17 | 0 | 13 | 36 |

752

| DIFFERENCE | COLOR |
|---|---|
| 0–10 | |
| 11–20 | |
| 21–30 | |
| 31–40 | |
| 41– | |

FIG. 32

| | 2/23 | 2/24 | 2/25 | 2/26 | 2/27 | 2/28 | (DAY) |
|---|---|---|---|---|---|---|---|
| PROCESS 1 | | | | | | | |
| PROCESS 2 | | | | | | | |
| PROCESS 3 | | | | | | | |
| PROCESS 4 | | | | | | | |
| PROCESS 5 | | | | | | | |
| PROCESS 6 | | | | | | | |
| PROCESS 7 | | | | | | | |
| PROCESS 8 | | | | | | | |
| PROCESS 9 | | | | | | | |
| PROCESS 10 | | | | | | | |

| DATE | REQUIRED TIME (S) |
|---|---|
| 2017/2/23 2:50 | 241 |
| 2017/2/23 2:54 | 181 |
| 2017/2/23 2:57 | 121 |
| 2017/2/23 2:59 | 181 |
| 2017/2/23 3:02 | 241 |
| 2017/2/23 3:06 | 181 |
| 2017/2/23 3:09 | 301 |
| 2017/2/23 3:14 | 661 |
| 2017/2/23 3:25 | 181 |
| 2017/2/23 3:28 | 181 |
| 2017/2/23 3:31 | 181 |
| 2017/2/23 3:34 | 121 |
| 2017/2/23 3:36 | 241 |
| ... | ... |

WITHIN SELECTED UNIT TIME (bracket covering rows from 2017/2/23 3:02 to 2017/2/23 3:36)

743

| DATE | REQUIRED TIME (S) |
|---|---|
| 2017/2/23 3:02 | 241 |
| 2017/2/23 3:06 | 181 |
| 2017/2/23 3:09 | 301 |
| 2017/2/23 3:14 | 661 |
| 2017/2/23 3:25 | 181 |
| 2017/2/23 3:28 | 181 |
| 2017/2/23 3:31 | 181 |
| 2017/2/23 3:34 | 121 |
| 2017/2/23 3:36 | 241 |

REQUIRED TIME IS MAXIMUM (pointing to 2017/2/23 3:14, 661)

FIG. 38

| 721 |
|---|
| PROCESS 1 |
| 2017/2/23 3:02 |
| 2017/2/23 3:06 |
| 2017/2/23 3:09 |
| 2017/2/23 3:14 |
| 2017/2/23 3:25 |
| 2017/2/23 3:28 |
| 2017/2/23 3:31 |
| 2017/2/23 3:34 |
| 2017/2/23 3:36 |
| 2017/2/23 3:40 |
| ... |

| TIME | PRODUCTION | CUMULATIVE PRODUCTION |
|---|---|---|
| 3 | 93 | 93 |
| 4 | 57 | 150 |
| 5 | 88 | 238 |
| 6 | 96 | 334 |
| 7 | 89 | 423 |
| 8 | 10 | 433 |
| 9 | | |
| 10 | | |
| 11 | | |

UNIT TIME (rows 3–4); table id 780

| TIME | PRODUCTION | CUMULATIVE PRODUCTION | PREDICTED PRODUCTION | PREDICTED CUMULATIVE PRODUCTION |
|---|---|---|---|---|
| 3 | 93 | 93 | | |
| 4 | 57 | 150 | | |
| 5 | 88 | 238 | | |
| 6 | 96 | 334 | | |
| 7 | 89 | 423 | | |
| 8 | 10 | 433 | 84 | 507 |
| 9 | | | 84 | 591 |
| 10 | | | 84 | 675 |
| 11 | | | 84 | 759 |

ASSIGN PREDICTED PRODUCTION

UPDATED LATEST PRODUCTION

FIG. 57

| | CART No | | | | | |
|---|---|---|---|---|---|---|
| | 000001 | 000002 | 000003 | 000004 | 000005 | 000006 |
| AREA 1 | | | | | | |
| AREA 2 | | | | | | |
| AREA 3 | | | | | | |
| AREA 4 | | | | | | |
| AREA 5 | | | | | | |
| AREA 6 | | | | | | |
| AREA 7 | | | | | | |
| AREA 8 | | | | | | |
| AREA 9 | | | | | | |
| AREA 10 | | | | | | |

| | X-COORDINATE | | | | | | | | | |
|---|---|---|---|---|---|---|---|---|---|---|
| | 0 | 1 | 2 | 3 | 4 | 5 | 6 | 7 | 8 | 9 |
| 0 | | | | | | | | | | |
| 1 | | | | | | | | | | |
| 2 | | | | | | | | | | |
| 3 | | | | | | | | | | |
| 4 | | | | | | | | | | |
| 5 | | | | | | | | | | |
| 6 | | | | | | | | | | |
| 7 | | | | | | | | | | |
| 8 | | | | | | | | | | |
| 9 | | | | | | | | | | |

~764

INFORMATION PROCESSING APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2017-080046, filed on Apr. 13, 2017, in the Japan Patent Office, the entire disclosure of which is hereby incorporated by reference herein.

BACKGROUND

Technical Field

The present disclosure relates to an information processing apparatus, an information processing system, and an information processing method.

Description of the Related Art

For a production site equipped with production facilities, there has been developed technologies to collect data indicating a state of production and visualize the data, for example, as a graph.

For example, to visualize a state of a production line to sequentially perform a plurality of processes, there is a technology to collect logs from a programmable logic controller (PLC) or the like of the facilities and displays the production state as a graph.

SUMMARY

According to an embodiment of this disclosure, an information processing apparatus includes circuitry configured to acquire time data relating to a state of an object in each process of an operation including at least one process, performed on the object; calculate an achievement value indicating a state of each process, based on the time data acquired; compare the achievement value of each process with a reference value; and generate a chart that visually represents a result of comparison for each process. The visual representation of the result of comparison is different according to the result of comparison.

Another embodiment provides a method of processing information. The method includes acquiring time data relating to a state of an object in each process of an operation including at least one process; calculating an achievement value indicating a state of each process, based on the time data acquired; and comparing the achievement value of each process with a reference value; and generating a chart that visually represents a result of comparison for each process. The visual representation of the result of comparison is different according to the result of comparison.

Yet another embodiment provides a non-transitory recording medium storing a plurality of program codes which, when executed by one or more processors, cause the processors to perform the method described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 illustrates an example of a production log;

FIG. 9 is a flowchart of example area processing of the object detection processing illustrated in FIG. 8;

FIGS. 10A to 10D illustrate an example of log output operation;

FIG. 11 illustrates an example layout of an application screen (a visualization screen) of the visualization software executed by the information processing apparatus, according to an embodiment;

FIG. 13 illustrates an example association file;

FIG. 14 illustrates a period field of the visualization screen illustrated in FIG. 11;

FIG. 19 illustrates an example log table generated in the log acquisition illustrated in FIG. 18;

FIG. 21 illustrates an example achievement table;

FIG. 23 illustrates an example required time table;

FIG. 24 illustrates an example ideal production table;

FIG. 25 is a table for identifying a maximum production in each process from the achievement table illustrated in FIG. 21;

FIG. 26 is a table for identifying a maximum of respective productions of unit times among processes in the achievement table;

FIG. 27 illustrates an example ideal production table;

FIGS. 29A and 29B are diagrams for actions in drawing a heat map in the chart drawing;

FIG. 32 is an example heat map in which the range is changed;

FIG. 34 is a diagram for explaining an action of extracting an extracted table from the required time table;

FIG. 38 illustrates an example log table generated in the specified process log acquisition;

FIG. 57 illustrates another example heat map type according to Variation 3;

FIG. 58 illustrates another example heat map type according to Variation 3;

Figure 1:
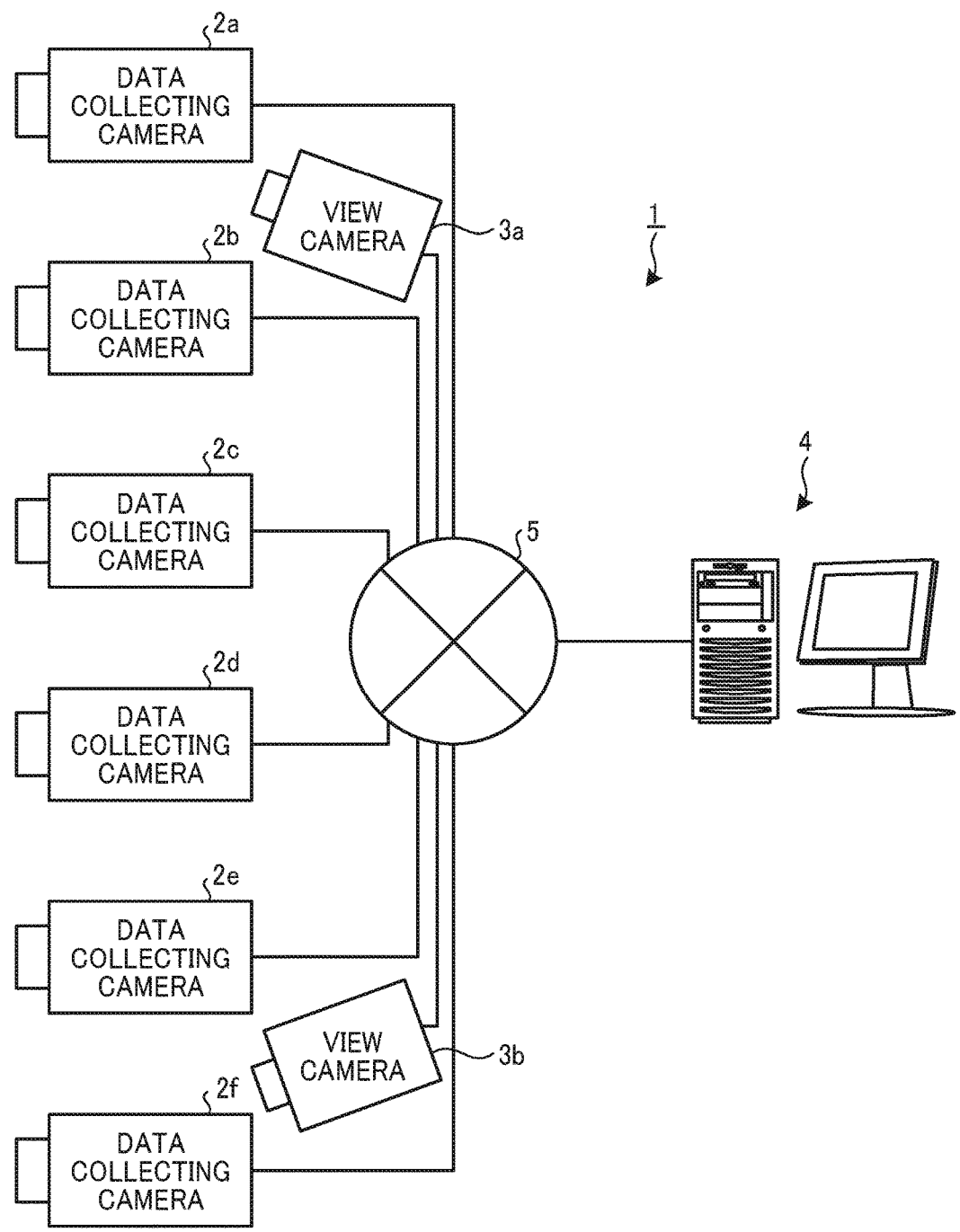
FIG. 1 is a diagram of an information processing system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, an information processing apparatus, an information processing system, an information processing method, and an information processing program according to embodiments of this disclosure are described. As used herein, the singular forms "a", "an", and "the" are intended to include the plural forms as well, unless the context clearly indicates otherwise.

FIG. 1 is a diagram of an information processing system according to an embodiment. A description is given of a general structure of an information processing system 1 according to the present embodiment with reference to FIG. 1.

An information processing system 1 illustrated in FIG. 1 includes a data collecting cameras 2a, 2b, 2c, 2d, 2e, and 2f (an example first imaging device), view cameras 3a and 3b (an example second imaging device), and an information processing apparatus 4. The data collecting cameras 2a to 2f and the view cameras 3a and 3b can transmit and receive data from the information processing apparatus 4 via a network 5.

The data collecting cameras 2a to 2f are video cameras to convert light from an object into electric signals to obtain an image of the object and generate video data that is a motion video constructed of a plurality of frames, for example, 10 frames per second (FPS). The data collecting cameras 2a to 2f serve as first imaging device to capture images of works (products or product components) introduced into the production facilities to manufacture or process the work as an operation including at least one process. The data collecting cameras 2a to 2f generate video data to generate a production log to be described later.

Note that the data collecting cameras 2a to 2f are referred to as "data collecting cameras 2) when collectively referred to, or discrimination is not necessary. Although the information processing system 1 illustrated in FIG. 1 includes six data collecting cameras 2, the number of the data collecting cameras 2 is not limited thereto.

Similar to the data collecting cameras 2, the view cameras 3a and 3b are video cameras to convert light from an object into electric signals to obtain an image of the object and generate video data that is a motion video constructed of a plurality of frames. The view cameras 3a and 3b generate video data for displaying a picture corresponding to a specific cell on a heat map described later, according to an operation made on that cell.

The view cameras 3a and 3b are referred to as "view cameras 3" when collectively referred to, or discrimination is not necessary. Although the information processing system 1 illustrated in FIG. 1 includes two view cameras 3, the number of the view cameras 3 is not limited thereto.

The information processing apparatus 4 is, for example, a computer (e.g., a personal computer or PC) or a work station to generate the production log based on the video data captured by the data collecting cameras 2 and draw a heat map or a graph based on the production log.

The network 5 is, for example, an Ethernet network (registered trademark) to enable the data communication between the information processing apparatus 4 and the data collecting cameras 2a to 2f and the view cameras 3a and 3b. In this case, the network 5 performs data communication using a protocol such as transmission control protocol/internet protocol (TCP/IP). In this case, the data collecting cameras 2a to 2f, the view cameras 3a and 3b, and the information processing apparatus 4 are assigned with media access control (MAC) addresses for communication using the TCP/IP protocol, and internet protocol (IP) address such as private IP addresses are allocated thereto.

A specific example of the type of the network 5 can be star topology in which the data collecting cameras 2a to 2f, the view cameras 3a and 3b, and the information processing apparatus 4 are connected via a local area network (LAN) to a switching hub having a plurality of ports. The network 5 is not limited to a wired network, but a portion of the network 5 can be wireless.

Although the network 5 illustrated in FIG. 1 is for TCP/IP communication, the communication is not limited thereto. For example, the information processing apparatus 4 includes video graphics array (VGA) terminals or universal serial bus (USB) ports so that the plurality of data collecting cameras 2 and the view cameras 3 are connected to the information processing apparatus 4 via VGA cables or USB cables.

Figure 2:
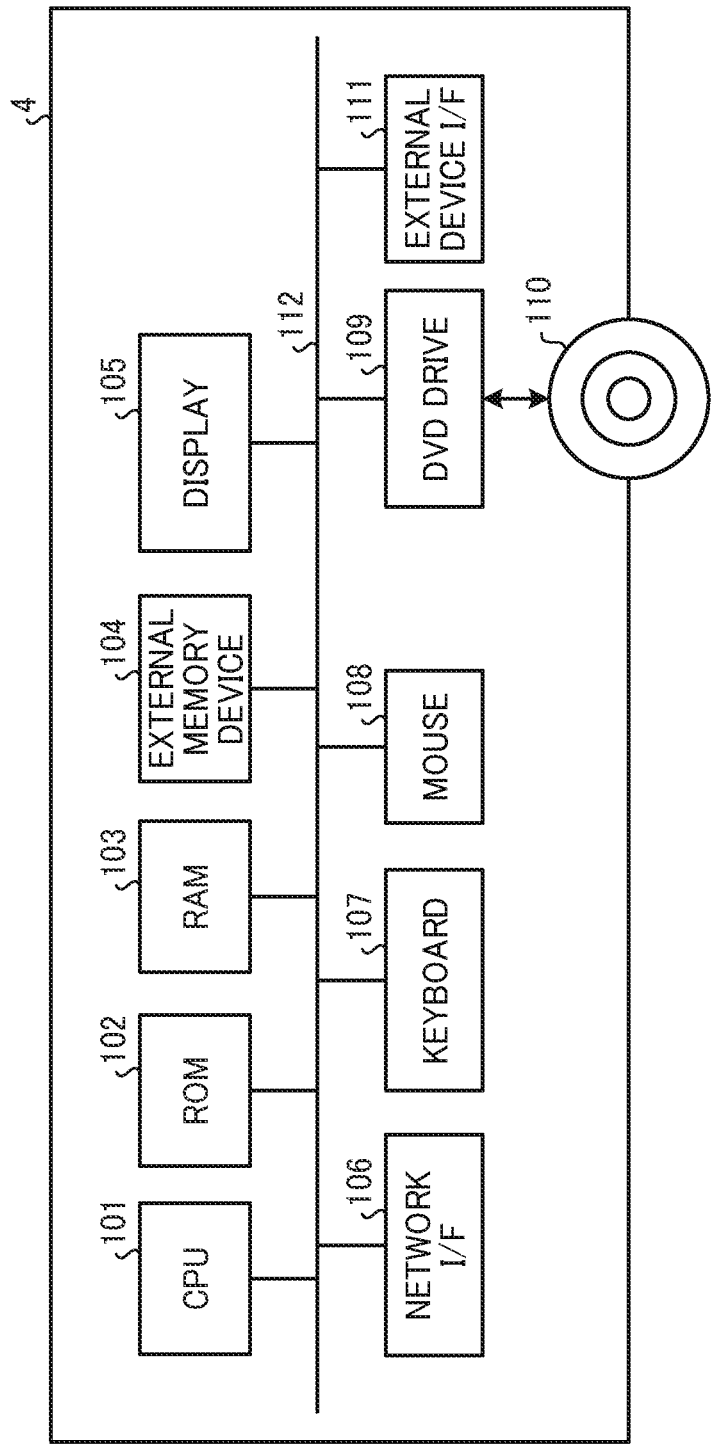
FIG. 2 is a block diagram illustrating a hardware configuration of the information processing apparatus illustrated in FIG. 1.

FIG. 2 is a block diagram illustrating a hardware configuration of the information processing apparatus 4 according to the present embodiment. A hardware configuration of the information processing apparatus 4 will be described referring to FIG. 2.

In the configuration illustrated in FIG. 2, the information processing apparatus 4 includes a central processing unit (CPU) 101, a read only memory (ROM) 102, a random access memory (RAM) 103, an external memory device 104, a display 105, a network interface (I/F) 106, a keyboard 107, a mouse 108, a digital versatile disc (DVD) drive 109, and an external device I/F 111.

The CPU 101 controls the entire operation of the information processing apparatus 4. The ROM 102 is a nonvolatile memory storing a basic input/output system (BIOS) and programs for the information processing apparatus 4. The RAM 103 is a volatile memory used as a work area for the CPU 101.

The external memory device 104 is, for example, a hard disk drive (HDD) or a solid state drive (SSD) and stores the video data captured by the view cameras 3 or the like and various types of data such as setting information.

The display 105 displays various types of information such as a cursor, a menu, a window, characters, or image; or a screen of application software to execute image determination by the information processing apparatus 4. The display 105 is, for example, a cathode ray tube (CRT) display, a liquid crystal display, or an organic electro luminescence (EL) display. The display 105 is connected to the information processing apparatus 4, for example, via a VGA cable, a high-definition multimedia interface (HDMI, registered trademark) cable, or an Ethernet cable.

The network I/F 106 is an interface for connection to the network 5 for data communication. The network I/F 106 is, for example, a network interface card (NIC) to enable communication using a TCP/IP protocol. Specifically, the information processing apparatus 4 acquires video data from the data collecting cameras 2 and the view cameras 3 via the network 5 and the network I/F 106.

The keyboard 107 is an input device for selecting characters, numerals, and various instructions; moving the cursor; and setting the setting information. The mouse 108 is an input device used for selecting commands from options or executing the commands, designating an object to be processed, moving a cursor, and setting the setting information.

The DVD drive 109 controls reading out data from, writing data in, and deleting data of a DVD-ReWritable (DVD-RW) 110, which is an example of a removably mountable memory (a recording medium).

The external device I/F 111 is an interface for connection with an external device for data communication. The external device I/F 111 is, for example, an interface card to enable communication according to fieldbus standards.

The above-described CPU 101, the ROM 102, the RAM 103, the external memory device 104, the display 105, the network I/F 106, the keyboard 107, the mouse 108, the DVD drive 109, and the external device I/F 111 are connected to each other to enable communication via a bus 112 such as an address bus or a data bus. When the display 105 is connected to an Ethernet cable, the display 105 is connected to the network I/F 106. In this case, a protocol such as TCP/IP is used for data communication.

Note that, the hardware configuration illustrated in FIG. 2 is one example. Some of the components illustrated can be omitted, or the information processing apparatus 4 can include one or more different devices.

Figure 3:
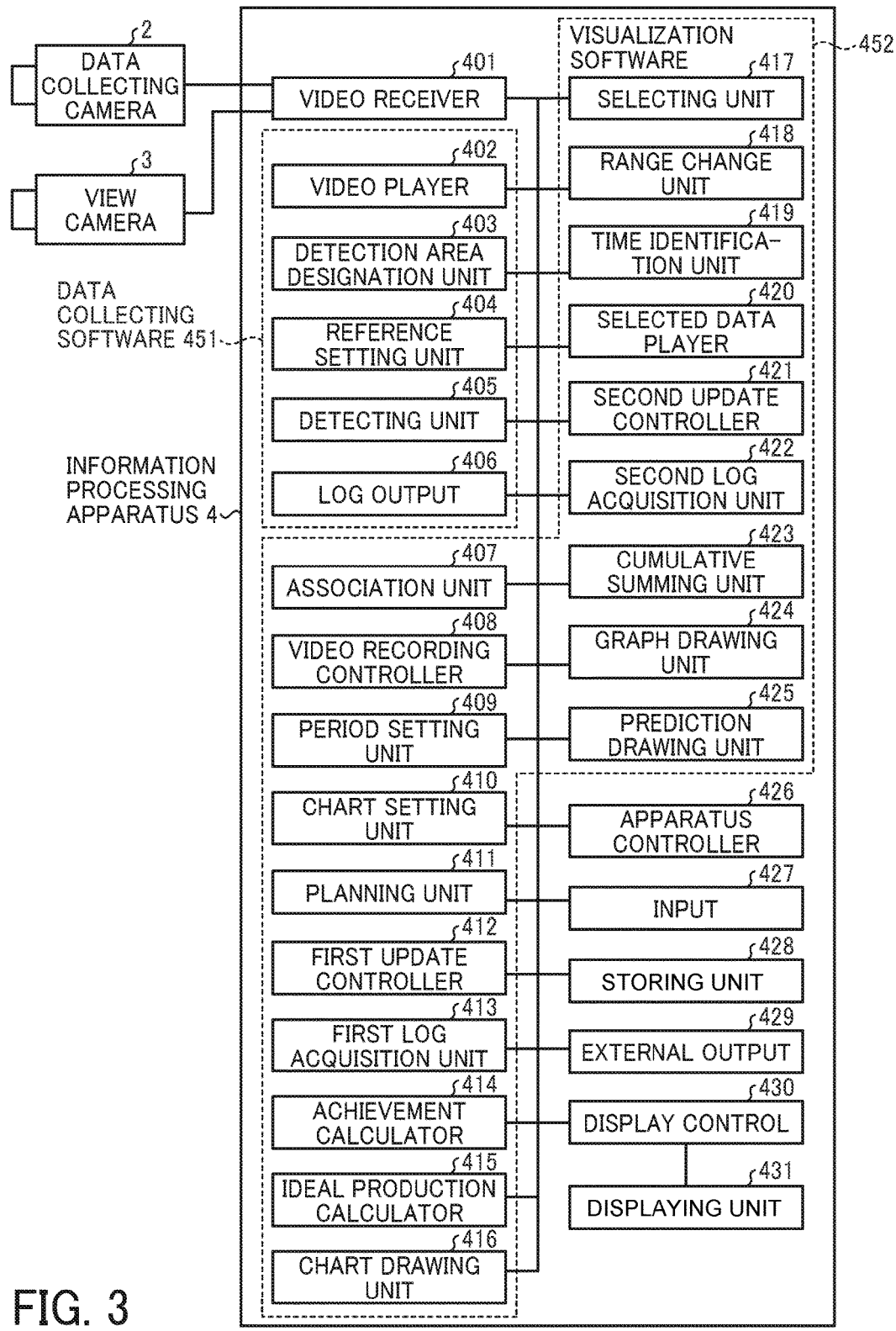
FIG. 3 is a functional block diagram of the information processing apparatus illustrated in FIG. 2.

FIG. 3 is a functional block diagram of the information processing apparatus 4 according to the present embodiment. A functional configuration of the information processing apparatus 4 will be described referring to FIG. 3.

As illustrated in FIG. 3, the information processing apparatus 4 includes a video receiver 401, a video player 402, a detection area designation unit 403 (a first setting unit), a reference setting unit 404, a detecting unit 405, a log output 406 (an output device), an association unit 407 (a third setting unit), a video recording controller 408, a period setting unit 409, a chart setting unit 410, a planning unit 411, a first update controller 412, a first log acquisition unit 413 (first acquisition unit), an achievement calculator 414 (an achievement calculator or a first calculator), an ideal production calculator 415 (an ideal value calculator or a third calculator), a chart drawing unit 416 (a first drawing unit), a selecting unit 417 (a first selecting unit or a second selecting unit), a range change unit 418, a time identification unit 419, a selected data player 420 (a first data player), a second update controller 421, a second log acquisition unit 422 (a second acquisition unit), a cumulative summing unit 423 (second calculator), a graph drawing unit 424 (a second drawing unit), a prediction drawing unit 425 (a third drawing unit), an apparatus controller 426, an input 427 (an input device), a storing unit 428, an external output 429, a display control 430, and a displaying unit 431. Note that, in FIG. 3, the network 5 is not illustrated for simplicity.

The video receiver 401 performs data communication via the network 5 with the data collecting cameras 2 and the view cameras 3 and receives video data from the data collecting cameras 2 and the view cameras 3. The video receiver 401 is implemented by the network I/F 106 illustrated in FIG. 2.

The video player 402 is a functional unit to cause the display control 430 to display in real time, on the displaying unit 431, the video data transmitted from the data collecting cameras 2 or to play back, on the displaying unit 431, the video data recorded in the storing unit 428. The video player 402 is implemented, for example, by a program (data collecting software 451) executed by the CPU 101 illustrated in FIG. 2.

The detection area designation unit 403 designates a detection area (e.g., a target area) according to an input from the input 427 operated by a user. The detection area is an example of a target area for detecting a work in a display area (a video area 501) of the video data on the displaying unit 431. The video area 501 is described later referring to FIG. 4. The detection area designation unit 403 stores, in the storing unit 428, data of the designated detection area in correlation with each data collecting camera 2. The data of the detection area include, for example, coordinates representing the position of the detection area in the display area of the video data and the shape of the detection area. The detection area designated by the detection area designation unit 403 is used in object detection to be described later. The shape of the detection area used by the detection area designation unit 403 is not restricted but can be, for example, rectangular, polygonal, circular, or oval. The detection area designation unit 403 is implemented, for example, by a program (the data collecting software 451) executed by the CPU 101 illustrated in FIG. 2.

The reference setting unit 404 sets a reference color range for detecting a work in the detection area, according to an input from the input 427 operated by the user. The reference setting unit 404 is implemented, for example, by a program (the data collecting software 451) executed by the CPU 101 illustrated in FIG. 2.

The detecting unit 405 is a functional unit for detecting the work in the detection area in the display area of the video data on the displaying unit 431. The detecting unit 405 is implemented, for example, by a program (the data collecting software 451) executed by the CPU 101 illustrated in FIG. 2.

The log output 406 outputs a log including, for example, a work number and date of detection (time data) to the production log stored in the storing unit 428, when the detecting unit 405 detects the work. The log output 406 is implemented, for example, by a program (the data collecting software 451) executed by the CPU 101 illustrated in FIG. 2.

The functional units implemented by the data collecting software 451 executed by the CPU 101 are an example of a situation grasping unit.

The association unit 407 associates a production line, a process name, the data collecting camera 2, the detection area, and the view camera 3 each other according to an input from the input 427 operated by the user. The association unit 407 stores, in the storing unit 428, association data as an association file. The association unit 407 is implemented, for example, by a program (e.g., visualization software 452) executed by the CPU 101 illustrated in FIG. 2.

The video recording controller 408 stores, in the storing unit 428, the video data of the view camera 3 specified in the association file. Note that, alternatively, the video recording controller 408 can store, in the storing unit 428, the video data captured by the data collecting camera 2 specified in the association file. The video recording controller 408 is implemented, for example, by a program (e.g., the visualization software 452) executed by the CPU 101 illustrated in FIG. 2.

The period setting unit 409 sets the duration of the log to be acquired in log acquisition and specified process log acquisition, according to an input from the input 427 operated by the user. The period setting unit 409 is implemented, for example, by a program (e.g., the visualization software 452) executed by the CPU 101 illustrated in FIG. 2.

The chart setting unit 410 sets an automatic update interval and the duration of data acquisition in heat map updating and predicted achievement updating, according to inputs from the input 427 operated by the user. The chart setting unit 410 is implemented, for example, by a program (e.g., the visualization software 452) executed by the CPU 101 illustrated in FIG. 2.

The planning unit 411 sets a target value (e.g., a target production amount) to be achieved in a predetermined period, according to an input from the input 427 operated by the user. The planning unit 411 stores, in the storing unit 428, the data thus set as a plan setting file. The planning unit 411 is implemented, for example, by a program (e.g., the visualization software 452) executed by the CPU 101 illustrated in FIG. 2.

The first update controller 412 controls the execution of the heat map updating to be described later. The first update controller 412 is implemented, for example, by a program (e.g., the visualization software 452) executed by the CPU 101 illustrated in FIG. 2.

The first log acquisition unit 413 acquires a log of each process from the production log based on the association file, in the log acquisition to be described later. The first log acquisition unit 413 is implemented, for example, by a program (e.g., the visualization software 452) executed by the CPU 101 illustrated in FIG. 2.

The achievement calculator 414 calculates an achievement value (e.g., production amount) achieved per unit time in each process to generate an achievement table in achievement calculation. The achievement calculator 414 is implemented, for example, by a program (e.g., the visualization software 452) executed by the CPU 101 illustrated in FIG. 2.

The ideal production calculator 415 calculates an ideal production amount for each process to generate an ideal production table in ideal production calculation to be described later. The ideal production calculator 415 is implemented, for example, by a program (e.g., the visualization software 452) executed by the CPU 101 illustrated in FIG. 2.

The chart drawing unit 416 causes the display control 430 to display, on the displaying unit 431, a heat map (an example chart) regarding the achievement, based on the achievement table and the ideal production table, in chart drawing processing to be described later. The chart drawing unit 416 is implemented, for example, by a program (e.g., the visualization software 452) executed by the CPU 101 illustrated in FIG. 2.

The selecting unit 417 selects a cell corresponding to a specific process and a specific unit time on the heat map drawn by the chart drawing unit 416, according to an input from the input 427 operated by the user. The selecting unit 417 is implemented, for example, by a program (e.g., the visualization software 452) executed by the CPU 101 illustrated in FIG. 2.

The range change unit 418 changes the range of unit time of the heat map drawn by the chart drawing unit 416, according to an input from the input 427 operated by the user. The range change unit 418 is implemented, for example, by a program (e.g., the visualization software 452) executed by the CPU 101 illustrated in FIG. 2.

The time identification unit 419 identifies the date and time (time data) of the video data to be played back, corresponding to the cell selected by the selecting unit 417. The time identification unit 419 is implemented, for example, by a program (e.g., the visualization software 452) executed by the CPU 101 illustrated in FIG. 2.

The selected data player 420 causes the display control 430 to play, on the displaying unit 431, the video data from the date and time specified by the time identification unit 419.

The selected data player 420 is implemented, for example, by a program (e.g., the visualization software 452) executed by the CPU 101 illustrated in FIG. 2.

The second update controller 421 controls the execution of the predicted achievement updating to be described later. The second update controller 421 is implemented, for example, by executing a program (e.g., the visualization software 452) with the CPU 101 illustrated in FIG. 2.

The second log acquisition unit 422 acquires a log of a specific process from the production log in the specified process log acquisition to be described later. The second log acquisition unit 422 is implemented, for example, by a program (e.g., the visualization software 452) executed by the CPU 101 illustrated in FIG. 2.

The cumulative summing unit 423 calculates a cumulative production amount (an example cumulative count number) per unit time in each process to generate a cumulative production table in cumulative production summing to be described later. The cumulative summing unit 423 is implemented, for example, by a program (e.g., the visualization software 452) executed by the CPU 101 illustrated in FIG. 2.

The graph drawing unit 424 causes the display control 430 to display, on the displaying unit 431, a plan graph and an achievement graph based on the plan setting file and the cumulative production table, in plan and achievement drawing processing to be described later. The graph drawing unit 424 is implemented, for example, by a program (e.g., the visualization software 452) executed by the CPU 101 illustrated in FIG. 2.

The prediction drawing unit 425 calculates a predicted cumulative production based on the cumulative production table and causes the display control 430 to display a prediction graph on the displaying unit 431, in prediction drawing processing to be described later. The prediction drawing unit 425 is implemented, for example, by a program (e.g., the visualization software 452) executed by the CPU 101 illustrated in FIG. 2.

The apparatus controller 426 controls operation of the information processing apparatus 4 entirely. In particular, the apparatus controller 426 controls operations based on the data collecting software 451 and the visualization software 452. The apparatus controller 426 is implemented, for example, by a program executed by the CPU 101 illustrated in FIG. 2.

The input 427 is for inputting an operation for a variety of processing performed by the information processing apparatus 4. The input 427 is implemented by the keyboard 107 and the mouse 108 illustrated in FIG. 2.

The storing unit 428 is a functional unit for storing the video data and a variety of setting information. The storing unit 428 is implemented by any desired memory, for example, the RAM 103 and the external memory device 104 illustrated in FIG. 2.

The external output 429 is a functional unit for outputting data indicating a state of production obtained by the heat map updating or the like, to an external device. The external output 429 is implemented by the external device I/F 111 illustrated in FIG. 2.

The display control 430 controls the display of various types of information on the displaying unit 431. The display control 430 is implemented by a program executed by the CPU 101 illustrated in FIG. 2.

The displaying unit 431 displays a variety of data under control by the display control 430. Particularly in the present embodiment, the displaying unit 431 displays a video data screen 500 (i.e., a data collecting screen) and a visualization screen 600 described later, according to the program (the data collecting software 451 and the visualization software 452) executed by the CPU 101 illustrated in FIG. 2. The displaying unit 431 is implemented by the display 105 illustrated in FIG. 2.

Note that, alternatively, a portion or all of the video player 402, the detection area designation unit 403, the reference setting unit 404, the detecting unit 405, the log output 406, the association unit 407, the video recording controller 408, the period setting unit 409, the chart setting unit 410, the planning unit 411, the first update controller 412, the first log acquisition unit 413, the achievement calculator 414, the ideal production calculator 415, the chart drawing unit 416, the selecting unit 417, the range change unit 418, the time identification unit 419, the selected data player 420, the second update controller 421, the second log acquisition unit 422, the cumulative summing unit 423, the graph drawing unit 424, the prediction drawing unit 425, the apparatus controller 426, and the display control 430 illustrated in FIG. 3 can be implemented by not the program being software but hardware circuitry such as an application specific integrated circuit (ASIC) or a field-programmable gate array (FPGA).

The functional units illustrated in FIG. 3 conceptually represent functions and not limited to those illustrated in FIG. 3. For example, a plurality of functional units that are independent from each other in FIG. 3 can be integrated into one functional unit. By contrast, a plurality of functions of one functional unit in FIG. 3 can be divided and allocated to a plurality of functional units.

The above-described functional units do not necessarily belong to the information processing apparatus 4 as illustrated in FIG. 3. In other words, the above-described functional units can be allocated to a plurality of apparatuses instead of being collected in one apparatus. For example, a group of functions implemented by execution of the data collecting software 451 and a group of functions implemented by execution of the visualization software 452 can be mounted in separate information processing apparatuses.

For simplifying descriptions below, although a functional unit sends data to the display control 430 and the display control 430 causes the displaying unit 431 to display that data, such operation is expressed such that the functional unit that has sent the data to the display control 430 displays the data on the displaying unit 431 (or a screen or a display area thereof). For example, the video player 402 sends video data to the display control 430, and the display control 430 causes the displaying unit 431 to display the video data. This operation is simply expressed such that the video player 402 causes the displaying unit 431 to play back the video data.

Detection Area Designation and Reference Color Setting

Figure 4:
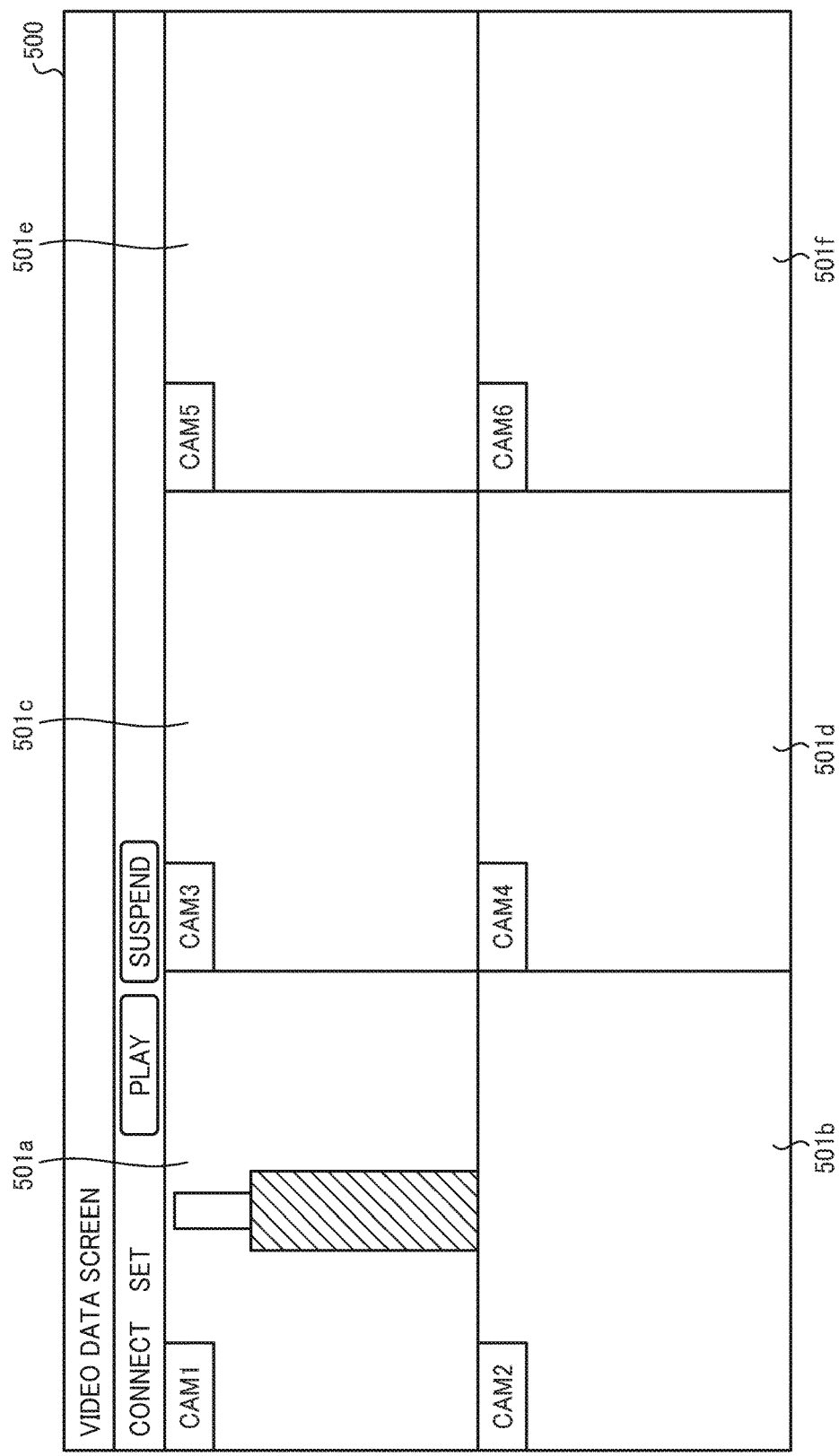
FIG. 4 illustrates a layout of an example application screen (a video data screen) of data collecting software executed by the information processing apparatus according to an embodiment.
Figure 5:
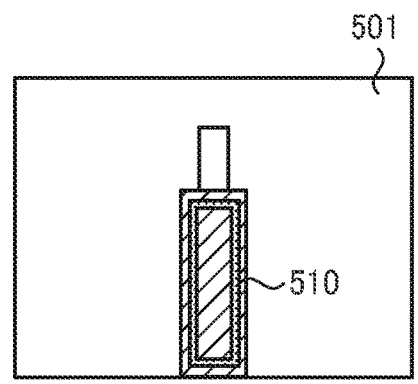
FIG. 5 is an illustration of designation of a detection area illustrated in FIG. 4.
Figure 6:
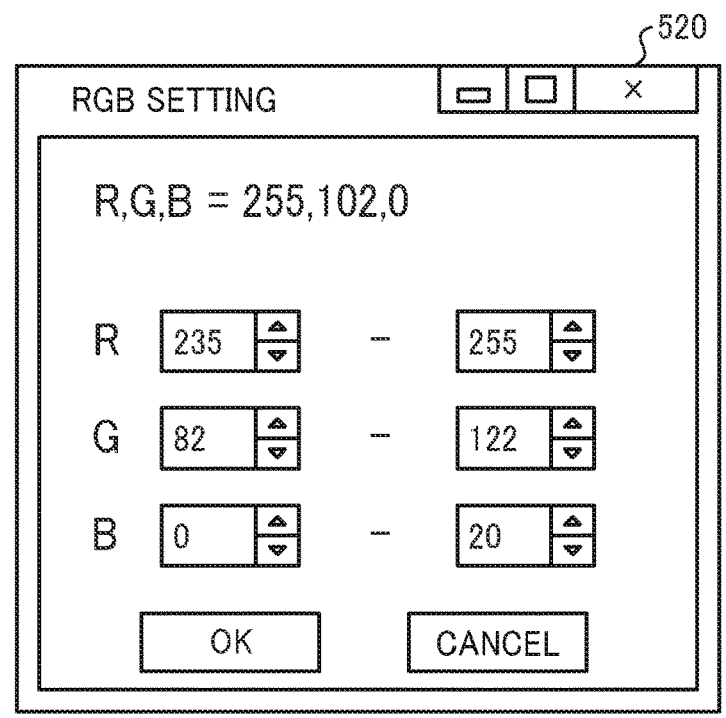
FIG. 6 is an example screen for setting a reference color range of the detection area illustrated in FIG. 4.

FIG. 4 illustrates a layout of an example application screen (a video data screen) of the data collecting software executed by the information processing apparatus according to the present embodiment. FIG. 5 is an illustration of designation of the detection area. FIG. 6 is an example screen for setting the range of reference color of the detection area. Referring to FIGS. 4 to 6, descriptions are given below of operation to designate the detection area on the video data screen (i.e., the data collecting screen) and set the reference color (an example of reference data).

According to an input from the input 427 operated by the user, the apparatus controller 426 executes the data collecting software 451 to display the video data screen 500 illustrated in FIG. 4, on the displaying unit 431. The video data screen 500 provides the video data received from the plurality of data collecting cameras 2 in real time or provides the video data stored in the storing unit 428, thereby presenting a detected state of the work in the detection area. As a work is detected in the detection area, the identification number (i.e., a work number) and the detected date and time are stored as a log in the production log.

As illustrated in FIG. 4, the video data screen 500 includes an operation area for a variety of operations. In FIG. 4, the operation area includes "Connect" and "Set" menus, "Play" and "Suspend" buttons, and video areas 501a to 501f).

The "Connect" menu enables connection to the data collecting camera 2 corresponding to connection address set with "Set" menu, as the user presses the "Connect" menu with the input 427.

The "Set" menu is for designating connection addresses of the data collecting cameras 2, to display the video data in the video areas 501a to 501f. For example, the connection address is an internet protocol (IP) address or a media access control (MAC) address specified for each camera.

The "Play" button is for displaying in real time, respectively in the video areas 501a to 501f, the video data of the data collecting cameras 2 or to play back the video data recorded in the storing unit 428.

The "Suspend" button is for suspending the video data respectively displayed in the video areas 501a to 501f.

The video areas 501a to 501f are areas for the video player 402 to display the video data of the data collecting cameras 2 received via the video receiver 401, according to an input from the input 427 operated by the user. Note that the video areas 501a to 501f may be referred to as "video areas 501" when collectively referred to, or discrimination is not necessary.

The layout of the video data screen 500 illustrated in FIG. 4 is just an example, and the video data screen 500 can be configured to enable display of other data, other settings, and other operations.

Referring to FIGS. 4 and 5, descriptions are given below of designation of the detection area. On the video data screen 500 illustrated in FIG. 4, the video data is played by the video player 402 in the video area 501a. During the playback of the video data in the video area 501a, when an image including a detection area to be designated is being displayed, the user presses the "Suspend" button with the input 427. Then, the video player 402 suspends the video data played in the video area 501a.

Subsequently, in response to a user operation of the input 427 (e.g., dragging the mouse 108), the detection area designation unit 403 specifies a detection area 510 in the video area 501a (the video area 501 in FIG. 5). The detection area designation unit 403 stores, in the storing unit 428, data of the designated detection area 510 in correlation with the data collecting camera 2 that has captured the video data being displayed in the video area 501a. Note that the number of the detection areas designated in one video area 501 is not necessarily one but can be two or more.

Referring to FIG. 6, descriptions are given below of setting of the reference color range. In response to a user operation of the input 427 (e.g., right click on the mouse 108) on the detection area 510, the reference setting unit 404 displays a reference color setting screen 520 illustrated in FIG. 6. The reference setting unit 404 calculates an average of each of RGB (red, green, and blue) values of the image in the detection area 510 and sets, as the reference color, a color defined by the calculated averages of RGB values. Further, the reference setting unit 404 sets, as the reference color range, a color range including the RGB values of the reference color in the reference color setting screen 520, according to a user operation of the input 427.

The detection area and the reference color range set as described above are used in detection of the work in the object detection processing.

Object Detection Processing

Figure 8:
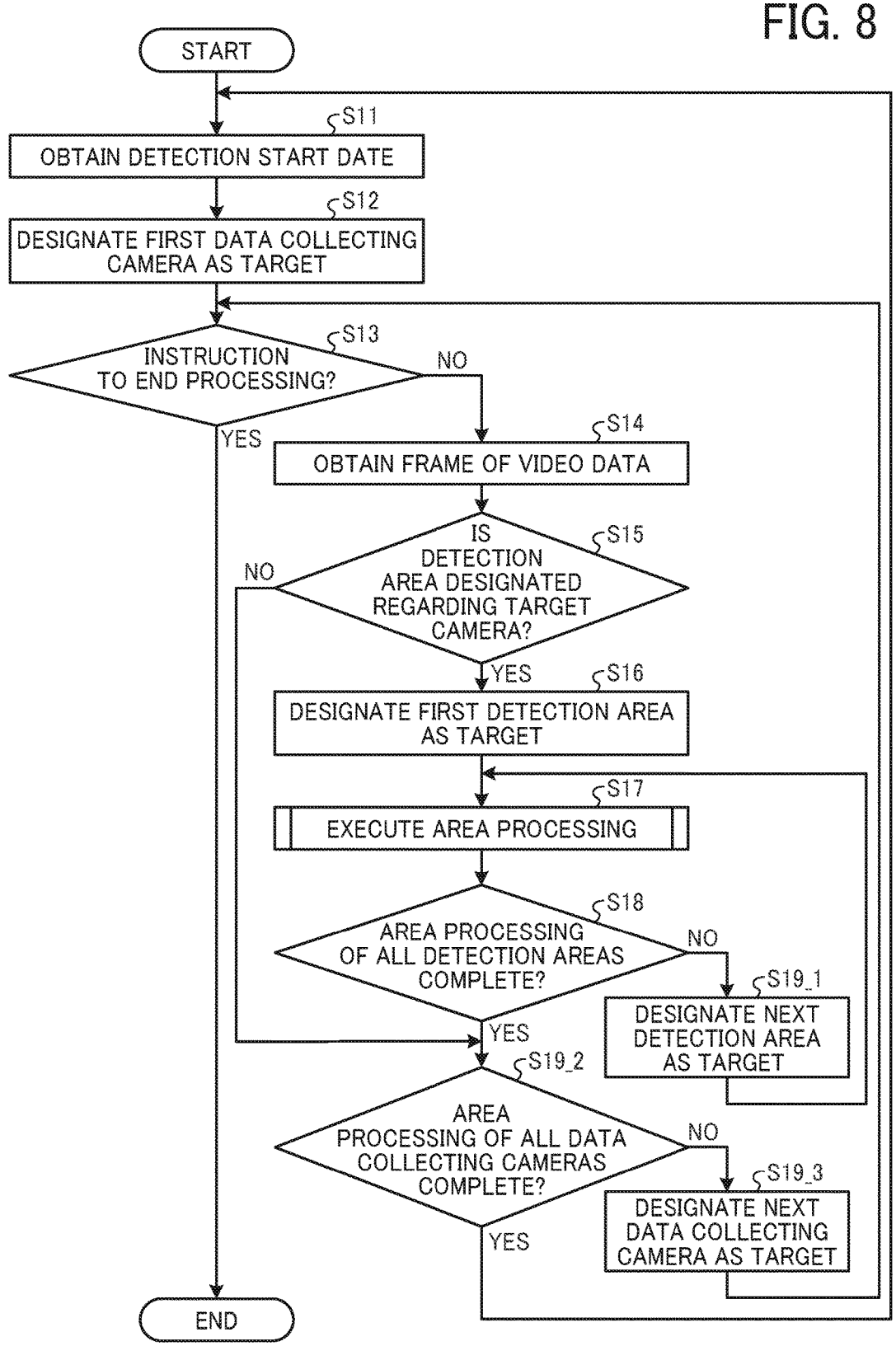
FIG. 8 is a flowchart of example object detection processing performed by the information processing apparatus, according to an embodiment.

FIG. 7 illustrates an example of the production log. FIG. 8 is a flowchart of an example of object detection processing performed by the information processing apparatus according to the present embodiment. FIG. 9 is a flowchart of an example of area processing of the object detection processing illustrated in FIG. 8. FIGS. 10A to 10D illustrate an example of log output operation. Referring to FIGS. 7 to 10, descriptions are given below of the object detection processing performed by the information processing apparatus 4 according to the present embodiment.

As a work (i.e., an object) is detected in the detection area of the data collecting camera 2 correlated to each process in the association file described later, a log of detection of the work is recorded in a production log 701 (illustrated in FIG. 7) generated for each process (e.g., Process 1 in FIG. 7). Specifically, as illustrated in FIG. 7, each time the work is detected, the work number (work No.) and date (and time) are recorded as a log in the production log 701.

Next, descriptions are given below of the object detection processing, with reference to FIG. 8, and the area processing thereof, with reference to FIGS. 9 and 10.

At S11, the detecting unit 405 obtains current date and time as detection start date.

At S12, the detecting unit 405 designates a first one (e.g., the data collecting camera 2a) of the data collecting cameras 2 as a target camera.

At S13, the detecting unit 405 determines whether an instruction to end the object detection processing is received (e.g., an end instruction by the input 427). When the instruction to end is received (Yes at S13), the object detection processing ends. When the instruction to end is not received (No at S13), the process proceeds to S14.

At S14, the detecting unit 405 obtains a current frame of the video data displayed by the video player 402 in the video area 501, corresponding to the target camera.

At S15, the detecting unit 405 determines whether a detection area is designated in the video area 501 corresponding to the target camera. When there is a designated detection area (Yes at S15), the process proceeds to S16. When there is not a designated detection area (No at S15), the process proceeds to S19_2.

At S16, the detecting unit 405 designates, as a target detection area, a first one of at least one detection area designated in the video area 501 corresponding to the target camera.

At S17, the detecting unit 405 executes the area processing presented as S171 to S179_2 in FIG. 9.

At S171, the detecting unit 405 stores a value of a variable now as a variable prev.

At S172, the detecting unit 405 extracts an image inside the target detection area.

At S173, the detecting unit 405 calculates an average of each of the RGB values of the extracted image.

At S174, the detecting unit 405 determines whether or not the calculated respective averages of the RGB values are within the reference color range set by the reference setting unit 404. When all of the averages of the RGB values are within the reference color range (Yes at S174), the process proceeds to S175. When at least one of the averages of the RGB values are outside the reference color range (No at S174), the process proceeds to S176.

At S175, the detecting unit 405 stores a value "True" as the variable now.

At S176, the detecting unit 405 stores a value "False" as the variable now.

At S177, the detecting unit 405 performs determination of the value of the variable prev and the value of the variable now. When the variable prev is "False" and the variable now is "True" (Yes at S177), the process proceeds to S178. By contrast, when the variable prev is "True" or the variable now is "False" (No at S177), the detecting unit 405 determines that the work (an example object) is not being detected as illustrated in FIGS. 10A and 10C and ends the area processing. Then, the process proceeds to S18.

When the variable prev is "False" and the variable now is "True" (Yes at S177), at S178, the detecting unit 405 determines that the work (the object) has been detected as illustrated in FIGS. 10B and 10D. Then, the log output 406 increments a count (a variable inside the software) corresponding to the target camera (or the target detection area).

At S179_1, the log output 406 determines the work number based on the detection start date obtained at S11 and the incremented count. For example, in the example of FIG. 10D, the incremented count is "2", the detection start date is "2017/1/1 0:01", and determined work number is "201701010000002".

At S179_2, the log output 406 stores the determined work number and the date as a log in a production log 702, as illustrated in FIGS. 10B and 10D. In FIGS. 10A to 10D, the process corresponding to the target camera is presented as "Process 1". Then, the area processing ends, and the process proceeds to S18 in FIG. 8.

Referring back to FIG. 8, at S18, the detecting unit 405 determines whether or not the area processing of all detection areas corresponding to the target camera has completed. When the area processing is complete regarding all detection areas (Yes at S18), the process proceeds to S19_2. When there is a detection area regarding which the area processing is not complete (No at S18), the process proceeds to S19_1.

At S19_1, the detecting unit 405 designates, as the target detection area, a next one of at least one detection area designated in the video area 501 corresponding to the target camera.

At S19_2, the detecting unit 405 determines whether or not the area processing has completed regarding all the data collecting cameras 2. When processing of all the data collecting cameras 2 has completed (Yes at S19_2), the process returns to S11 and repeats the object detection processing. By contrast, when the processing is not completed regarding at least one of the data collecting cameras 2 (No at S19_2), the process proceeds to S19_3.

At S19_3, the detecting unit 405 designates a next one of the data collecting cameras 2 (e.g., the data collecting camera 2b) as the target camera. Then, the process returns to S13.

Through steps S11 to S193, the object detection processing is repeatedly performed.

Association Setting in Process Setting Screen

Figure 12:
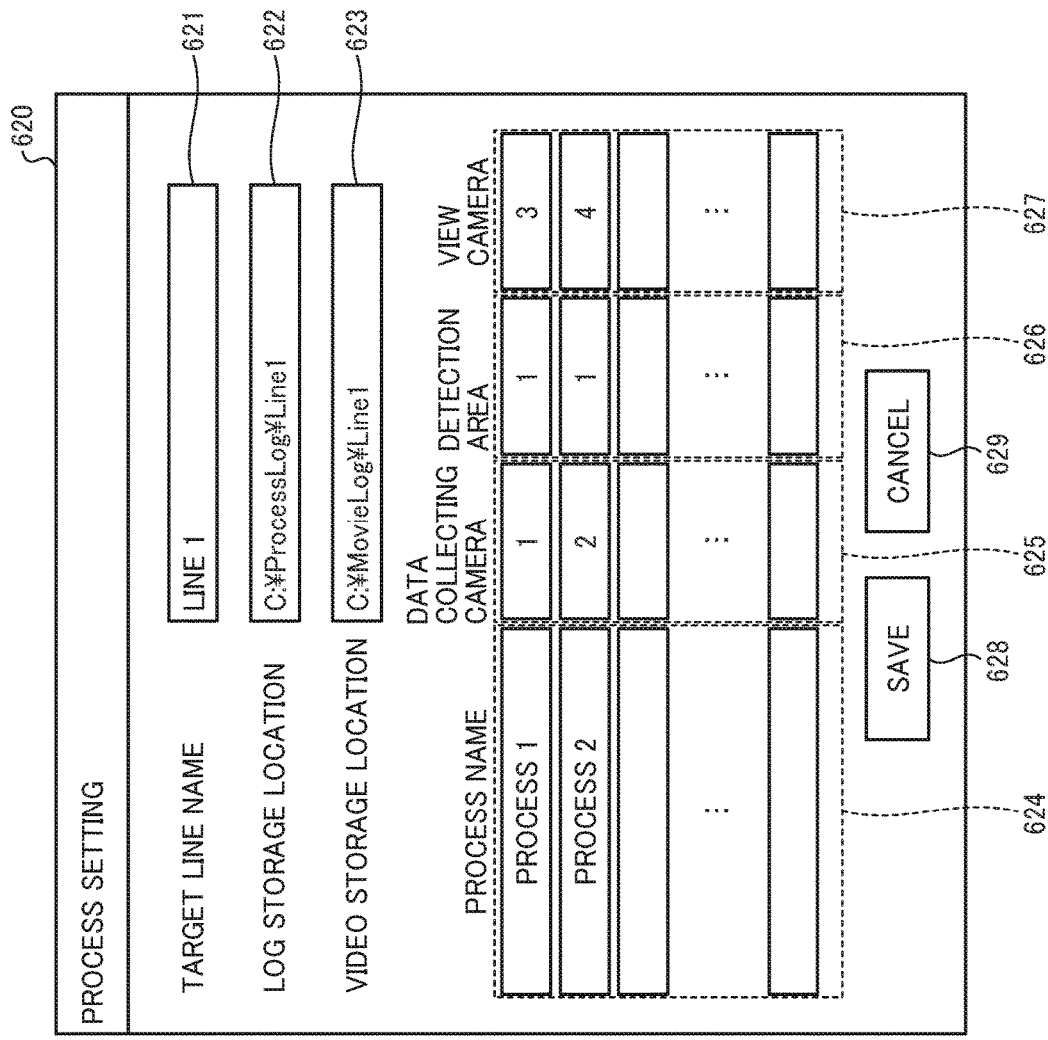
FIG. 12 illustrates an example process setting screen.

FIG. 11 illustrates an example layout of an application screen (a visualization screen) of the visualization software executed by the information processing apparatus, according to the present embodiment. FIG. 12 illustrates an example process setting screen. FIG. 13 illustrates an example association file. Referring to FIGS. 11 to 13, descriptions are given below of association setting on the process setting screen of the visualization screen.

According to an input from the input 427 operated by the user, the apparatus controller 426 executes the visualization software 452 to display the visualization screen 600 illustrated in FIG. 11, on the displaying unit 431. On the visualization screen 600, the heat map representing the respective production states of the processes is drawn. A plan graph, an achievement graph, and a prediction graph of a specific process are drawn to visualize the production states.

As illustrated in FIG. 11, the visualization screen 600 includes a line selection area 601, a set button 602, automatic update button 603, a manual update button 604, a period field 605, a chart set button 606, an image area 607, an automatic update button 613, a manual update button 614, a period field 615, a chart set button 616, an image area 617, and a planning button 618.

The line selection area 601 is for selecting or inputting a target production line to be set on the process setting screen described later.

The set button 602 is for displaying the process setting screen when pressed by the user with the input 427.

The automatic update button 603 is for enabling or disabling automatic execution of the heat map updating at constant intervals. For example, the automatic update button 603 is a button capable of retaining the position thereof. When the automatic update button 603 is at a pressed position, heat map updating is automatically executed. When the automatic update button 603 is restored, automatic executing is cancelled. The manual update button 604 is for manually executing the heat map updating.

The period field 605 is for the period setting unit 409 to set the duration of acquisition of logs in log acquisition, according to an input from the input 427 operated by the user.

The chart set button 606 is for the chart setting unit 410 to set an automatic update interval and a duration of data acquisition in the heat map updating when pressed by the user with the input 427.

In the image area 607, a heat map regarding achievement is drawn in chart drawing processing to be described later.

The automatic update button 613 is for enabling or disabling automatic execution of predicted achievement updating to be described later, at constant intervals. For example, the automatic update button 613 is a button capable of retaining the position thereof. When the automatic update button 613 is at a pressed position, predicted achievement updating is automatically executed. When the automatic update button 613 is restored, automatic executing is cancelled. The manual update button 614 is for manually executing the predicted achievement updating.

The period field 615 is for the period setting unit 409 to set the duration of acquisition of logs in specified process log acquisition to be described later, according to an input from the input 427 operated by the user.

The chart set button 616 is for the chart setting unit 410 to set automatic update interval and duration of data acquisition in the predicted achievement updating when pressed by the user with the input 427.

In the image area 617, the plan, achievement, and prediction graphs are drawn in plan and achievement drawing and prediction drawing to be described later.

The planning button 618 is for displaying a planning screen to be described later, when pressed by the user with the input 427.

The layout of the visualization screen 600 illustrated in FIG. 11 is just an example, and the visualization screen 600 can be configured to enable display of other data, other settings, and other operations. On the visualization screen 600 illustrated in FIG. 11, the image area 607 and the buttons relating thereto are disposed on the upper side, and the image area 617 and the buttons relating thereto are disposed on the lower side. However, the positions can be reversed. Alternatively, the visualization screen 600 can be configured to enable switching of display area so that only one of those two areas is displayed.

Referring to FIGS. 12 to 13, descriptions are given below of association setting on the process setting screen. As the user presses the set button 602 with the input 427, the association unit 407 displays a process setting screen 620 illustrated in FIG. 12. As illustrated in FIG. 12, the process setting screen 620 includes a target line entry field 621, a log storage location field 622, a video storage location field 623, a process name field 624, a data collecting camera field 625, a detection area field 626, a view camera field 627, a save button 628, and a cancel button 629.

The target line entry field 621 is for selecting or inputting a production line (a target line) to be set. Alternatively, the target line entry field 621 can be configured such that the name of the production line selected or input in the line selection area 601 is automatically entered in the target line entry field 621 at the time when the process setting screen 620 is opened.

The log storage location field 622 is for inputting a storage path for storing the production log of the target line in the storing unit 428.

The video storage location field 623 is for inputting a storage path for storing the video data of the view camera 3 correlated to the target line in the storing unit 428.

The process name field 624 is for inputting the name of the process to be correlated to each of the data collecting camera 2, the detection area, and the view camera 3. The data collecting camera field 625 is for inputting identification information (e.g., camera No.) of the data collecting camera 2 to detect the work and record a log in the correlated process. The detection area field 626 is for selecting or inputting the detection area set regarding the correlated data collecting camera 2. Note that, as described above, the data collecting camera 2 and the detection area are correlated to each other in designating the detection area. Accordingly, the association unit 407 can be configured to display a list of at least one detection area correlated to the data collecting camera 2 when the identification information of the data collecting camera 2 is input in the data collecting camera field 625. The view camera field 627 is for inputting an identification information (e.g., camera No.) of the view camera 3 to take the video data to be played when a cell is selected on the heat map corresponding to the correlated process.

The save button 628 is for storing (saving), for the association unit 407, the setting values input or selected in each of the target line entry field 621 to the view camera field 627 as, for example, an association file 710 illustrated in FIG. 13, in the storing unit 428.

As illustrated in FIG. 13, in the association file 710, setting values are stored in a format in which the keys associated with the setting values are grouped together for each section. For example, in "Line" section, a LineName key equivalent to the target line entry field 621, a LogDirectory key equivalent to the log storage location field 622, and a MovieDirectory key equivalent to the video storage location field 623 are grouped. A setting value "Line 1" is associated with the "LineName" key, a setting value "C:¥ProcessLog¥Line1" is associated with the LogDirectory key, and a setting value "C:¥MovieLog¥Line1" is associated with the MovieDirectory key.

The fields on the first lines of the process name field 624 to the view camera field 627 correspond to the section "Pr1", in which a PrName key equivalent to the process name field 624, a DataCamNo key equivalent to the data collecting camera field 625, a WindowNo key equivalent to the detection area field 626, and a ViewCamNo key equivalent to the view camera field 627 are grouped. A setting value "Process 1" is associated with the PrName key, a setting value "1" is associated with the DataCamNo key, a setting value "1" is associated with the WindowNo, key, and a setting value "3" is associated with the ViewCamNo key.

The cancel button 629 is for cancelling saving of the setting values input or selected in each of the target line entry field 621 to the view camera field 627 in the association file 710.

In a case where the association file 710 specifying the setting values is stored in the storing unit 428, the association unit 407 can be configured to read the association file 710 and display the setting values in the respective fields of the process setting screen 620 when the process setting screen 620 is opened. In this case, when the setting value is altered and saved with the save button 628, the association file 710 can be updated with the altered setting value.

As the associations are specified in the association file 710, the roles (log collecting or display of state of process corresponding to the cell selected on the heat map) of the data collecting cameras 2a to 2f and the view cameras 3a and 3b illustrated in FIG. 1 are determined. Depending on the setting, the data collecting camera 2 can become the view camera 3 and vice versa.

In the example of the process setting screen 620 and the association file 710 illustrated in FIGS. 12 and 13, "Process 1" and "Process 2" are presented as the process names. However, the number in the process name does not specify the order of the process. On the process setting screen 620, it is not necessary to enter and set the processes in the order of the processes. Accordingly, process names such as "machining", "press fit", "length measurement", "assembling", "clamping", and "inspection" can be set. Even when the order of processes of the target production line is predetermined, the process setting can be made in no particular order, on the process setting screen 620.

Setting of Specified Period

FIG. 14 illustrates the period field 605 (or 615) of the visualization screen 600. Referring to FIG. 14, descriptions are given of specifying the period in the period field 605 (or 615) of the visualization screen 600.

According to the input to the period field 605 (or 615) from the input 427 operated by the user, the period setting unit 409 sets the duration of acquisition of logs (specified period) in the log acquisition (specified process log acquisition) to be described later. Then, the period setting unit 409 determines whether to acquire logs in a specified period mode to which the specified period is applied. For example, the period setting unit 409 can store the setting information as a file in the storing unit 428.

Chart Setting

Figure 15:
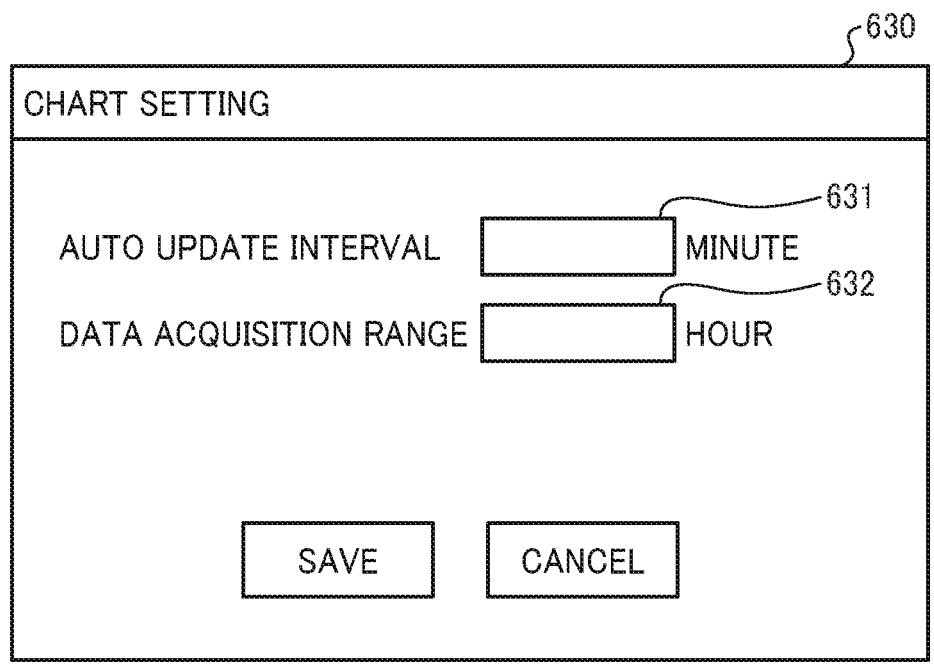
FIG. 15 illustrates an example chart setting screen.

FIG. 15 illustrates an example of the chart setting screen. Referring to FIG. 15, descriptions are given below of chart setting on a chart setting screen 630 of the visualization screen 600.

As the user presses the chart set button 606 (or 616) on the visualization screen 600 with the input 427, the chart setting unit 410 displays the chart setting screen 630 illustrated in FIG. 15. The description below is on the assumption that the chart set button 606 has been pressed and the setting of the heat map updating is to be made on the chart setting screen 630. As illustrated in FIG. 15, the chart setting screen 630 includes an automatic update interval field 631, a data acquisition range field 632, a save button, and a cancel button.

The automatic update interval field 631 is for inputting the interval of automatic update of the heat map updating. The data acquisition range field 632 is for inputting the duration of acquisition of data (acquisition of logs).

As the save button on the chart setting screen 630 is pressed, the values set in the automatic update interval field 631 and the data acquisition range field 632 are stored (saved) as a setting file in the storing unit 428, for the chart setting unit 410. As the cancel button on the chart setting screen 630 is pressed, the values set in the automatic update interval field 631 and the data acquisition range field 632 are canceled and not stored in the setting file.

In a case where the setting file specifying the setting values is stored in the storing unit 428, the chart setting unit 410 can be configured to read the setting file and display the setting values in the respective fields of the chart setting screen 630 when the chart setting screen 630 is opened. In this case, when the setting value is altered and saved with the save button 628, the setting file can be updated with the altered setting value.

Additionally, the chart setting unit 410 can be configured such that, when the chart set button 616 is pressed, the chart setting unit 410 displays a setting screen equivalent to the chart setting screen 630 that includes an entry field for inputting an automatic update interval of the predicted achievement updating to be described later, an entry field for inputting the duration of data acquisition in the predicted achievement updating, and a field for specifying a particular process. The setting values can be stored in a manner similar the manner of storing setting on the chart setting screen 630.

Planning

Figure 16:
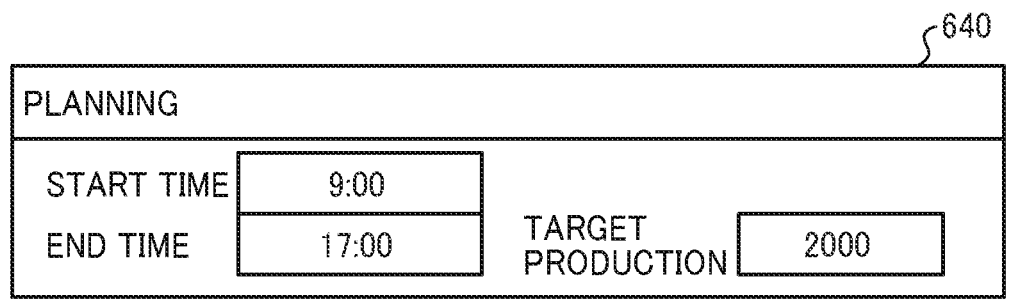
FIG. 16 illustrates an example planning screen.

FIG. 16 illustrates an example planning screen. Referring to FIG. 16, descriptions are given below of production planning on a planning screen 640 of the visualization screen 600.

As the user presses the planning button 618 on the visualization screen 600 with the input 427, the planning unit 411 displays the planning screen 640 illustrated in FIG. 16. As illustrated in FIG. 16, the planning screen 640 includes a start time entry field, an end time entry field, and a target production entry field.

The start time entry field is for inputting the start time of a plan graph in the plan and achievement drawing processing to be described later. The end time entry field is for inputting the end time of the plan graph in the plan and achievement drawing processing. The plan graph is drawn in the duration from the start time to the end time specified here in the plan and achievement drawing processing.

The target production entry field is for inputting the target production amount to be produced in a period from the start time to the end time.

Note that, at the time the above-mentioned three entry fields are filled, a plan setting file specifying the values input therein can be stored in the storing unit 428. Alternatively, similar to the above-described chart setting screen 630, the planning screen 640 can include a save button and a cancel button so that the setting value can be saved in the plan setting file at the time the save button is pressed.

In a case where the plan setting file specifying the setting values is stored in the storing unit 428, the planning unit 411 can be configured to read the plan setting file and display the setting values in the respective fields of the planning screen 640 when the planning screen 640 is opened. In this case, when the setting value is altered, the plan setting file can be updated with the altered setting value.

Additionally, the plan setting file specifying the start time, the end time, and the target production amount can be created by an external device, and the plan setting file created by the external device is read into the information processing apparatus 4 in the plan and achievement drawing processing to be described later.

Heat Map Updating

Figure 17:
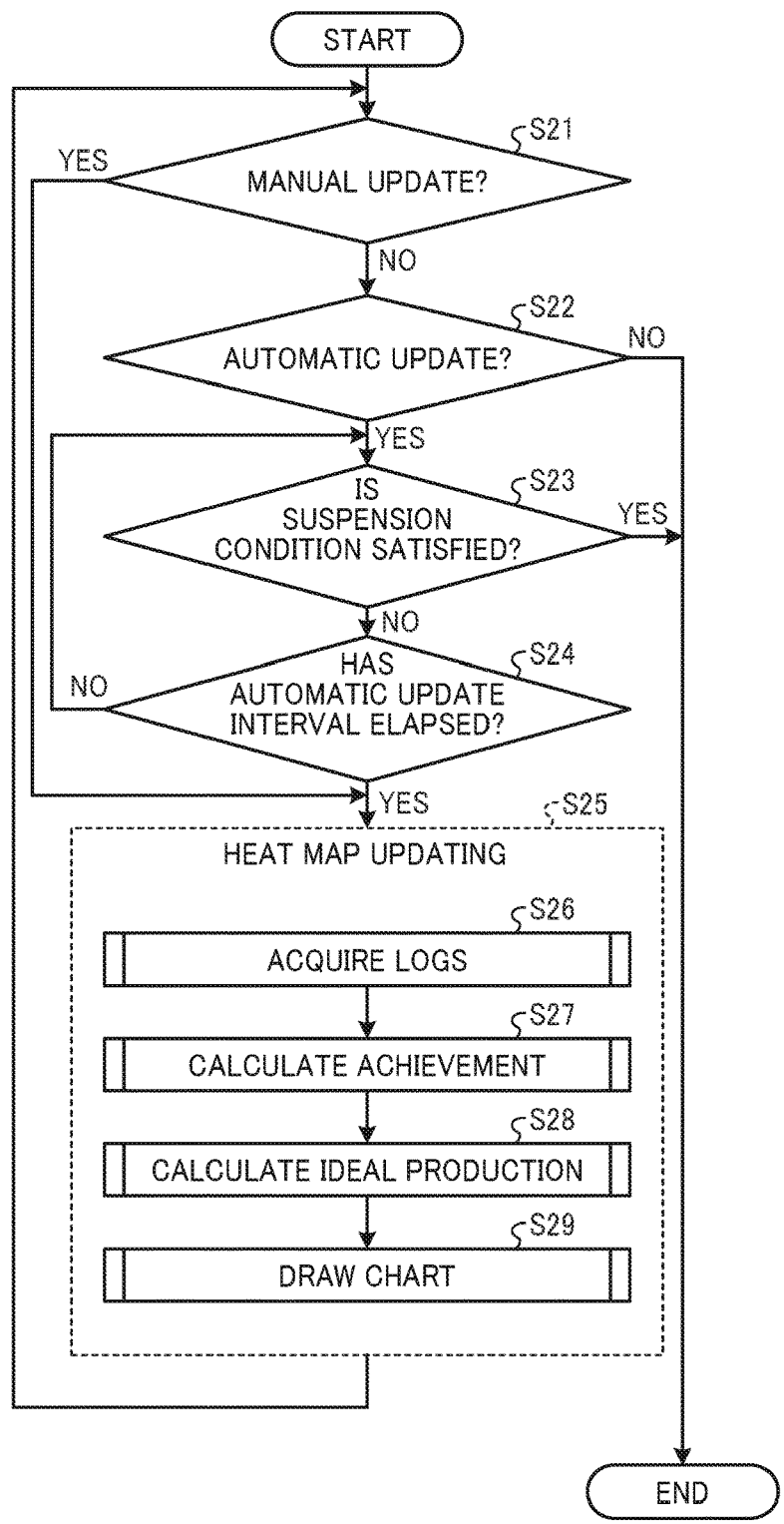
FIG. 17 is a flowchart of example heat map updating performed by the information processing apparatus according to an embodiment.

FIG. 17 is a flowchart of an example of the heat map updating performed by the information processing apparatus 4 according to the present embodiment. Referring to FIG. 17, descriptions are given below of the heat map updating performed by the information processing apparatus 4 according to the present embodiment.

At S21, the first update controller 412 determines whether or not the manual update button 604 is pressed on the visualization screen 600. When the manual update button 604 is pressed (Yes at S21), the process proceeds to S25. When the manual update button 604 is not pressed (No at S21), the process proceeds to S22. As the manual update button 604 is pressed, manually executing the heat map updating is selected.

At S22, the first update controller 412 determines whether or not the automatic update button 603 is pressed on the visualization screen 600 to select automatic executing of the heat map updating. When the automatic execution of the heat map updating (automatic updating) is selected (Yes at S22), the process proceeds to S23. When automatic updating is not selected (No at S22), the process ends.

At S23, the first update controller 412 determines whether or not a suspension condition for the automatic executing of the heat map updating is satisfied. The suspension condition includes, for example, cancellation (restoring) of the automatic update button 603, expiration of duration of data acquisition set on the chart setting screen 630, and closing of the visualization screen 600. When the suspension condition is satisfied (Yes at S23), the process ends. When the suspension condition is not satisfied (No at S23), the process proceeds to S24.

At S24, the first update controller 412 determines whether or not the automatic update interval (a constant time) set on the chart setting screen 630 has elapsed. When the automatic update interval has elapsed (Yes at S24), the process proceeds to S25. When the automatic update interval has not yet elapsed (No at S24), the process returns to S23.

At S25, the first update controller 412 executes the heat map updating through S26 to S29.

At S26, the first log acquisition unit 413 and the second log acquisition unit 422 acquire logs. Details of the log acquisition are described later with reference FIGS. 18 and 19. After the log acquisition completes, the process proceeds to S27.

At S27, the achievement calculator 414 performs achievement calculation, which is described in detail later with reference FIGS. 20 and 21. After the achievement calculation completes, the process proceeds to S28.

At S28, the ideal production calculator 415 performs ideal production calculation, which is described in detail later with reference FIGS. 22 to 24. After the ideal production calculation completes, the process proceeds to S29.

At S29, chart drawing is performed, which is described in detail later with reference FIGS. 28 and 29. After the chart drawing completes, the process returns to S21.

With the steps S21 to S29, the heat map updating is executed.

Log Acquisition

Figure 18:
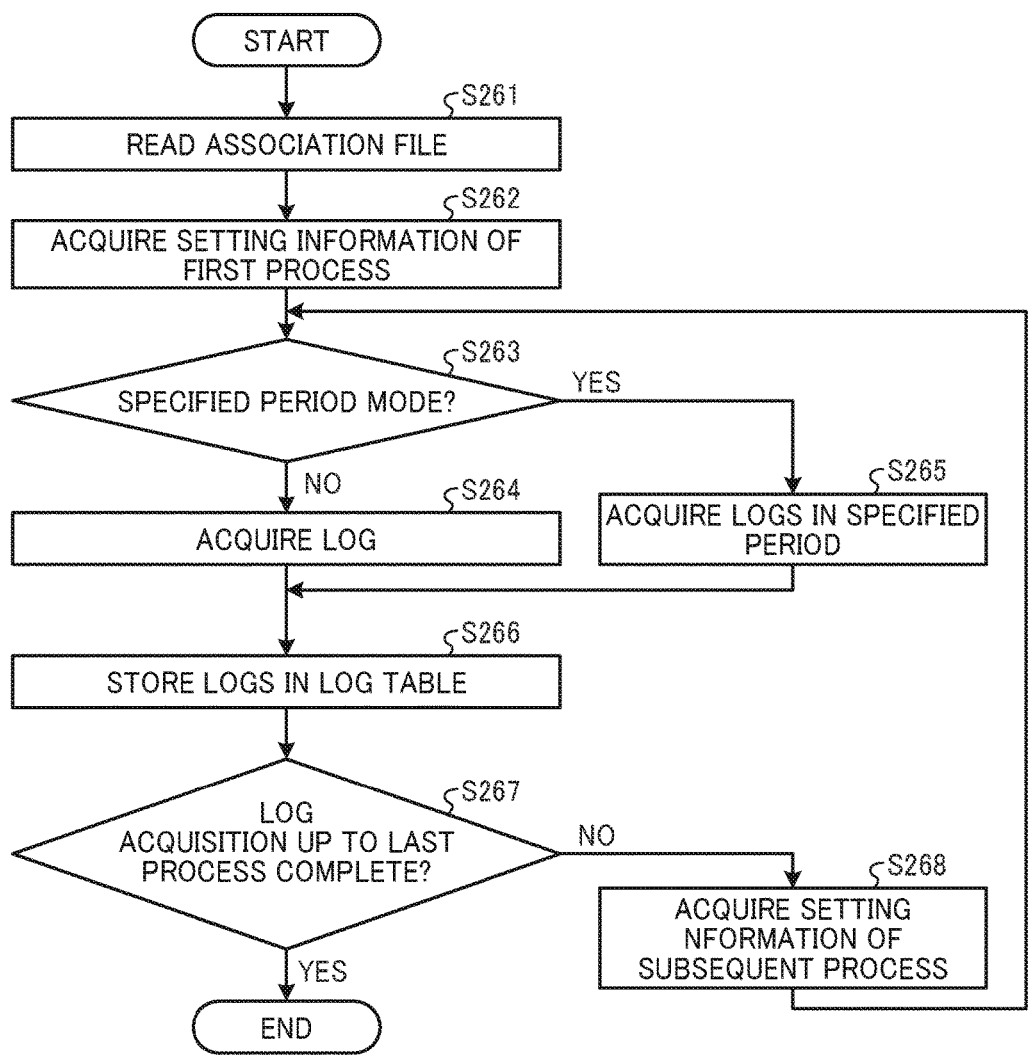
FIG. 18 is a flowchart of example log acquisition executed in the heat map updating illustrated in FIG. 17.

FIG. 18 is a flowchart of an example of log acquisition executed in the heat map updating. FIG. 19 illustrates an example log table generated in the log acquisition.

Referring to FIGS. 18 and 19, descriptions are given below of the log acquisition in the heat map updating performed by the information processing apparatus 4 according to the present embodiment.

At S261, the first log acquisition unit 413 reads the association file (e.g., the association file 710 illustrated in FIG. 13) set by the association unit 407.

At S262, the first log acquisition unit 413 acquires the setting information of the first process from the association file thus read.

At S263, the first log acquisition unit 413 determines whether or not the period setting unit 409 has set the specified period mode. When the system is not operating in the specified period mode (No at S263), the process proceeds to S264. When the system is operating in the specified period mode (Yes at S263), the process proceeds to S265.

At S264, when the system is not operating in the specified period mode, the first log acquisition unit 413 refers to the production log in the storing unit 428 based on the storage location specified in the association file and acquires a log of the current date, of the process acquired from the association file. For example, in the manual updating, a predetermined number of logs up to the current date can be acquired. In the automatic updating, after acquiring the log of the current date, in subsequent long acquisition, the first log acquisition unit 413 can acquire the logs of a period starting from the date subsequent to the date of the acquired log until the date of execution of log acquisition.

At S265, when the system is operating in the specified period mode, the first log acquisition unit 413 refers to the production log in the storing unit 428 based on the storage location specified in the association file and acquires logs in the period set by the period setting unit 409, of the process acquired from the association file.

At S266, the first log acquisition unit 413 stores the logs of all processes acquired from the production log in, for example, a log table 720 illustrated in FIG. 19, for each process.

At S267, the first log acquisition unit 413 determines whether or not log acquisition up to the last process specified in the association file has completed. When the log acquisition up to the last process has completed (Yes at S267), the log acquisition completes. When the log acquisition up to the last process has not yet completed (No at S267), the process proceeds to S268.

At S268, the first log acquisition unit 413 acquires the setting information of the subsequent process from the association file thus read. Then, the process returns to S263.

With the steps S261 to S268, the log acquisition in the heat map updating is thus executed.

Achievement Calculation

Figure 20:
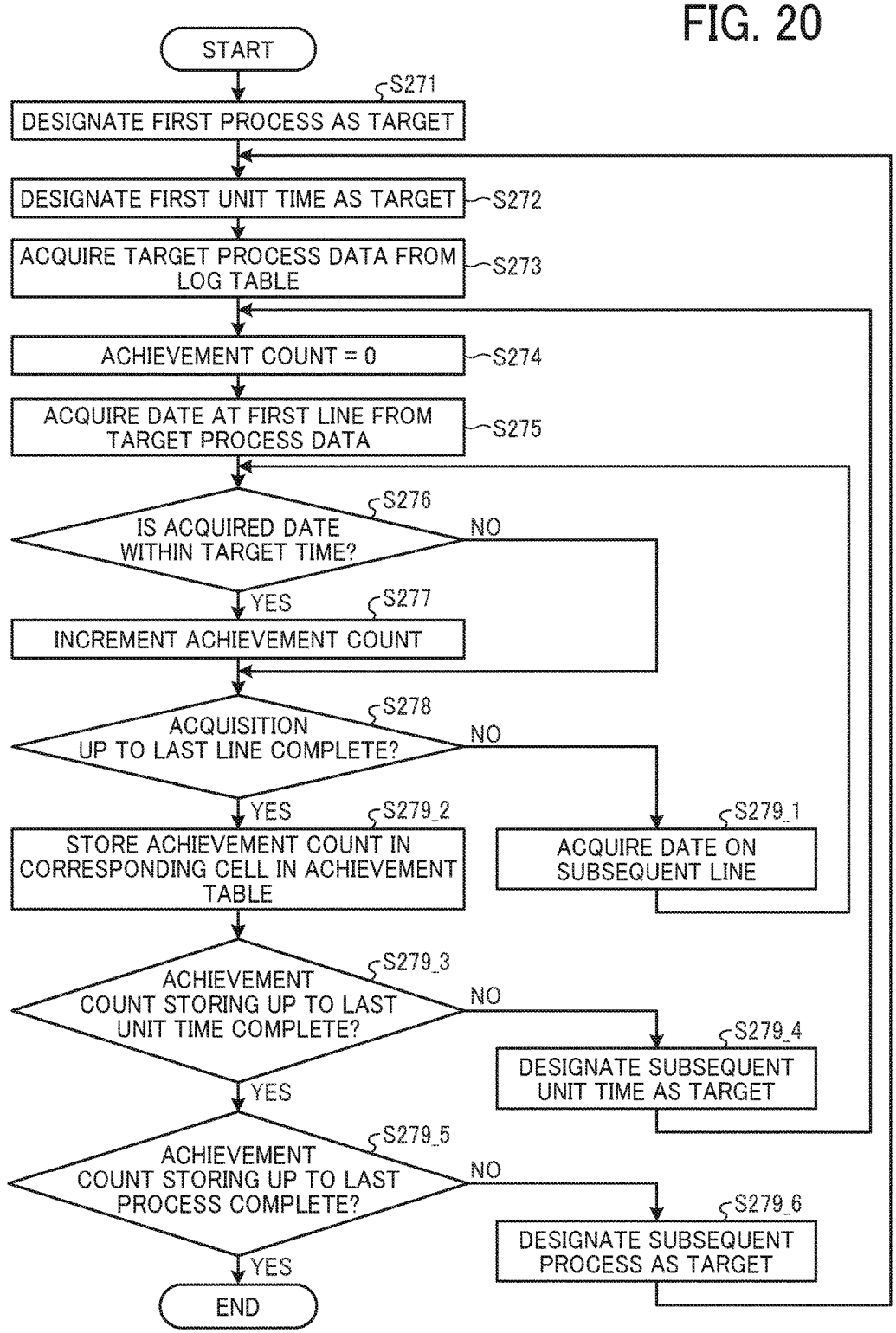
FIG. 20 is a flowchart of an example achievement calculation executed in the heat map updating illustrated in FIG. 17.

FIG. 20 is a flowchart of an example achievement calculation executed in the heat map updating. FIG. 21 illustrates an example achievement table. Referring to FIGS. 20 and 21, descriptions are given below of the achievement calculation in the heat map updating performed by the information processing apparatus 4 according to the present embodiment.

At S271, the achievement calculator 414 designates, as the target process, the first process in the log table 720 created by the first log acquisition unit 413.

At S272, the achievement calculator 414 designates, as a target time, the first one of the unit times. In the example described here, the duration of unit time is "1 hour". Note that the duration of unit time can be changed in the range changing to be described later. Specifically, in the specified period mode, the achievement calculator 414 designates, as the target time, the first one of unit times in the period specified by the period setting unit 409. By contrast, when the system is not operating in the specified period mode and automatic updating is on, the achievement calculator 414 designates, as the target time, the unit time including the date at which the heat map updating is started. Additionally, when the system is not operating in the specified period mode and manual updating is on, the achievement calculator 414 designates, as the target time, the unit time including the initial date acquired by the first log acquisition unit 413. For example, where the current time is "5:15", the target unit time is time "5 (5 o'clock)".

At S273, the achievement calculator 414 acquires, as target process data, the logs of the target process from the log table 720 created by the first log acquisition unit 413.

At S274, the achievement calculator 414 resets an achievement count (a variable inside software) to "0".

At S275, the achievement calculator 414 acquires the date on the first line from the target process data.

At S276, the achievement calculator 414 determines whether or not the acquired date is within the target time. When the acquired date is within the target time (Yes at S276), the process proceeds to S277. When the acquired date is outside the target time (No at S276), the process proceeds to S278.

At S277, the achievement calculator 414 increments the achievement count.

At S278, the achievement calculator 414 determines whether or not acquisition of the date from the target process data has completed up to the last line. When the date acquisition up to the last line has completed (Yes at S278), the process proceeds to S279_2. When the date acquisition up to the last process has not yet completed (No at S278), the process proceeds to S279_1.

At S279_1, the achievement calculator 414 acquires the date on the subsequent line from the target process data. Then, the process returns to S276.

At S279_2, the achievement calculator 414 stores, as an achievement value of production, the value of the achievement count (an example count number and an example state of object) in the cell corresponding to the target process and the target time on the achievement table 730 illustrated in FIG. 21. Note that, as described above, the process names "Process 1" to "Process 10" are used for convenience and do not specify the order of processes.

At S279_3, the achievement calculator 414 determines whether or not the achievement count has been stored in the achievement table 730 up to the last unit time. Specifically, in the specified period mode, the achievement calculator 414 determines whether or not the achievement count storing has completed up to the last unit time of the target time specified by the period setting unit 409. When the system is not operating in the specified period mode, the achievement calculator 414 determines whether or not the achievement count storing has completed up to the unit time including the current date (i.e., last unit time). When the achievement count storing up to the last unit time has completed (Yes at S279_3), the process proceeds to S279_5. When the achievement count storing up to the last unit time has not yet completed (No at S279_3), the process proceeds to S279_4.

At S279_4, the achievement calculator 414 designates, as the target time, the subsequent unit time. Then, the process returns to S274.

At S279_5, the achievement calculator 414 determines whether or not the achievement count storing in the achievement table 730 has completed up to the last process. When the achievement count storing up to the last process has completed (Yes at S279_5), the achievement calculation completes. When the achievement count storing up to the last process has not yet completed (No at S279_5), the process proceeds to S279_6.

At S279_6, the achievement calculator 414 designates, as the target process, the subsequent process. Then, the process returns to S272.

With the steps S271 to S279_6, the achievement calculation in the heat map updating is thus executed.

Ideal Production Calculation

Figure 22:
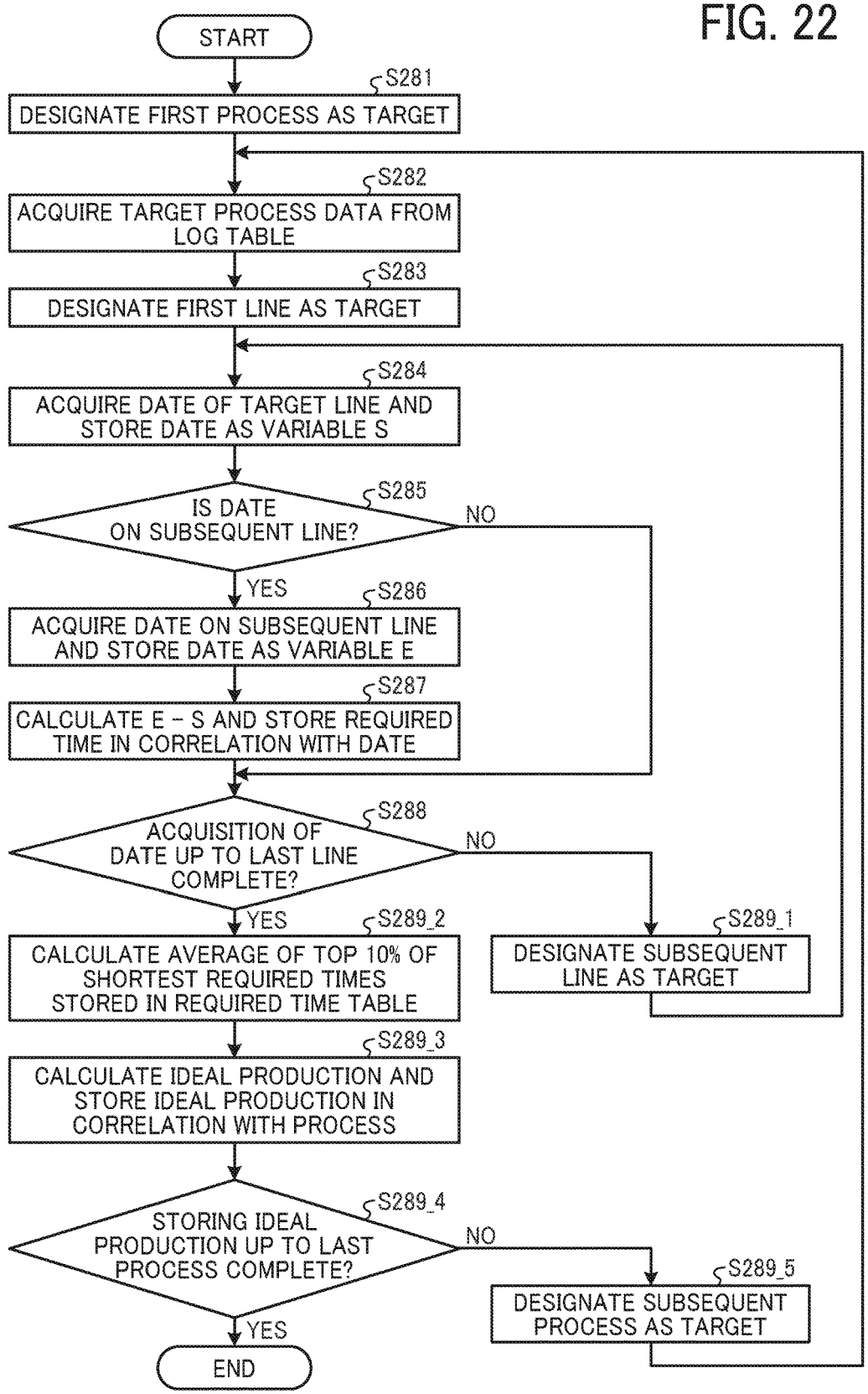
FIG. 22 is a flowchart of example ideal production calculation executed in the heat map updating illustrated in FIG. 17.

FIG. 22 is a flowchart of example ideal production calculation executed in the heat map updating. FIG. 23 illustrates an example required time table. FIG. 24 illustrates an example ideal production table. Referring to FIGS. 22 to 24, descriptions are given below of the ideal production calculation in the heat map updating performed by the information processing apparatus 4 according to the present embodiment.

At S281, the ideal production calculator 415 designates, as the target process, the first process in the log table 720 created by the first log acquisition unit 413.

At S282, the ideal production calculator 415 acquires, as target process data, the logs of the target process from the log table 720 created by the first log acquisition unit 413.

At S283, the ideal production calculator 415 designates the first line of the target process data as a target line.

At S284, the ideal production calculator 415 acquires the date of the target line of the target process data and stores the date as a variable S.

At S285, the ideal production calculator 415 determines whether or not there is a date on a line subsequent to the target line of the target process data. When there is a date on the subsequent line (Yes at S285), the process proceeds to S286. When there is not a date on the subsequent line (No at S285), the process proceeds to S288.

At S286, the ideal production calculator 415 acquires the date on the line subsequent to the target line in the target process data and stores the date in a variable E.

At S287, the ideal production calculator 415 deducts the variable S from the variable E(E−S) to calculate a required time and stores the required time in correlation with the date (=variable S) in, for example, the required time table 740 illustrated in FIG. 23.

At S288, the ideal production calculator 415 determines whether or not acquisition of the date from the target process data has completed up to the last line. When the date acquisition up to the last line has completed (Yes at S288), the process proceeds to S289_2. When the date acquisition up to the last process has not yet completed (No at S288), the process proceeds to S289_1.

At S289_1, the ideal production calculator 415 designates the subsequent line of the target process data as the target line. Then, the process returns to S284.

At S289_2, the ideal production calculator 415 calculates, in the required time table 740, an average of a predetermined rate of shortest ones (e.g., top 10 percent) of the required times stored in the required time table as an average required time.

At S289_3, the ideal production calculator 415 divides the unit time with the average required time to calculate the ideal production (production amount) and stores the ideal production in correlation with the process in, for example, the ideal production table 741 illustrated in FIG. 24.

At S289_4, the ideal production calculator 415 determines whether or not the ideal production storing in the ideal production table 741 has completed up to the last process. When the ideal production storing up to the last process has completed (Yes at S289_4), the ideal production calculation completes. When the ideal production storing up to the last process has not yet completed (No at S289_4), the process proceeds to S289_5.

At S289_5, the ideal production calculator 415 designates the subsequent process as the target process. Then, the process returns to S282.

With the steps S281 to S289_5, the ideal production calculation in the heat map updating is thus executed.

Although the unit time is divided by the average required time to calculate the ideal production in the flowchart in FIG. 22, the ideal production can be calculated otherwise. Variations of determination of ideal production are described with reference to FIGS. 25 to 27. FIG. 25 is a table for identifying a maximum production in each process from the achievement table. FIG. 26 is a table for identifying a maximum production in each unit time for each process from the achievement table. FIG. 27 illustrates an example ideal production table.

In the example illustrated in FIG. 25, the ideal production calculator 415 regards, as the ideal production, the maximum of the productions of respective unit times in each process in the achievement table 730 created by the achievement calculator 414. For example, in the case of "Process 3", the production "96" in the unit time "6" is greater than the production of any other unit time and thus determined as the ideal production of "Process 3".

In the example illustrated in FIG. 26, an ideal production for each process is not determined, but an ideal production common to all processes is determined. For example, in FIG. 26, the production "97" is the greatest of the respective productions in all unit times of all processes and thus determined as the ideal production common to all processes.

In the example illustrated in FIG. 27, the ideal production is not calculated from the achievement table 730, but the user determines an ideal production for each process with an ideal production table 750.

As the ideal production for each process used in the chart drawing to be described later, any of the ideal production calculated at S289_3 and those described with reference to FIGS. 25 to 27 can be used.

Chart Drawing

Figure 28:
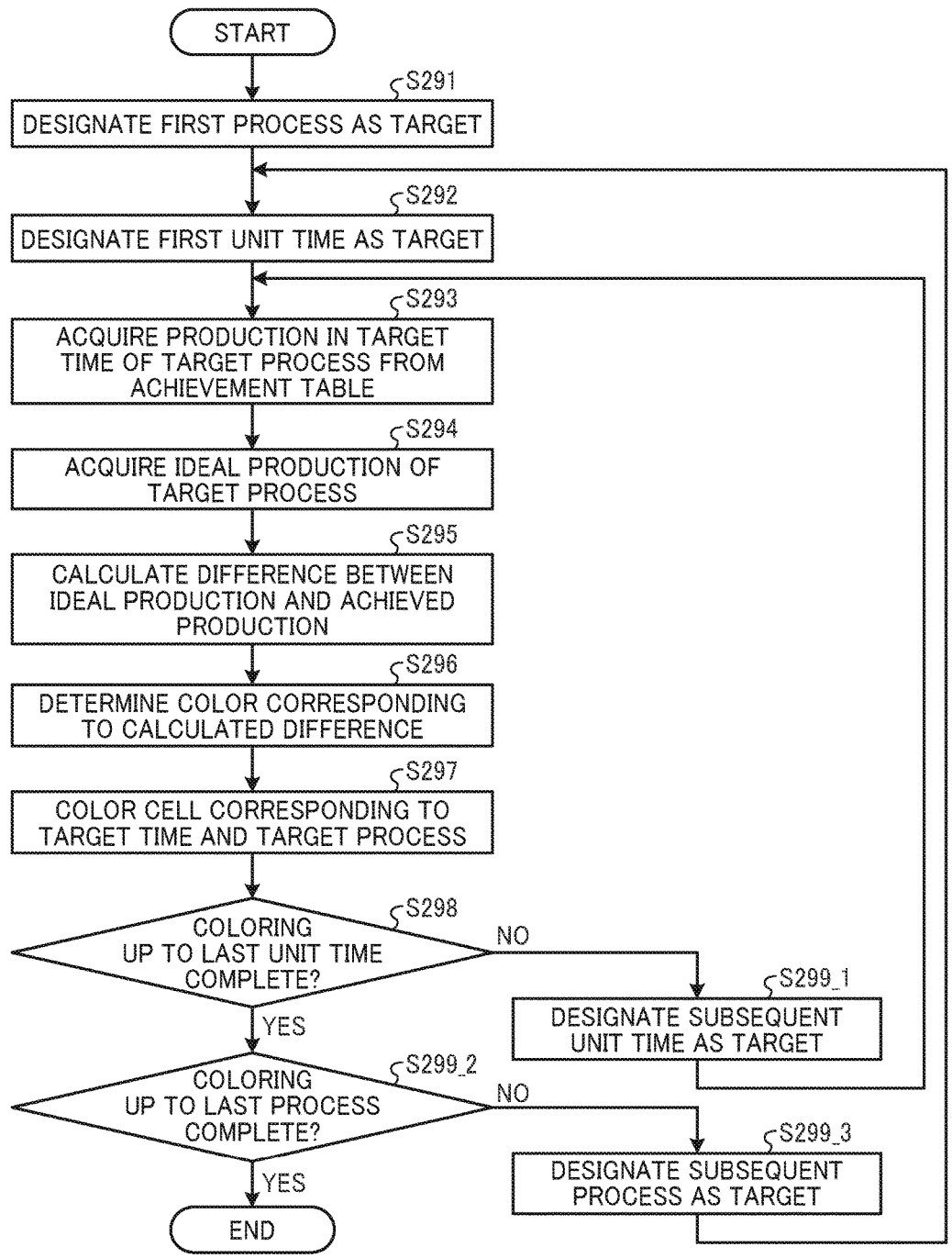
FIG. 28 is a flowchart of an example chart drawing executed in the heat map updating.
Figure 29B:
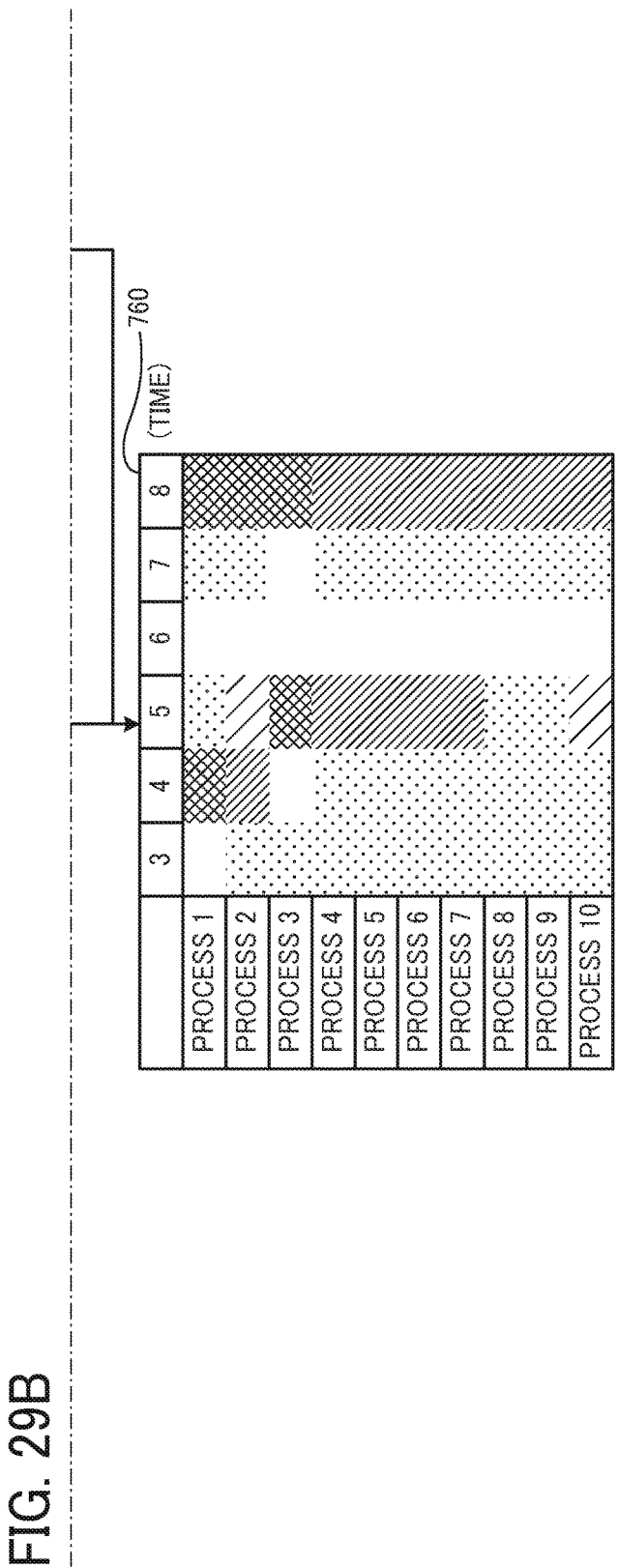

FIG. 28 is a flowchart of an example chart drawing executed in the heat map updating. FIGS. 29A and 29B are a diagram for actions in drawing a heat map in the chart drawing. Referring to FIGS. 28 and 29, descriptions are given below of the chart drawing in the heat map updating performed by the information processing apparatus 4 according to the present embodiment.

At S291, the chart drawing unit 416 designates, as the target process, the first process in the achievement table 730 created by the achievement calculator 414.

At S292, the chart drawing unit 416 designates the first one of unit times as the target time. In the example described here, the duration of unit time is "1 hour". Note that the duration of unit time can be changed in the range changing to be described later. Specifically, in the specified period mode, the chart drawing unit 416 designates the first one of unit times in the period specified by the period setting unit 409, as the target time. By contrast, when the system is not operating in the specified period mode and automatic updating is on, the chart drawing unit 416 designates the unit time including the date at which the heat map updating is started, as the target time. Additionally, when the system is not operating in the specified period mode and manual updating is on, the chart drawing unit 416 designates, as the target time, the unit time including the initial date acquired by the first log acquisition unit 413. For example, when the current time is "5:15", the target unit time is time "5 (5 o'clock)".

At S293, the chart drawing unit 416 acquires the production in the target time of the target process, from the achievement table 730 created by the achievement calculator 414 as illustrated in FIG. 29. For example, in the example illustrated in FIG. 29, the production "93" corresponding to the target process "Process 1" and the target time "3" is acquired.

At S294, the chart drawing unit 416 acquires the ideal production of the target process, from the ideal production table 741 created by the ideal production calculator 415, as illustrated in FIG. 29. For example, in the example illustrated in FIG. 29, the ideal production "96" corresponding to the target process "Process 1" is acquired.

At S295, as illustrated in FIG. 29, the chart drawing unit 416 calculates the difference between the acquired ideal production and the achieved production. For example, in the example illustrated in FIG. 29, the difference "3" between the acquired ideal production "96" and the production "93" is calculated.

At S296, the chart drawing unit 416 determines a color corresponding to the calculated difference between the ideal production and the achieved production, referring to a color table 752 illustrated in FIG. 29. For example, in the example illustrated in FIG. 29, the difference "3" between the ideal production and the achieved production falls in a range from 0 to 10, and the color is determined as "white (colorless)".

At S297, the chart drawing unit 416 colors, with the color determined at S296, the cell corresponding to the target time and the target process of the chart (a heat map 760 in FIG. 29). The chart drawing unit 416 generates the heat map 760 in the image area 607 of the visualization screen 600 illustrated in FIG. 11.

At S298, the chart drawing unit 416 determines whether or not coloring up to the last unit time in the heat map 760 has completed. Specifically, in the specified period mode, the chart drawing unit 416 determines whether or not the coloring has completed up to the last unit time of the period specified by the period setting unit 409. When the system is not operating in the specified period mode, the chart drawing unit 416 determines whether or not the coloring has completed up to the unit time including the current date (i.e., last unit time). When the coloring up to the last unit time has completed (Yes at S298), the process proceeds to S299_2. When the coloring up to the last unit time has not yet completed (No at S298), the process proceeds to S299_1.

At S299_1, the chart drawing unit 416 designates the subsequent unit time as the target time. Then, the process returns to S293.

At S299_2, the chart drawing unit 416 determines whether or not coloring up to the last process in the heat map 760 has completed. When the coloring up to the last process has completed (Yes at S299_2), the chart drawing completes. When the coloring up to the last process has not yet completed (No at S299_2), the process proceeds to S299_3.

At S299_3, the chart drawing unit 416 designates the subsequent process as the target process. Then, the process returns to S292.

With the steps S291 to S299_3, the chart drawing in the heat map updating is thus executed.

As the heat map updating including the log acquisition, the achievement calculation, the ideal production calculation, and the chart drawing is executed as described above, the heat map 760 illustrated in FIGS. 29A and 29B are drawn. The user can refer to the heat map 760 to instantly understand in which time (unit time) and in what process the production is slow and short of the ideal production amount.

Range Changing in Heat Map

Figure 30:
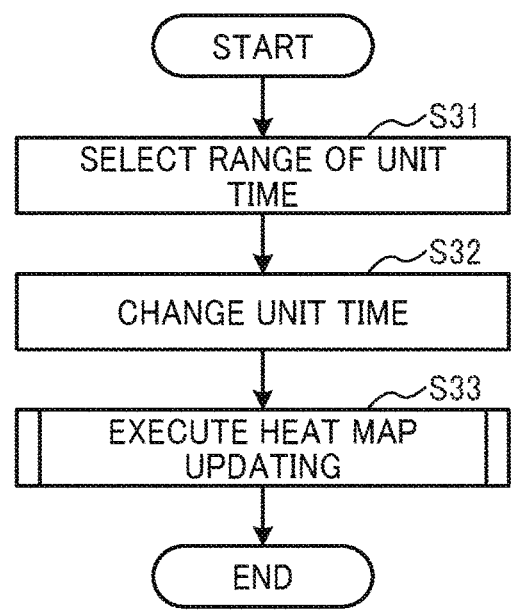
FIG. 30 is a flowchart of an example range changing performed by the information processing apparatus according to an embodiment.
Figure 31:
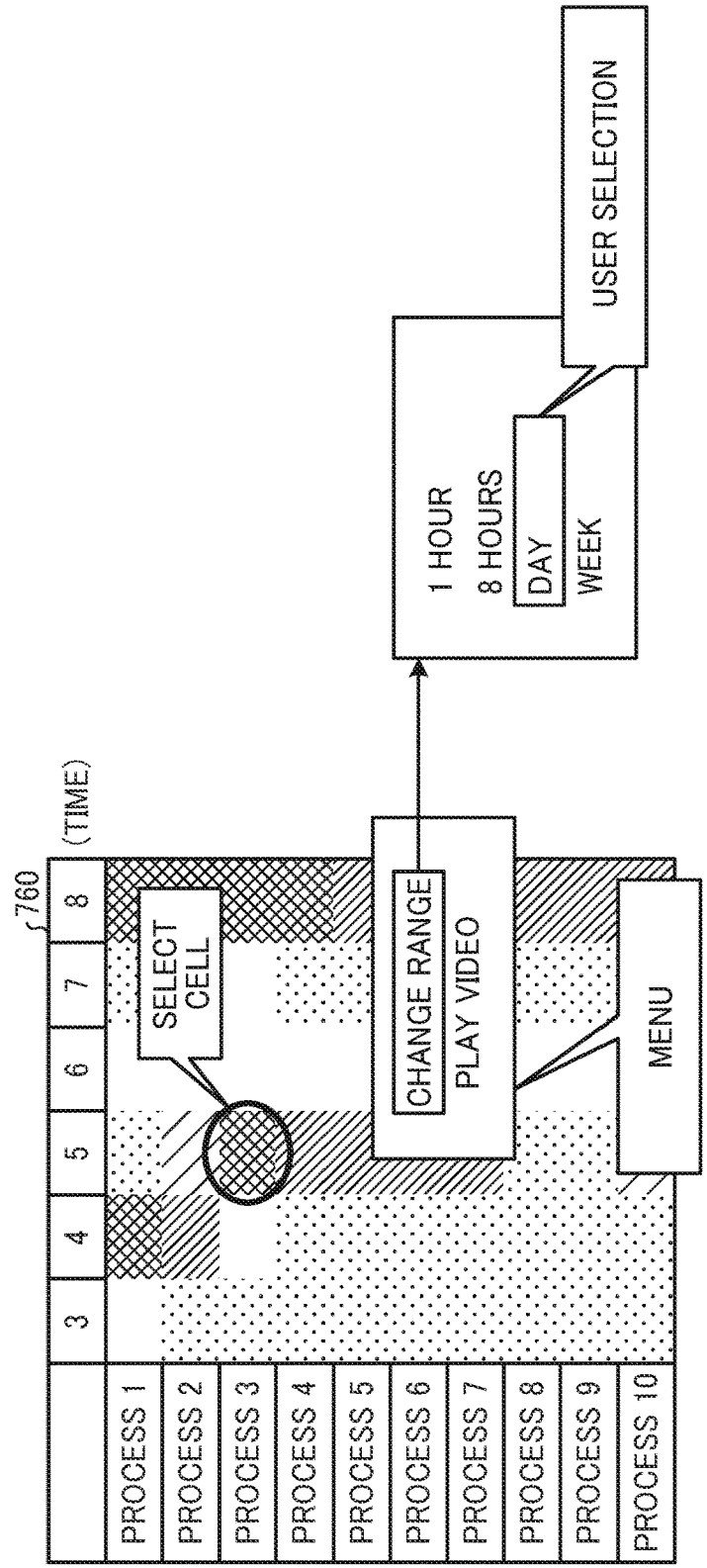
FIG. 31 is a diagram for example actions to change the range on the heat map.

FIG. 30 is a flowchart of an example range changing performed by the information processing apparatus 4 according to the present embodiment. FIG. 31 is a diagram for actions to change the range on the heat map. FIG. 32 is an example heat map in which the range is changed. Although the duration of unit time is one hour in the heat map 760 illustrated in FIG. 29, in some cases, users want a heat map in which the unit time is reduced or increased. Referring to FIGS. 30 to 32, descriptions are given below of changing the range of unit time on the heat map by the information processing apparatus 4 according to the present embodiment.

At S31, the selecting unit 417 selects a cell (an example partial chart) corresponding to a specific process and a specific unit time (e.g., a first setting of unit time) on the heat map (e.g., the heat map 760) drawn by the chart drawing unit 416, according to an input from the input 427 operated by the user. In this case, as illustrated in FIG. 31, a menu for selecting "Change range" or "Play video" appears on the heat map 760. Assuming that the selecting unit 417 selects "Change range" according to an input from the input 427 operated by the user, further, a menu for selecting a range appears. In the example illustrated in FIG. 31, a menu for selecting one of ranges "1 hour", "8 hour", "day", and "week" is displayed. Here, it is assumed that the selecting unit 417 selects "day" according to an input from the input 427 operated by the user. Then, the process proceeds to S32.

At S32, the range change unit 418 changes the range of unit time to the range (i.e., a second setting of unit time), for example, "day" in FIG. 31, selected by the selecting unit 417.

At S33, the first update controller 412 executes the heat map updating at S25 illustrated in FIG. 17, which is described in detail above. As a result, as illustrated in FIG. 32, a heat map 761 in which the range of unit time is changed is drawn in the image area 607 of the visualization screen 600.

Through the steps S31 to S33, the unit time range is changed on the heat map.

Figure 33:
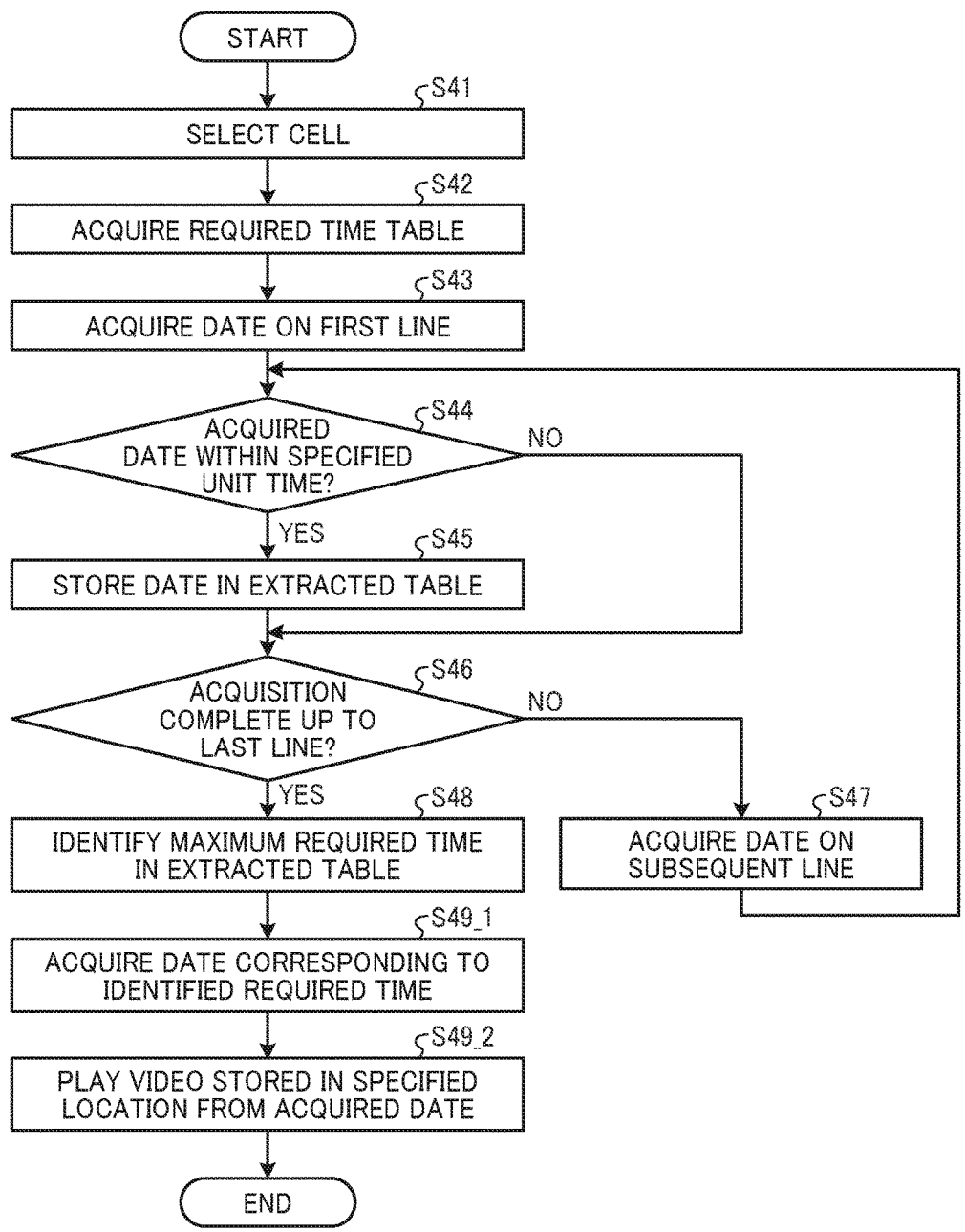
FIG. 33 is a flowchart of playing the selected video performed by the information processing apparatus, according to an embodiment.

Replaying video according to selection on heat map FIG. 33 is a flowchart of an example of playing the selected video performed by the information processing apparatus 4 according to the present embodiment. FIG. 34 is a diagram for explaining an action of extracting an extracted table from the required time table. Referring to FIGS. 33 and 34, descriptions are given below of replaying video according to selection on the heat map, performed by the information processing apparatus 4 according to the present embodiment.

At S41, the selecting unit 417 selects a cell on the heat map (e.g., the heat map 760) drawn by the chart drawing unit 416, according to an input from the input 427 operated by the user. As the selecting unit 417 selects a particular cell on the heat map, the process and the unit time corresponding thereto are specified.

At S42, the time identification unit 419 acquires a required time table (e.g., a required time table 742 illustrated in FIG. 34) corresponding to the process specified by the selecting of the cell by the selecting unit 417, of the respective required time tables of the processes, created by the ideal production calculator 415 in the ideal production calculation of the above-described heat map updating.

At S43, the time identification unit 419 acquires the date and the required time on the first line from the required time table acquired.

At S44, the time identification unit 419 determines whether or not the acquired date falls within the unit time specified by the selecting of the cell by the selecting unit 417. When the acquired date is within the unit time (Yes at S44), the process proceeds to S45. When the acquired date is outside the unit time (No at S44), the process proceeds to S46.

At S45, the time identification unit 419 stores the date and the required time acquired, for example, in an extracted table 743 illustrated in FIG. 34.

At S46, the time identification unit 419 determines whether or not acquisition of the date and the required time from the required time table has completed up to the last line. When the acquisition up to the last line has completed (Yes at S46), the process proceeds to S48. When the acquisition up to the last process has not yet completed (No at S46), the process proceeds to S47.

At S47, the time identification unit 419 acquires the date and the required time on the subsequent line from the required time table acquired. Then, the process returns to S44.

At S48, the time identification unit 419 identifies a maximum required time in the extracted table 743 created. In the extracted table 743 illustrated in FIG. 34, "661" is identified as the maximum required time. Note that the time identification unit 419 does not necessarily identify the maximum required time in the extracted table 743. Alternatively, the time identification unit 419 can identify a minimum required time. In some cases, the user would desire to know in which state the required time is shortest and the production efficiency is highest. Yet alternatively, the time identification unit 419 can read from the top of the extracted table 743 and identify a required time equal to or greater than a predetermined threshold. Then, the process proceeds to S49_1.

At S49_1, the time identification unit 419 acquires the date corresponding to the maximum required time identified in the extracted table 743. In the extracted table 743 illustrated in FIG. 34, the date "2017/2/23 3:14" corresponding to the maximum required time "661" is acquired. Then, the process proceeds to S49_2.

At S49_2, the selected data player 420 acquires the video captured by the view camera 3 correlated to the specified process, from the storage location specified in the association file set by the association unit 407 and plays the video from the date acquired by the time identification unit 419 at S49_1. In this case, the selected data player 420 can play the video on a screen different from the visualization screen 600. Then, the process completes.

Through the above-described steps S41 to S49_2, replaying the video according to selection on the heat map is executed.

Although the chart setting unit 410 generates the heat map as the chart in the description above with reference to FIGS. 29 and 31, the chart is not limited thereto. Types of charts drawn by the chart setting unit 410 are described below with reference to FIGS. 35A and 35B.

Figure 35A:
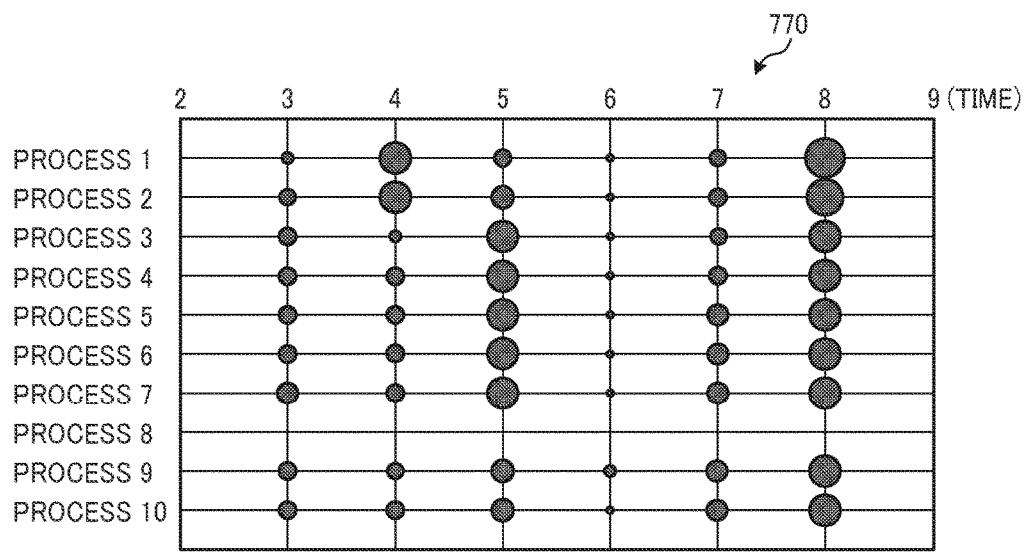
FIGS. 35A and 35B illustrate example types of charts drawn by the chart drawing unit.

FIG. 35A illustrates a bubble chart 770 as an example chart drawn by the chart setting unit 410. The bubble chart 770 represents, with bubble size, the magnitude of difference between the ideal production amount and the achieved production amount of each unit time of each process.

Figure 35B:
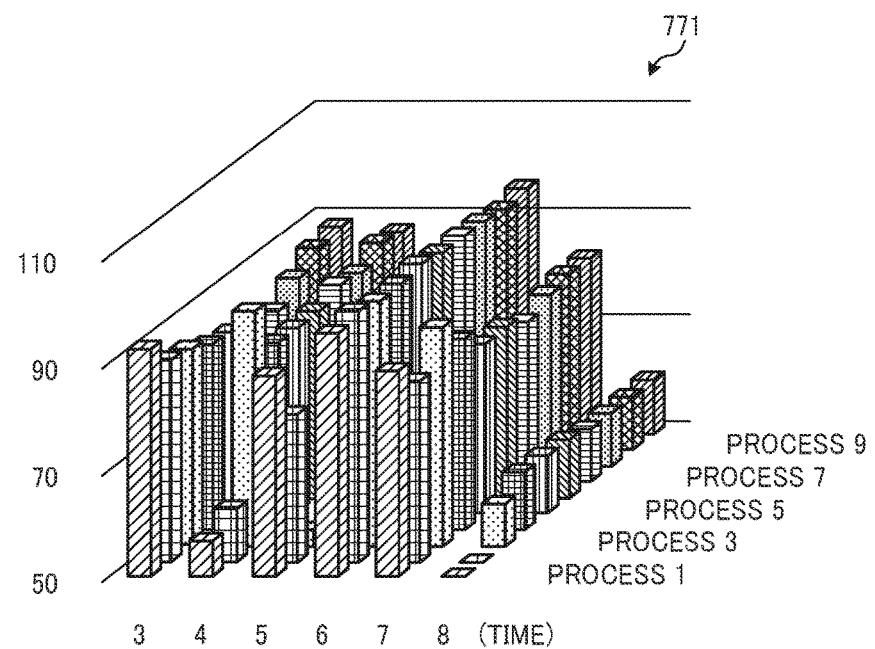

FIG. 35B illustrates a bar chart 771 as an example chart drawn by the chart setting unit 410. The bar chart 771 represents, with bar height, the magnitude of difference between the ideal production amount and the achieved production amount of each unit time of each process. Also with the charts other then the heat map, the user can instantly understand in which time (unit time) and in what process the production is slow and short of the ideal production amount.

In the flowchart illustrated in FIG. 33, although the time identification unit 419 identifies the maximum required time in the extracted table 743, alternatively, the time identification unit 419 can identify the date on the first line of the extracted table 743. With this action, the video for the entire unit time corresponding to the selected cell can be observed.

Predicted Achievement Updating

Figure 36:
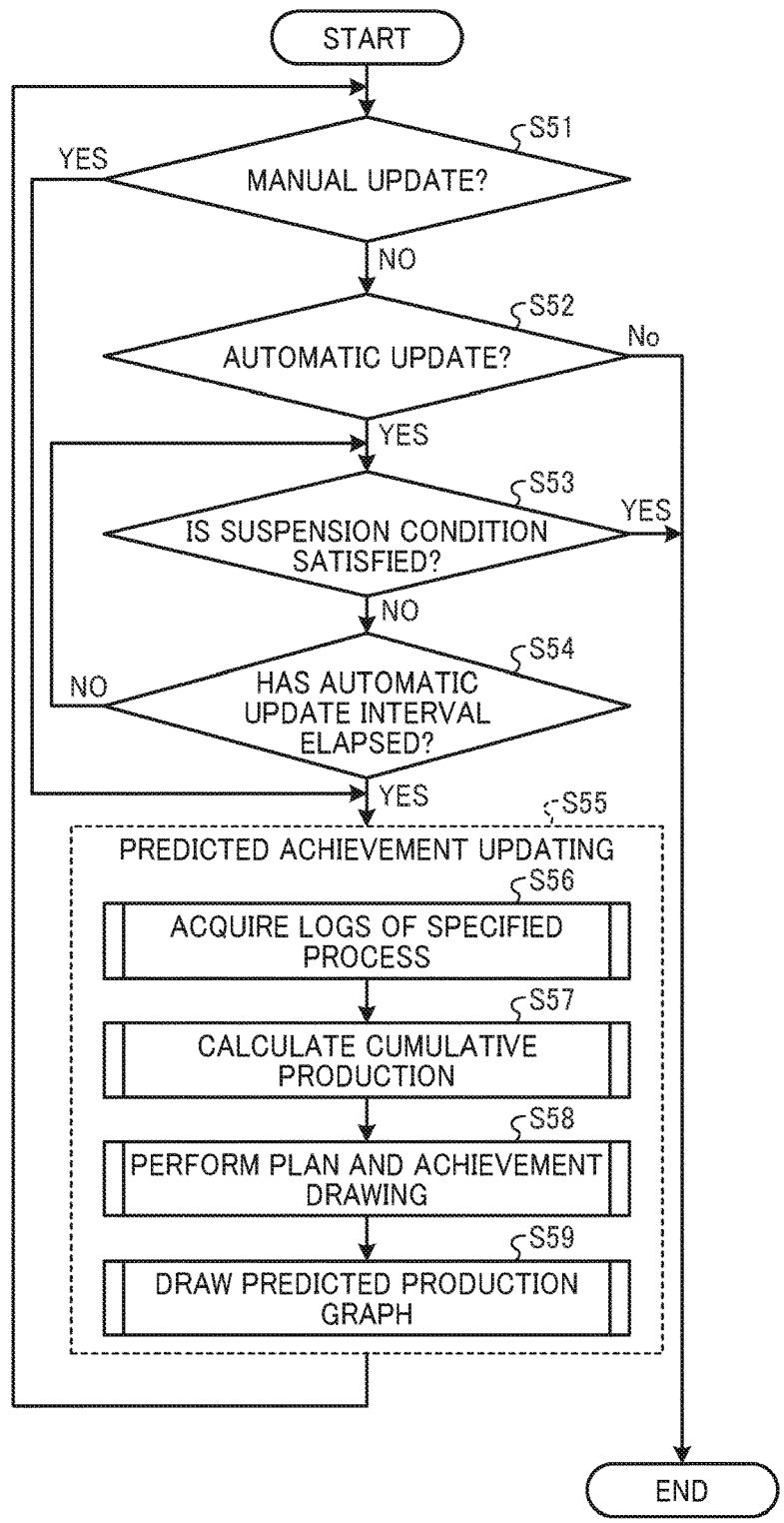
FIG. 36 is a flowchart of an example of the predicted achievement updating performed by the information processing apparatus according to an embodiment.

FIG. 36 is a flowchart of an example of the predicted achievement updating performed by the information processing apparatus 4 according to the present embodiment. Referring to FIG. 36, descriptions are given below of the predicted achievement updating performed by the information processing apparatus 4 according to the present embodiment.

At S51, the second update controller 421 determines whether or not the manual update button 614 is pressed on the visualization screen 600. When the manual update button 614 is pressed (Yes at S51), the process proceeds to S55. When the manual update button 614 is not pressed (No at S51), the process proceeds to S52. As the manual update button 614 is pressed, manually executing the predicted achievement updating is selected.

At S52, the second update controller 421 determines whether or not the automatic update button 613 is pressed on the visualization screen 600 to select automatic executing of the predicted achievement updating. When the automatic execution of the predicted achievement updating (automatic updating) is selected (Yes at S52), the process proceeds to S53. When automatic updating is not selected (No at S52), the process ends.

At S53, the second update controller 421 determines whether or not a suspension condition for the automatic executing of the predicted achievement updating is satisfied. The suspension condition includes, for example, cancellation (restoring) of the automatic update button 613, expiration of duration of data acquisition set on a chart setting screen (similar to the chart setting screen 630), and closing of the visualization screen 600. When the suspension condition is satisfied (Yes at S53), the process ends. When the suspension condition is not satisfied (No at S53), the process proceeds to S54.

At S54, the second update controller 421 determines whether or not the automatic update interval (a constant time) set on the chart setting screen has elapsed. When the automatic update interval has elapsed (Yes at S54), the process proceeds to S55. When the automatic update interval has not yet elapsed (No at S54), the process returns to S53.

At S55, the second update controller 421 executes the predicted achievement updating through S56 to S59.

At S56, the specified process log acquisition is executed. Details of the specified process log acquisition are described later with reference FIGS. 37 and 38. After the specified process log acquisition completes, the process proceeds to S57.

At S57, the cumulative production calculation is executed. The cumulative production calculation is described in detail later with reference FIGS. 39 and 40. After the cumulative production calculation completes, the process proceeds to S58.

At S58, the plan and achievement drawing is performed, which is described in detail later with reference FIGS. 41 and 42. After the plan and achievement drawing completes, the process proceeds to S59.

At S59, the predicted production graph is drawn, which is described in detail later with reference FIGS. 43 to 47. After the prediction drawing completes, the process returns to S51.

With the steps S51 to S59, the predicted achievement updating is executed.

Specified Process Log Acquisition

Figure 37:
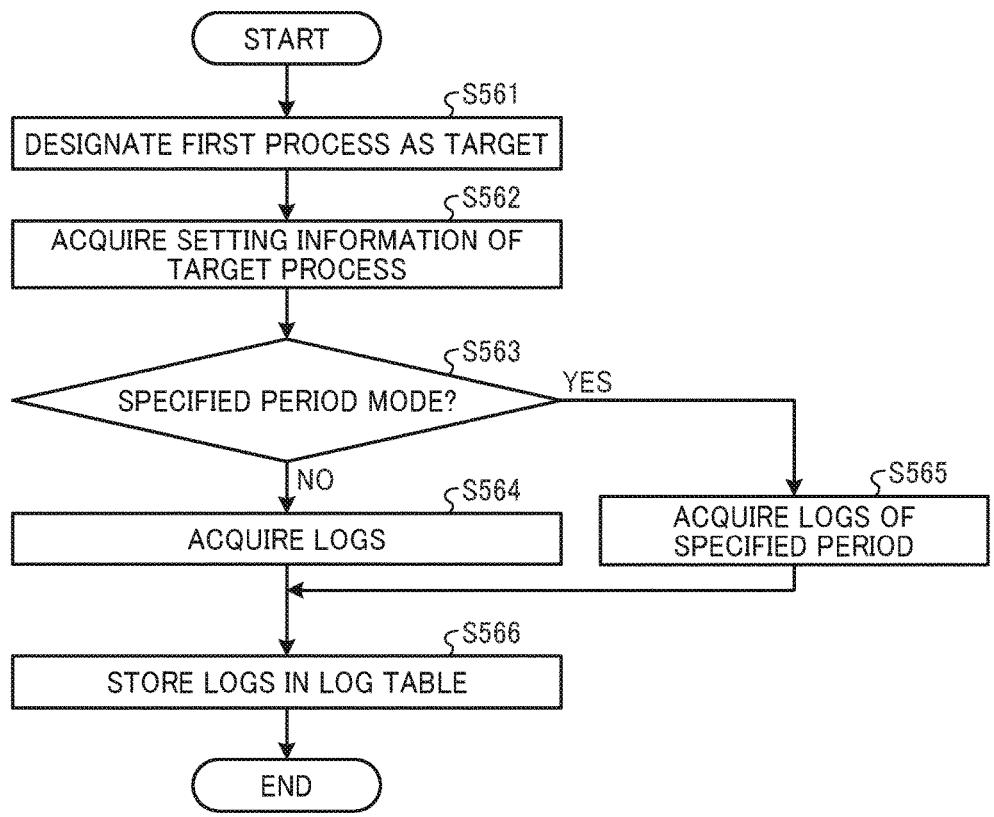
FIG. 37 is a flowchart of an example of specified process log acquisition executed in the predicted achievement updating.

FIG. 37 is a flowchart of an example of specified process log acquisition executed in the predicted achievement updating. FIG. 38 illustrates an example log table generated in the specified process log acquisition. Referring to FIGS. 37 and 38, descriptions are given below of the specified process log acquisition in the predicted achievement updating performed by the information processing apparatus 4 according to the present embodiment.

At S561, the second log acquisition unit 422 designates, as the target process, a process specified by the chart setting unit 410.

At S562, the second log acquisition unit 422 reads the association file (e.g., the association file 710 illustrated in FIG. 13) set by the association unit 407 and acquires the setting information relating to the specified target process.

At S563, the second log acquisition unit 422 determines whether or not the period setting unit 409 has set the specified period mode. When the system is not operating in the specified period mode (No at S563), the process proceeds to S564. When the system is operating in the specified period mode (Yes at S563), the process proceeds to S565.

At S564, when the system is not operating in the specified period mode, the second log acquisition unit 422 refers to the production log in the storing unit 428 based on the storage location specified in the association file and acquires a log of the current date, of the target process. For example, in the manual updating, a predetermined number of logs up to the current date can be acquired. In the automatic updating, after acquiring the log of the current date, in subsequent long acquisition, the logs of a period starting from the date subsequent to the date of the acquired log until the date of execution of log acquisition can be acquired.

At S565, when the system is operating in the specified period mode, the second log acquisition unit 422 refers to the production log in the storing unit 428 based on the storage location specified in the association file and acquires logs in the period set by the period setting unit 409, of the target process.

At S566, the second log acquisition unit 422 stores the logs acquired from the production log in, for example, a log table 721 illustrated in FIG. 38.

With the steps S561 to S566, the specified process log acquisition in the predicted achievement updating is thus executed.

Cumulative Production Calculation

Figure 39:
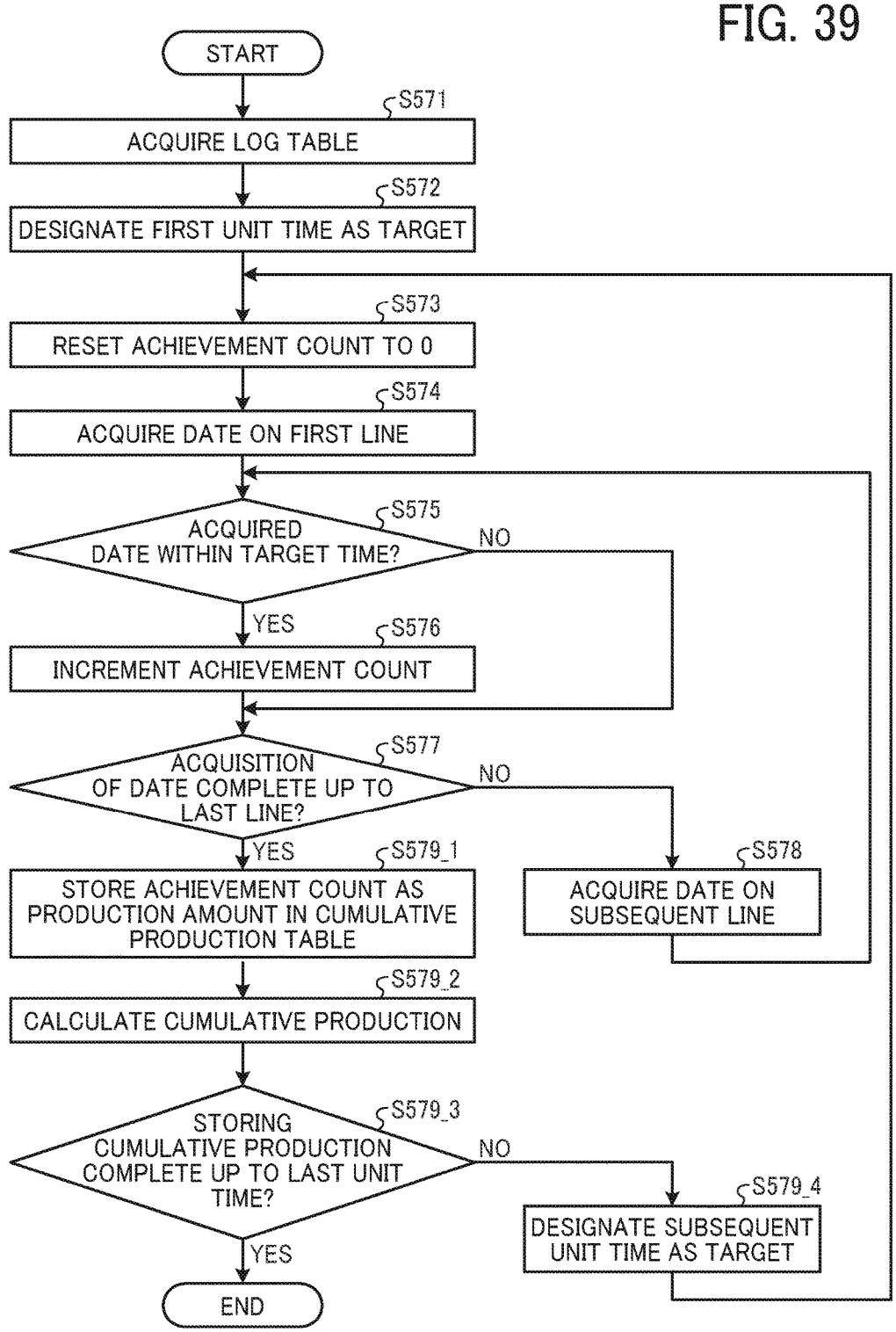
FIG. 39 is a flowchart of an example of cumulative production calculation executed in the predicted achievement updating.

FIG. 39 is a flowchart of an example of cumulative production calculation executed in the predicted achievement updating. FIG. 40 illustrates an example cumulative production table. Referring to FIGS. 39 and 40, descriptions are given below of the cumulative production calculation in the predicted achievement updating performed by the information processing apparatus 4 according to the present embodiment.

At S571, the cumulative summing unit 423 acquires the log table 721 created by the second log acquisition unit 422.

At S572, the cumulative summing unit 423 designates the first one of unit times as the target time. In the example described here, the duration of unit time is "1 hour". Specifically, in the specified period mode, the cumulative summing unit 423 designates, as the target time, the first unit time in the period specified by the period setting unit 409. By contrast, when the system is not operating in the specified period mode and automatic updating is on, the cumulative summing unit 423 designates the unit time including the date at which the predicted achievement updating is started, as the target time. Additionally, when the system is not operating in the specified period mode and manual updating is on, the cumulative summing unit 423 designates the unit time including the initial date acquired by the second log acquisition unit 422, as the target time. For example, when the current time is "5:15", the target unit time is time "5 (5 o'clock)".

At S573, the cumulative summing unit 423 resets the achievement count (a variable inside software) to "0".

At S574, the cumulative summing unit 423 acquires the date on the first line from the log table 721.

At S575, the cumulative summing unit 423 determines whether or not the acquired date is within the target time. When the acquired date is within the target time (Yes at S575), the process proceeds to S576. When the acquired date is outside the target time (No at S575), the process proceeds to S577.

At S576, the cumulative summing unit 423 increments the achievement count.

At S577, the cumulative summing unit 423 determines whether or not acquisition of the date from the log table 721 has completed up to the last line. When the date acquisition up to the last line has completed (Yes at S577), the process proceeds to S579_1. When the date acquisition up to the last process has not yet completed (No at S577), the process proceeds to S578.

At S578, the cumulative summing unit 423 acquires the date on the subsequent line from the log table 721.

Figures 40, 41:
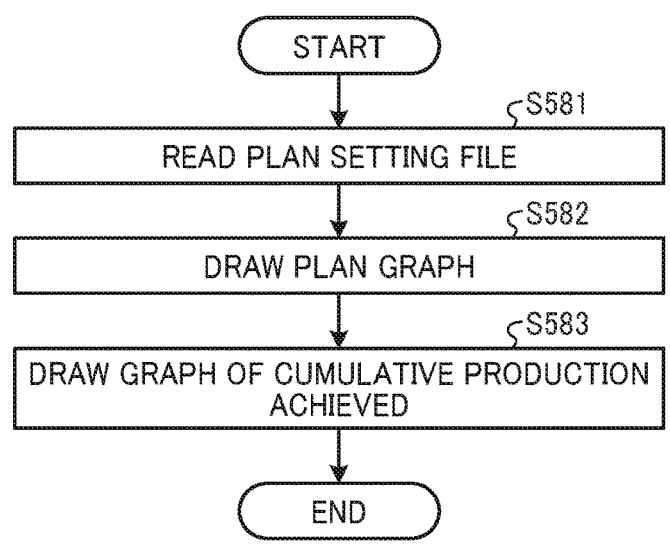
FIG. 40 illustrates an example cumulative production table.
FIG. 41 is a flowchart of plan and achievement drawing executed in the predicted achievement updating, according to an embodiment.

At S579_1, the cumulative summing unit 423 stores, as the production amount, the value of the achievement count on the line corresponding to the unit time that is the target time of, for example, a cumulative production table 780 illustrated in FIG. 40.

At S579_2, the cumulative summing unit 423 calculates, as the cumulative production, the sum of the productions from the first line to the line corresponding to the target time from the cumulative production table 780 storing the achievement count values, and stores the cumulative production on the line corresponding to the target time.

At S579_3, the cumulative summing unit 423 determines whether or not storing of the production and the cumulative production in the cumulative production table 780 has completed up to the last unit time. Specifically, in the specified period mode, the cumulative summing unit 423 determines whether or not the storing has completed up to the last unit time of the period specified by the period setting unit 409. When the system is not operating in the specified period mode, the cumulative summing unit 423 determines whether or not the storing has completed up to the unit time including the current date (i.e., last unit time). When the storing up to the last unit time has completed (Yes at S579_3), the cumulative production calculation completes. When the storing up to the last unit time has not yet completed (No at S579_3), the process proceeds to S579_4.

At S579_4, the cumulative summing unit 423 designates the subsequent unit time as the target time.

Through the steps S571 to S579_4, the cumulative production calculation in the predicted achievement updating is thus executed.

Plan and Achievement Drawing

FIG. 41 is a flowchart of an example of plan and achievement drawing executed in the predicted achievement updating. FIG. 42 is a chart illustrating examples of the plan graph and the achievement graph drawn in the plan and achievement drawing. Referring to FIGS. 41 and 42, descriptions are given below of the plan and achievement drawing in the predicted achievement updating performed by the information processing apparatus 4 according to the present embodiment.

At S581, the graph drawing unit 424 reads the plan setting file created in the production planning by the planning unit 411, from the storing unit 428.

Figure 42:
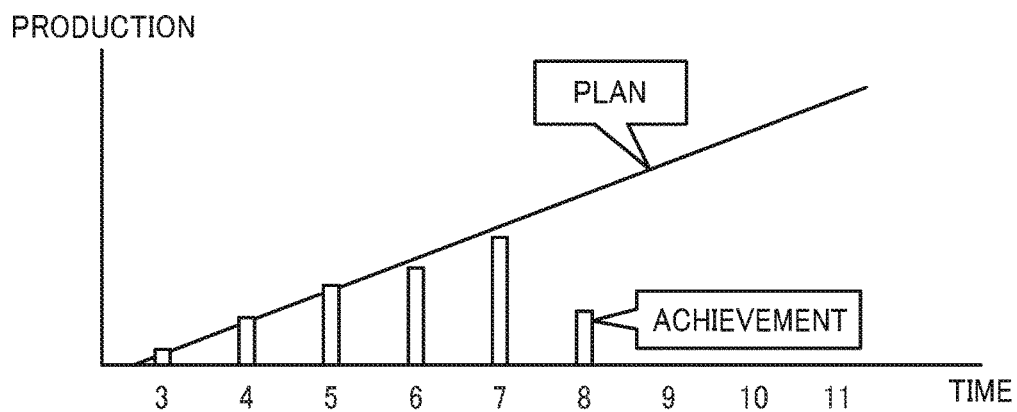
FIG. 42 is a chart illustrating a plan graph and an achievement graph drawn in the plan and achievement drawing, according to an embodiment.

At S582, the graph drawing unit 424 draws a plan graph as illustrated in FIG. 42, in the image area 617 of the visualization screen 600 illustrated in FIG. 11, based on the start time, the end time, and the target production amount (planned amount) specified in the plan setting file thus read.

At S583, the graph drawing unit 424 draws the achievement graph representing the cumulative production (the bar chart in FIG. 42) corresponding to each unit time, based on the cumulative production table (e.g., the cumulative production table 780 illustrated in FIG. 40) created by the cumulative summing unit 423, together with the plan graph illustrated in the image area 617. Then, the plan and achievement drawing completes.

Through the steps S581 to S583, the plan and achievement drawing in the predicted achievement updating is thus executed.

Note that the plan setting file read at S581 is not limited to the file created in the production planning by the planning unit 411. That is, the plan setting file can be preliminarily set by an external device, and the graph drawing unit 424 can receive the plan setting file from the external device via the network 5.

Prediction Drawing Processing

Figure 43:
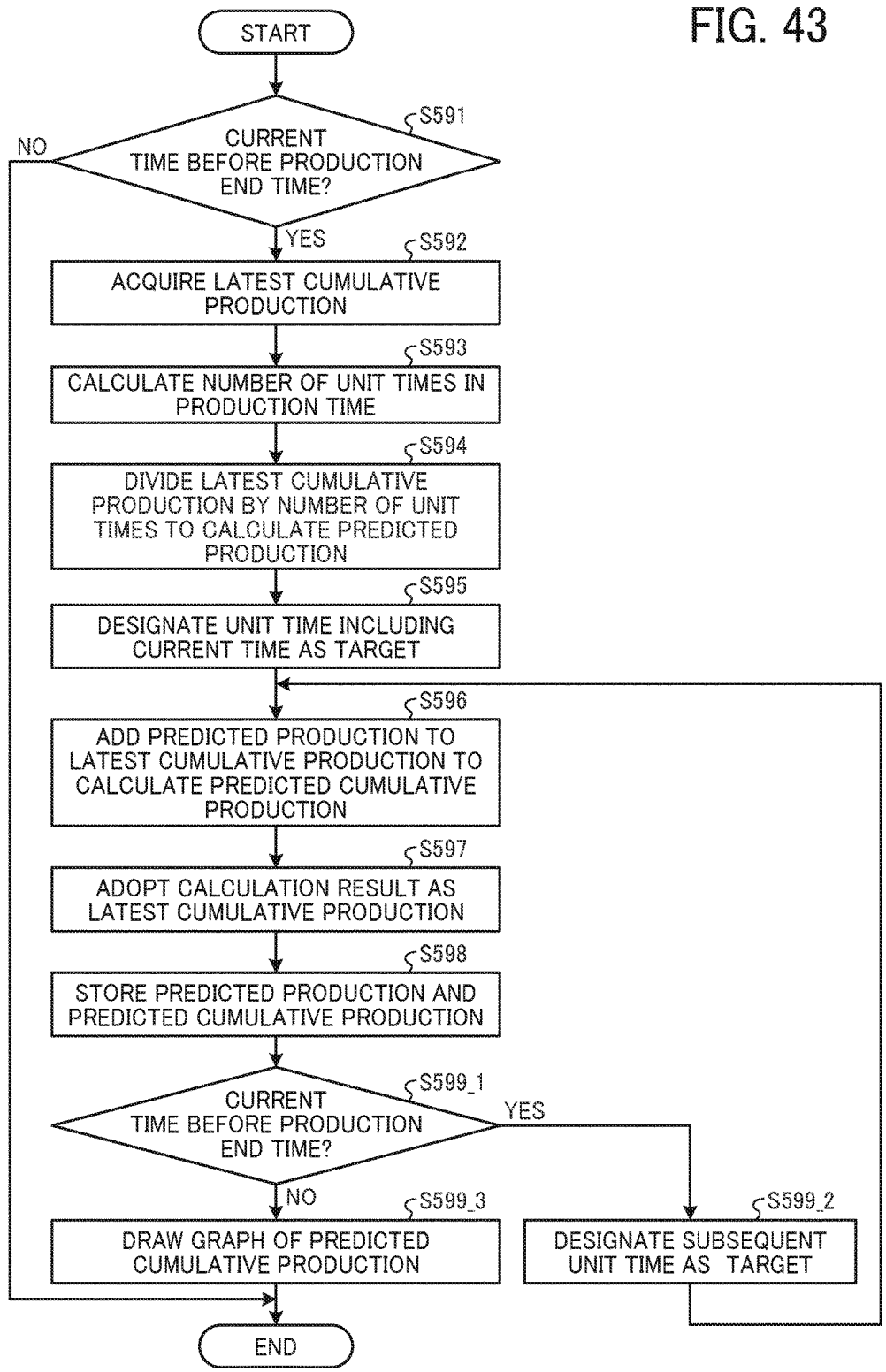
FIG. 43 is a flowchart of an example of prediction drawing executed in the predicted achievement updating.
Figures 44, 45:
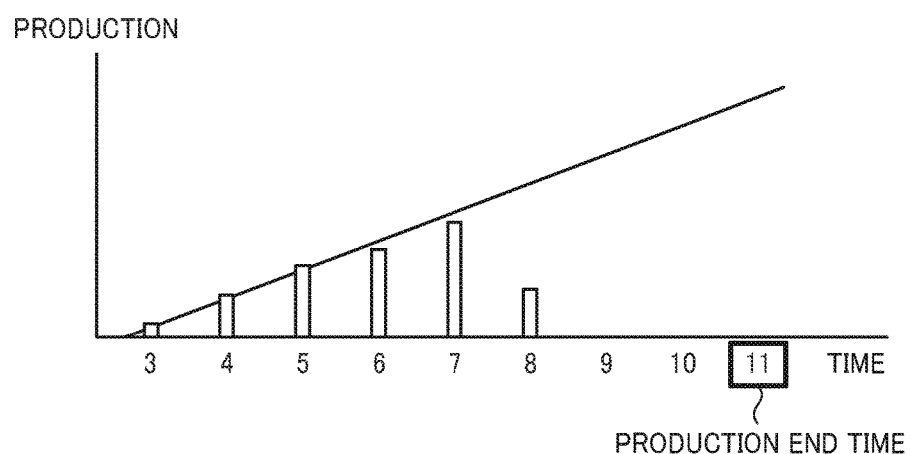
FIG. 44 is a chart for explaining determination of production end time according to an embodiment.
FIG. 45 is a table for explaining determination of latest cumulative production amount and the number of unit times from the cumulative production table, according to an embodiment.
Figures 46, 47:
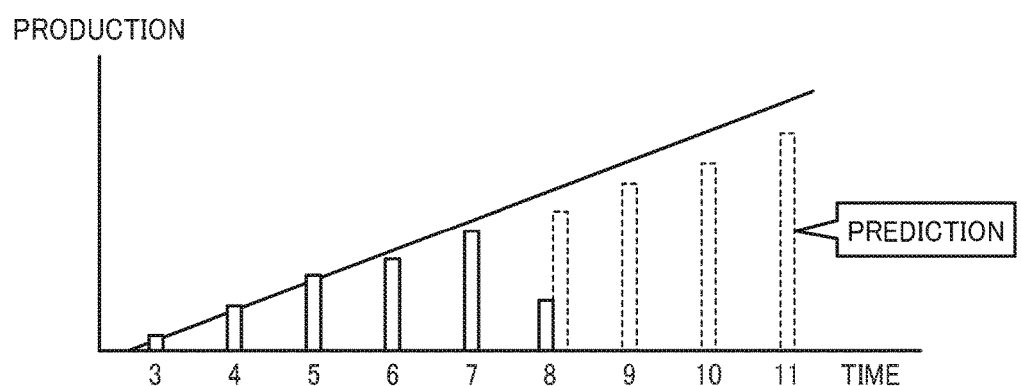
FIG. 46 illustrates a prediction table according to an embodiment.
FIG. 47 is a chart for drawing a prediction graph added to the plan graph and the achievement graph, according to an embodiment.

FIG. 43 is a flowchart of an example of prediction drawing executed in the predicted achievement updating. FIG. 44 is a chart for explaining determination of production end time. FIG. 45 is a table for explaining determination of latest cumulative production and the number of unit times from the cumulative production table. FIG. 46 illustrates an example prediction table. FIG. 47 is a chart for explaining the drawing of the prediction graph added to the plan graph and the achievement graph. Referring to FIGS. 43 to 47, descriptions are given below of the prediction drawing in the predicted achievement updating performed by the information processing apparatus 4 according to the present embodiment.

At S591, the prediction drawing unit 425 determines whether or not the current time is before the production end time. The term "production end time" used here can be, for example, a predetermined time, the end time specified in the plan setting file created by the planning unit 411, or end time of the specified period set by the period setting unit 409. For example, in FIG. 44, the production end time is 11 o'clock. When the current time is before the production end time (Yes at S591), the process proceeds to S592. When the current time has reached the production end time (No at S591), the prediction drawing completes.

At S592, the prediction drawing unit 425 acquires the latest cumulative production from the cumulative production table (e.g., the cumulative production table 780 illustrated in FIG. 45) created by the cumulative summing unit 423. Specifically, in the cumulative production table 780 illustrated in FIG. 45, since the current time is between 8 o'clock and 9 o'clock, the prediction drawing unit 425 acquires the cumulative production "423" between 7 o'clock and 8 o'clock as the latest cumulative production. Then, the process proceeds to S593.

At S593, the prediction drawing unit 425 calculates the number of unit times from the production start time to the time corresponding to the latest cumulative production in the cumulative production table. In the cumulative production table 780 illustrated in FIG. 45, the prediction drawing unit 425 calculates the number of unit times "5" from the production start time "3 o'clock" to the time "7 o'clock" corresponding to the latest cumulative production. Then, the process proceeds to S594.

At S594, the prediction drawing unit 425 divides the acquired latest cumulative production by the calculated number of unit times to calculate a predicted production (production amount, an example predicted count number).

At S595, the prediction drawing unit 425 designates the unit time including the current time as the target time. In the cumulative production table 780 illustrated in FIG. 45, since the current time is between 8 o'clock and 9 o'clock, the prediction drawing unit 425 designates the unit time starting at 8 o'clock as the target time. Then, the process proceeds to S596.

At S596, the prediction drawing unit 425 adds together the latest cumulative production and the calculated predicted production to calculate a predicted cumulative production (production amount, an example predicted cumulative count number).

At S597, the prediction drawing unit 425 adopts the predicted cumulative production calculated at S596 as an updated latest cumulative production.

At S598, the prediction drawing unit 425 adds the predicted production ("84" in FIG. 46) and the predicted cumulative production calculated at S596 ("507" in FIG. 46) to the cumulative production table 780 illustrated in FIG. 45, that is, stores these values on the line corresponding to the target time in the prediction table 781 illustrated in FIG. 46. Then, the process proceeds to S599_1.

At S599_1, the prediction drawing unit 425 determines whether or not the target time is before the production end time. When the target time is before the production end time (Yes at S599_1), the process proceeds to S599_2. When the current time has reached the production end time (No at S599_1), the process proceeds to S599_3.

At S599_2, the prediction drawing unit 425 designates the subsequent unit time as the target time. Then, the process returns to S596.

At S599_3, the prediction drawing unit 425 draws a prediction graph (the bar chart in FIG. 47) representing the predicted cumulative production stored in the prediction table 781, together with the plan graph and the achievement graph, in the image area 617. Then, the prediction drawing completes.

As described above, as the predicted achievement updating, which includes the specified process log acquisition, the cumulative production calculation, the plan and achievement drawing, and the prediction drawing processing, is performed, the plan graph, the achievement graph, and the prediction graph illustrated in FIGS. 42 and 47 are drawn. Referring to the plan graph, the achievement graph, and the prediction graph, the user can know the rate of the achievement relative to the plan, a final production predicted from the current achievement, and required improvement in production efficiency to achieve the plan, based on the achievement and the prediction, and the like.

In the present embodiment, the logs of each process are acquired in the log acquisition, and the amount achieved (achievement value) in each process is calculated in the achievement calculation. Further, the ideal amount used as a reference to be compared with the achievement value is calculated in the ideal production calculation. Further, a chart (e.g., a heat map) is generated in the chart drawing for each process, based on the comparison between the achievement value and the reference, and the visual representation of the result of comparison is different according to the result of comparison. With such processing, regardless of the order of processes of the facilities, the state of each process can be visualized, and the user can instantly know the state of each process regardless of other processes.

Variation 1

Descriptions are given below of an information processing system according to Variation 1, focusing on differences from the above-described information processing system 1. In the above-described embodiment, descriptions are given of generation of the production log based on the video data captured by the data collecting cameras 2. In the present variation, descriptions are given of use of production logs collected by production facilities. Note that the information processing apparatus according to the present variation is similar in hardware configuration to that described in the above-described embodiment.

General Arrangement of Information Processing System

Figure 48:
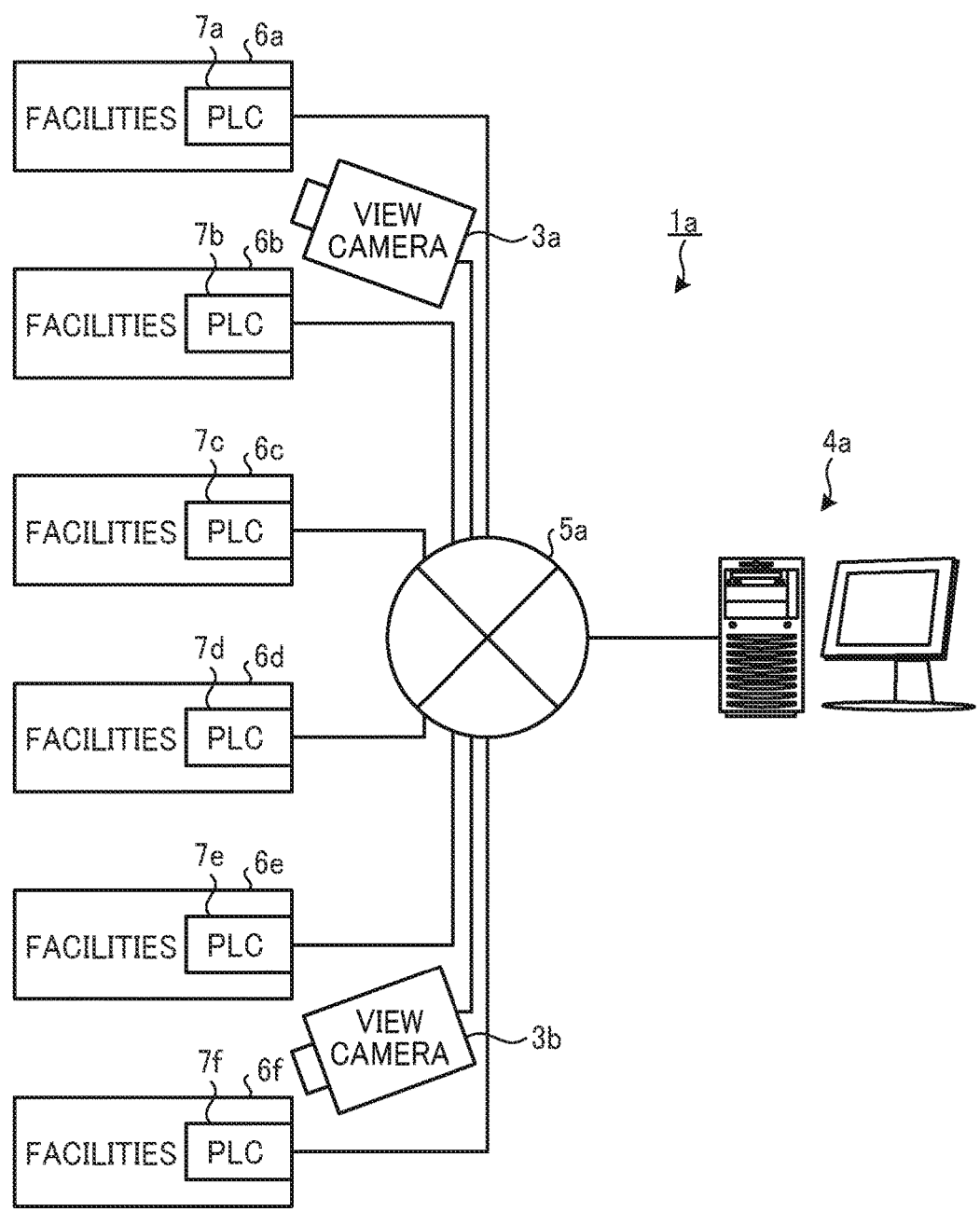
FIG. 48 is a diagram illustrating a general arrangement of an information processing system according to Variation 1.

FIG. 48 is a diagram illustrating a general arrangement of an information processing system 1a according to Variation 1. Descriptions are given of the general structure of an information processing system 1a according to the present embodiment with reference to FIG. 48.

The information processing system 1a illustrated in FIG. 48 includes the view cameras 3a and 3b and an information processing apparatus 4a. The view cameras 3a and 3b can transmit data to and receive data from the information processing apparatus 4a via a network 5a. Programmable logic controller (PLC) 7a to 7f respectively mounted in facilities 6a to 6f (an example situation grasping unit) can transmit data to and receive data from the information processing apparatus 4a via the network 5a.

The view cameras 3a and 3b are video cameras to convert light from an object into electric signals to obtain an image of the object and generate video data that is a motion video constructed of a plurality of frames. The view cameras 3a and 3b generate video data based on an operation made on a specific cell on a heat map. The data is for displaying a picture corresponding to that cell.

The view cameras 3a and 3b are referred to as "view cameras 3" when collectively referred to, or discrimination is not necessary. Although the information processing system 1a illustrated in FIG. 48 includes two view cameras 3, the number of the view cameras 3 is not limited thereto.

The information processing apparatus 4a is, for example, a computer (e.g., personal computer or PC) or a work station to receive a production log generated from collected logs of detection of works in the PLCs 7a to 7f of the facilities 6a to 6f. The information processing apparatus 4a draws a heat map or a graph based on the production log.

The network 5a is, for example, an Ethernet network to enable the data communication between the view cameras 3a and 3b and the PLCs 7a to 7f. In this case, the network 5a performs data communication using a protocol such as TCP/IP. Additionally, in this case, the view cameras 3a and 3b, the PLCs 7a to 7f, and the information processing apparatus 4a have media access control (MAC) addresses for communication using the TCP/IP protocol, and IP addresses such as private IP addresses are allocated thereto.

The facilities 6a to 6f provide production process of works (products or product components) such as machining, press-fitting, length measurement, assembling, tightening, or inspection.

Note that the facilities 6a to 6f are referred to as "facilities 6" when discrimination is not necessary or are collectively referred to. Although six facilities 6 are coupled to the network 5a in FIG. 48, the number of the facilities 6 coupled to the network 5a is not limited thereto.

The PLCs 7a to 7f are industrial control equipment to control the operation of actuators, calculation, and indications on displays in the facilities 6a to 6f, respectively.

Note that the PLCs 7a to 7f are referred to as "PLCs 7" when collectively referred to, or discrimination is not necessary.

Note that the standard of the network 5a to enable data communication between the PLCs 7a to 7f and the information processing apparatus 4a is not limited to Ethernet but can be, for example, fieldbus standards. That is, different network standards can be mixed in the network 5a.

The network 5a is not limited to a wired network, but a portion of the network which can be wireless.

Although the network 5a illustrated in FIG. 48 is for TCP/IP communication, the communication is not limited thereto. For example, the information processing apparatus 4a includes VGA terminals or USB ports so that the plurality of view cameras 3 are coupled to the information processing apparatus 4a via VGA cables or USB cables.

Functional Block Configuration of Information Processing Apparatus

Figure 49:
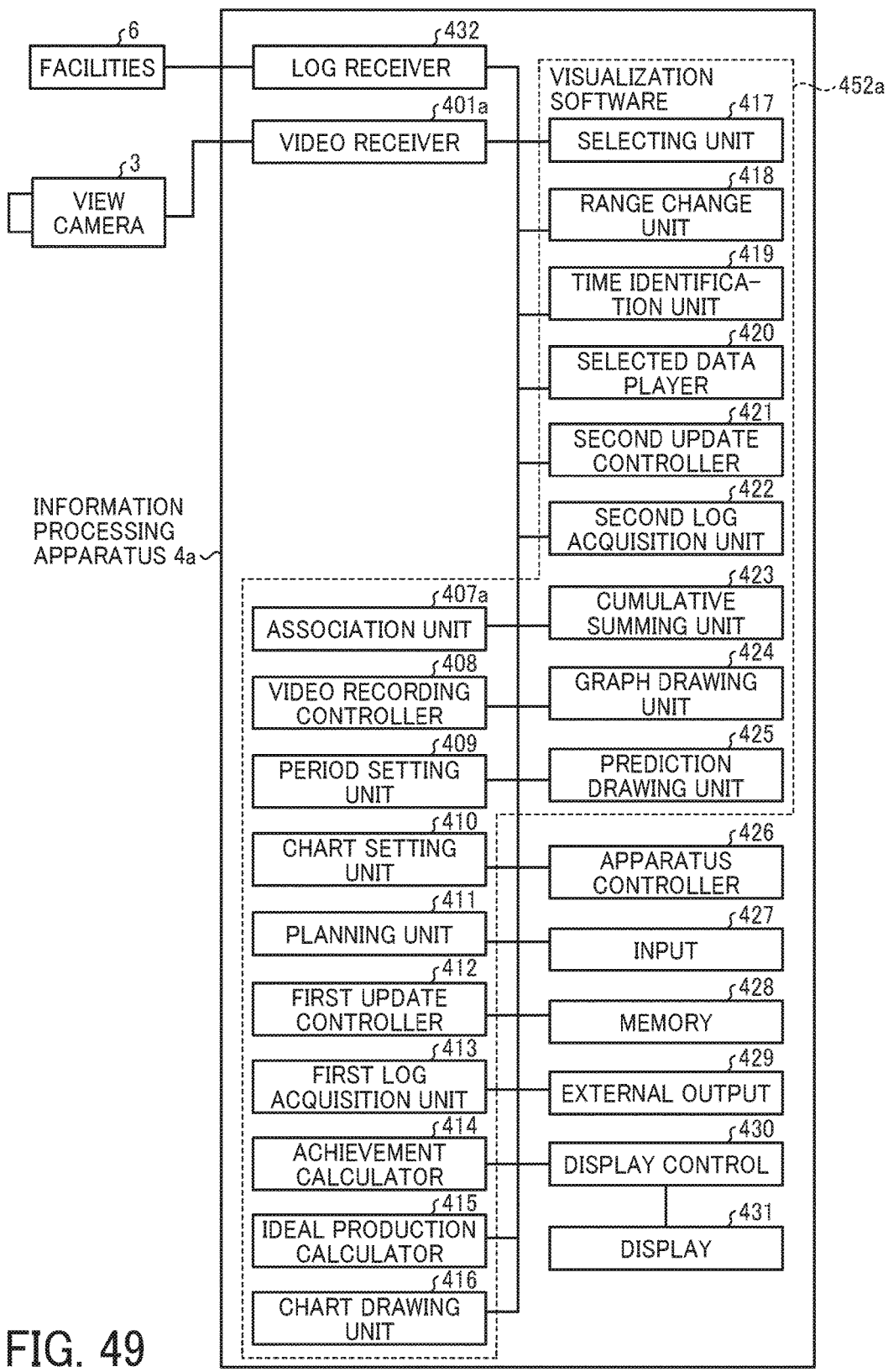
FIG. 49 is a functional block diagram of the information processing apparatus according to Variation 1.

FIG. 49 is a functional block diagram of the information processing apparatus 4a according to Variation 1. A functional configuration of the information processing apparatus 4a will be described referring to FIG. 49.

As illustrated in FIG. 49, the information processing apparatus 4a includes a log receiver 432, a video receiver 401a, an association unit 407a (the third setting unit), the video recording controller 408, the period setting unit 409, the chart setting unit 410, a planning unit 411, the first update controller 412, the first log acquisition unit 413 (the first acquisition unit), the achievement calculator 414 (the achievement calculator), the ideal production calculator 415 (the ideal value calculator), the chart drawing unit 416 (the first drawing unit), the selecting unit 417 (first and second selecting units), the range change unit 418, the time identification unit 419 (the identification unit), the selected data player 420 (a replay unit), the second update controller 421, the second log acquisition unit 422 (the second acquisition unit), the cumulative summing unit 423 (the second calculator), the graph drawing unit 424 (the second drawing unit), the prediction drawing unit 425 (the third drawing unit), the apparatus controller 426, the input 427, the storing unit 428, the external output 429, the display control 430, and the displaying unit 431. Note that, in FIG. 49, the network 5a is not illustrated for simplicity. Note that, of the above-described functional units, the video recording controller 408, the period setting unit 409, the chart setting unit 410, the planning unit 411, the first update controller 412, the first log acquisition unit 413, the achievement calculator 414, the ideal production calculator 415, the chart drawing unit 416, the selecting unit 417, the range change unit 418, the time identification unit 419, the selected data player 420, the second update controller 421, the second log acquisition unit 422, the cumulative summing unit 423, the graph drawing unit 424, the prediction drawing unit 425, the input 427, the storing unit 428, the external output 429, the display control 430, and the displaying unit 431 function similar to those illustrated in FIG. 3.

The log receiver 432 is configured to receive the production log generated by the collection of the logs (time data) of detection of the works in the PLCs 7 of the facilities 6 and store the production log in the storing unit 428. The log receiver 432 is implemented by the external device I/F 111 illustrated in FIG. 2.

The video receiver 401a performs data communication via the network 5a with the view cameras 3 and receives video data from the view cameras 3. The video receiver 401a is implemented by the network I/F 106 illustrated in FIG. 2.

The association unit 407a sets association among the production line, the process name, and the view cameras 3 according to an input from the input 427 operated by the user. Specifically, the association unit 407a establishes associations among the target line name, the log file storage location, the video storage location, the process name, and the view cameras 3 and stores the established association as an association file in the storing unit 428. The association unit 407a is implemented, for example, by a program (e.g., visualization software 452a) executed by the CPU 101 illustrated in FIG. 2.

The apparatus controller 426 controls operation of the information processing apparatus 4a entirely. In particular, the apparatus controller 426 controls operations based on the visualization software 452a. The apparatus controller 426 is implemented, for example, by a program executed by the CPU 101 illustrated in FIG. 2.

Note that, alternatively, a portion or all of the association unit 407a, the video recording controller 408, the period setting unit 409, the chart setting unit 410, the planning unit 411, the first update controller 412, the first log acquisition unit 413, the achievement calculator 414, the ideal production calculator 415, the chart drawing unit 416, the selecting unit 417, the range change unit 418, the time identification unit 419, the selected data player 420, the second update controller 421, the second log acquisition unit 422, the cumulative summing unit 423, the graph drawing unit 424, the prediction drawing unit 425, the apparatus controller 426, and the display control 430 illustrated in FIG. 49 can be implemented by not the program being software but hardware circuitry such as an ASIC or an FPGA.

The functional units illustrated in FIG. 3 conceptually represent functions and not limited to those illustrated in FIG. 49. For example, a plurality of functional units that are independent from each other in FIG. 49 can be integrated into one functional unit. By contrast, a plurality of functions of one functional unit in FIG. 49 can be divided and allocated to a plurality of functional units.

As described above, differently from the above-described embodiment, in the present variation, not the data collecting software 451 but the PLCs 7 of the facilities 6, which are external devices, collect the logs (i.e., generates the production log), and the log receiver 432 of the information processing apparatus 4a uses the production log received from the PLCs 7. In this configuration, similarly, the state of each process of facilities can be visualized regardless of the order of the processes, and the user can instantly know the state of each process regardless of other processes.

Variation 2

Descriptions are given below of an information processing system according to Variation 2, focusing on differences from the above-described information processing system 2. In the above-described embodiment, the color of an image inside the designated detection area is compared with the reference color range to detect a work. In the present variation, descriptions are given below of determination of whether an image matching a reference image has been retrieved in the searching of the designated search area, to detect a work. Note that the general configuration of the information processing system and the hardware configuration of the information processing apparatus according to the present variation are similar to those of the above-described embodiment.

Functional Block Configuration of Information Processing Apparatus

Figure 50:
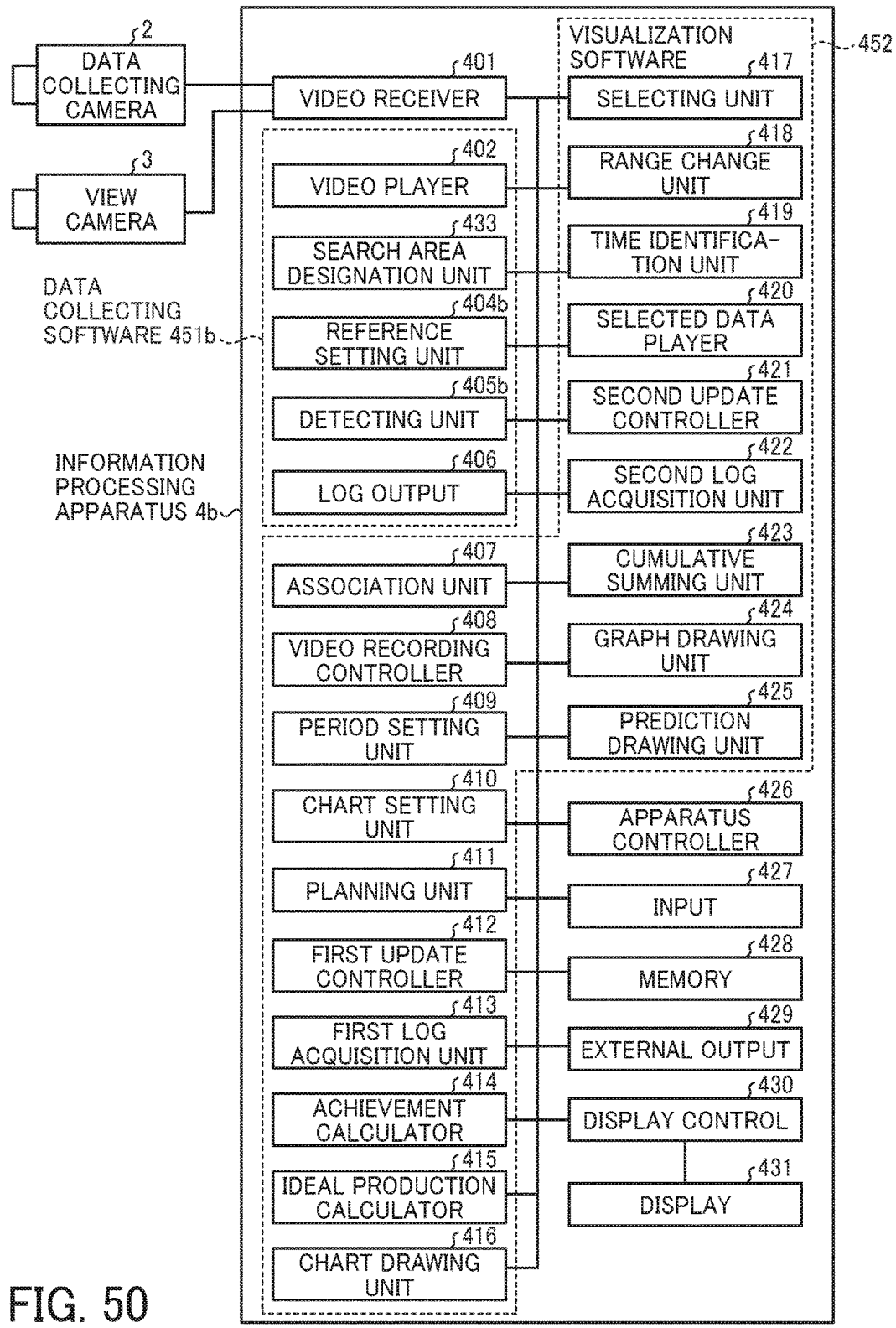
FIG. 50 is a functional block diagram of the information processing apparatus according to Variation 2.

FIG. 50 is a functional block diagram of an information processing apparatus 4b according to Variation 2. A functional configuration of the information processing apparatus 4b according to the present variation will be described referring to FIG. 50.

As illustrated in FIG. 50, the information processing apparatus 4b includes the video receiver 401, the video player 402, a search area designation unit 433 (the first setting unit), a reference setting unit 404b (the second setting unit), a detecting unit 405b, the log output 406 (the output), the association unit 407 (the third setting unit), the video recording controller 408, the period setting unit 409, the chart setting unit 410, the planning unit 411, the first update controller 412, the first log acquisition unit 413 (the first acquisition unit), the achievement calculator 414 (the achievement calculator), the ideal production calculator 415 (the ideal value calculator), the chart drawing unit 416 (the first drawing unit), the selecting unit 417 (first and second selecting units), the range change unit 418, the time identification unit 419 (the identification unit), the selected data player 420 (a replay unit), the second update controller 421, the second log acquisition unit 422 (the second acquisition unit), the cumulative summing unit 423 (the second calculator), the graph drawing unit 424 (the second drawing unit), the prediction drawing unit 425 (the third drawing unit), the apparatus controller 426, the input 427, the storing unit 428, the external output 429, the display control 430, and the displaying unit 431. Note that, of the above-described functional units, the video receiver 401, the video player 402, the log output 406, the video recording controller 408, the period setting unit 409, the chart setting unit 410, the planning unit 411, the first update controller 412, the first log acquisition unit 413, the achievement calculator 414, the ideal production calculator 415, the chart drawing unit 416, the selecting unit 417, the range change unit 418, the time identification unit 419, the selected data player 420, the second update controller 421, the second log acquisition unit 422, the cumulative summing unit 423, the graph drawing unit 424, the prediction drawing unit 425, the input 427, the storing unit 428, the external output 429, the display control 430, and the displaying unit 431 function similar to those illustrated in FIG. 3.

The search area designation unit 433 designates a search area (an example of a target area) according to an input from the input 427 operated by a user. The search area is for detecting a work in an area where the video data is displayed (the video area 501 illustrated in FIG. 4) on the displaying unit 431. The search area designation unit 433 stores, in the storing unit 428, data of the designated search area in association with the data collecting cameras 2, respectively. The data of the search area include, for example, coordinates representing the position of the search area in the display area of the video data and the shape of the search area. The search area designated by the search area designation unit 433 is used in object detection to be described later. The shape of the search area designated by the search area designation unit 433 is not restricted but can be, for example, rectangular, polygonal, circular, or oval. The search area designation unit 433 is implemented, for example, by a program (data collecting software 451b) executed by the CPU 101 illustrated in FIG. 2.

The reference setting unit 404b sets a reference for detecting a work in the search area, according to an input from the input 427 operated by the user. The reference setting unit 404b is implemented, for example, by a program (data collecting software 451b) executed by the CPU 101 illustrated in FIG. 2.

The detecting unit 405b is a functional unit for detecting the work in the search area in the display area of the video data on the displaying unit 431. The detecting unit 405b is implemented, for example, by a program (data collecting software 451b) executed by the CPU 101 illustrated in FIG. 2.

The functional units implemented by the data collecting software 451b executed by the CPU 101 are example measurement units.

The association unit 407 sets association among the production line, the process name, the data collecting camera 2, the search area, and the view camera 3 according to an input from the input 427 operated by the user. The association unit 407 stores, in the storing unit 428, association data as an association file. The association unit 407 is implemented, for example, by a program (e.g., visualization software 452) executed by the CPU 101 illustrated in FIG. 2.

The apparatus controller 426 controls operation of the information processing apparatus 4b entirely. In particular, the apparatus controller 426 controls operations based on the data collecting software 451b and the visualization software 452. The apparatus controller 426 is implemented, for example, by a program executed by the CPU 101 illustrated in FIG. 2.

Note that, alternatively, a portion or all of the video player 402, the search area designation unit 433, the reference setting unit 404b, the detecting unit 405b, the log output 406, the association unit 407, the video recording controller 408, the period setting unit 409, the chart setting unit 410, the planning unit 411, the first update controller 412, the first log acquisition unit 413, the achievement calculator 414, the ideal production calculator 415, the chart drawing unit 416, the selecting unit 417, the range change unit 418, the time identification unit 419, the selected data player 420, the second update controller 421, the second log acquisition unit 422, the cumulative summing unit 423, the graph drawing unit 424, the prediction drawing unit 425, the apparatus controller 426, and the display control 430 illustrated in FIG. 50 can be implemented by not the program being software but hardware circuitry such as an ASIC or an FPGA.

The functional units illustrated in FIG. 3 conceptually represent functions and not limited to those illustrated in FIG. 50. For example, a plurality of functional units that are independent from each other in FIG. 50 can be integrated into one functional unit. By contrast, a plurality of functions of one functional unit in FIG. 50 can be divided and allocated to a plurality of functional units.

Search Area Designation and Reference Image Setting

Figure 51A:
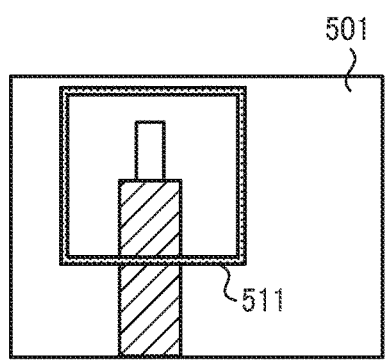
FIGS. 51A and 51B are illustrations for explaining a search area designation and reference image setting according to Variation 2.
Figure 51B:
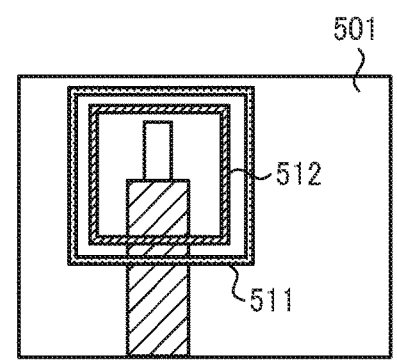

FIGS. 51A and 51B are illustrations for explaining designation of the search area and setting of the reference image. Referring to FIGS. 51A and 51B, descriptions are given below of operation to designate the search area on the video data screen and set the reference image (an example of reference data).

According to an input from the input 427 operated by the user, the apparatus controller 426 executes the data collecting software 451b to display the video data screen 500 illustrated in FIG. 4, on the displaying unit 431. The video data screen 500 provides the video data received from the plurality of data collecting cameras 2 in real time or provides the video data stored in the storing unit 428, thereby presenting a detected state of the work in the search area. As a work is detected in the search area, the identification number (i.e., a work number) and the detected date and time are stored as a log in the production log.

During the playback of the video data in the video area 501, when an image including a search area to be designated is being displayed, the user presses the "Suspend" button with the input 427. Then, the video player 402 suspends the video data played in the video area 501.

Subsequently, in response to a user operation of the input 427 (e.g., dragging the mouse 108), the search area designation unit 433 specifies a search area 511 in the video area 501 as illustrated in FIG. 51A. The search area designation unit 433 stores, in the storing unit 428, data of the designated search area 511 in correlation with the data collecting camera 2 that has captured the video data being displayed in the video area 501. Note that the number of the search areas designated in one video area 501 is not necessarily one but can be two or more.

Further, in response to a user operation of the input 427 (e.g., dragging the mouse 108) on the detection area 510, the reference setting unit 404b sets a reference image area 512 for searching for an identical image inside the search area designated by the search area designation unit 433 as illustrated in FIG. 51B. The reference setting unit 404b stores, in the storing unit 428, the reference image of the reference image area 512 in correlation with the data collecting camera 2 that has imaged the video data being displayed in the video area 501.

The search area and the reference image set as described above are used in detection of the work in the object detection processing.

Object Detection

Figure 52:
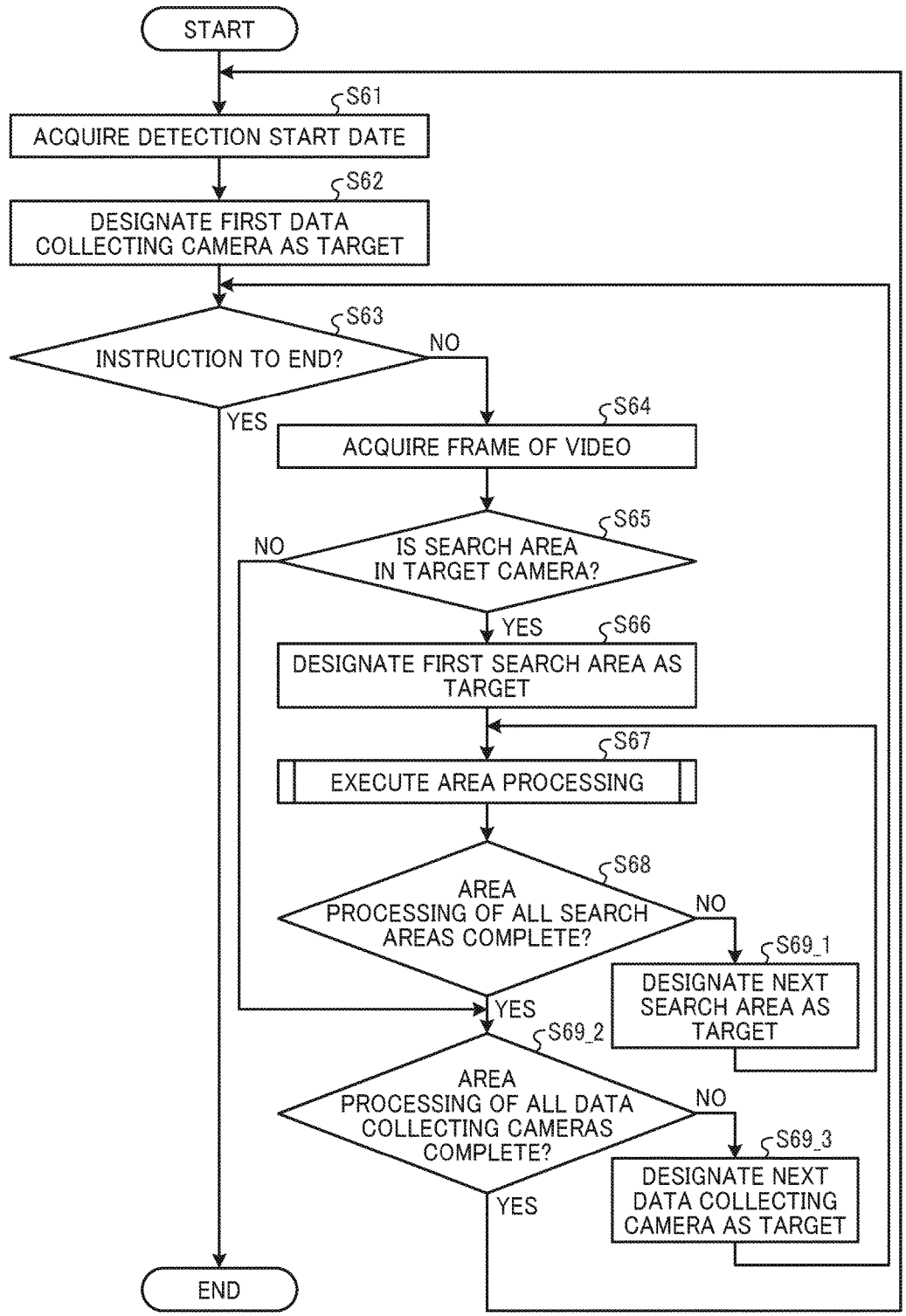
FIG. 52 is a flowchart of an example of object detection processing performed by the information processing apparatus, according to Variation 2.
Figure 53:
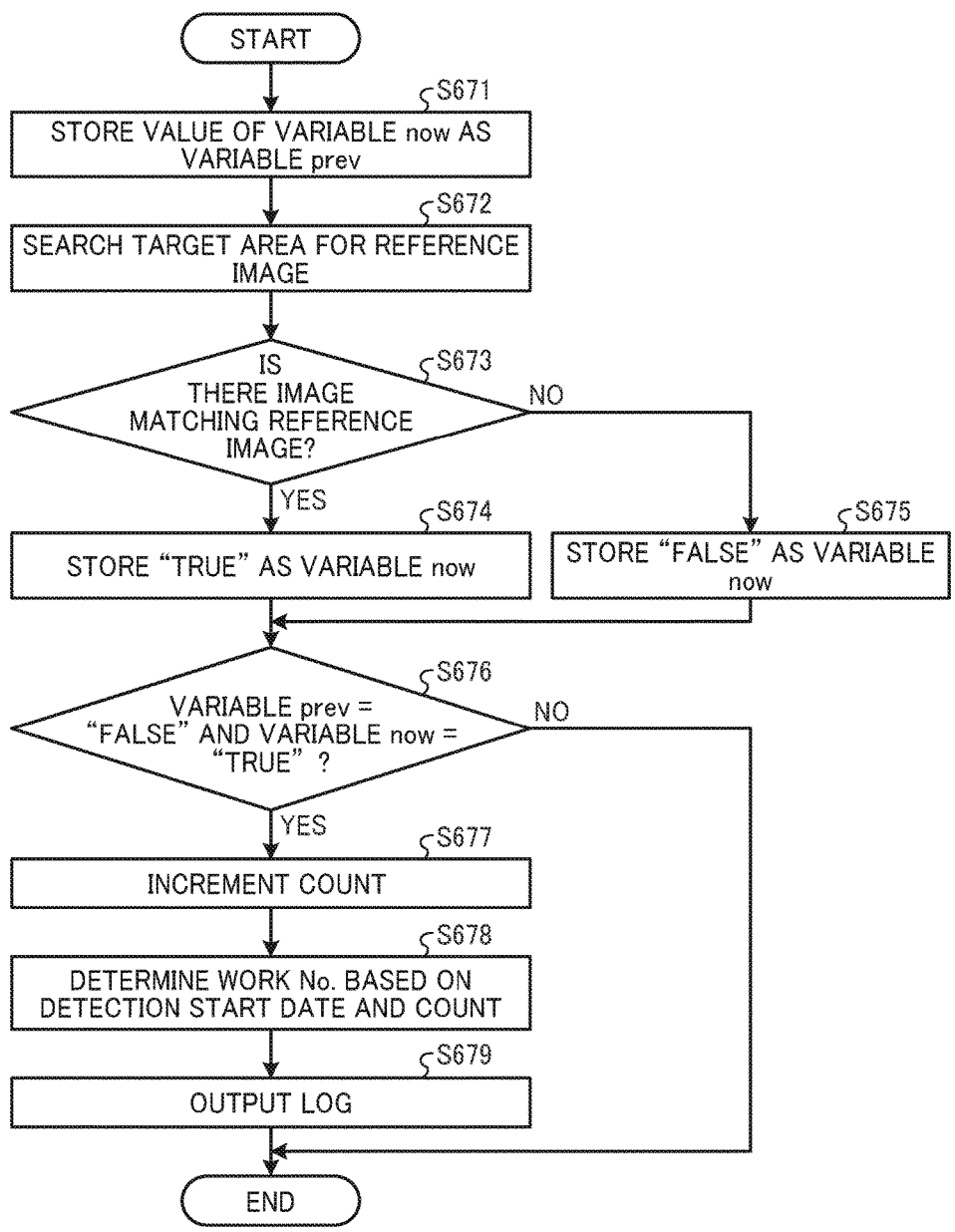
FIG. 53 is a flowchart of an example of area processing of the object detection processing illustrated in FIG. 52.

FIG. 52 is a flowchart of an example of object detection performed by the information processing apparatus 4b, according to Variation 2. FIG. 53 is a flowchart of an example of area processing of the object detection processing illustrated in FIG. 52. FIGS. 54A to 54D illustrate example log output operation. Referring to FIGS. 52 to 54D, descriptions are given below of the object detection processing performed by the information processing apparatus 4b according to Variation 2.

As the work is detected in the search area of the data collecting camera 2 correlated to each process in the association file, a log of detection of the work is recorded in the production log 701 (described above with reference to FIG. 7) generated for each process (e.g., Process 1 in FIG. 7). Specifically, as illustrated in FIG. 7, each time the work is detected, the work number (work No.) and date (and time) are recorded as a log in the production log 701.

Next, descriptions are given below of the object detection processing, with reference to FIG. 52, and the area processing thereof, with reference to FIGS. 53 and 54.

At S61, the detecting unit 405b obtains current date and time as detection start date.

At S62, the detecting unit 405b designates a first data collecting camera 2 (e.g., the data collecting camera 2a) as a target camera.

At S63, the detecting unit 405b determines whether there is an instruction (e.g., an instruction to end by the input 427) to end the object detection processing. When there is the instruction to end (Yes at S63), the object detection processing ends. When there is not the instruction to end (No at S63), the process proceeds to S64.

At S64, the detecting unit 405b obtains a current frame of the video data displayed by the video player 402 in the video area 501, corresponding to the target camera.

At S65, the detecting unit 405b determines whether a search area is designated regarding the video area 501 corresponding to the target camera. When there is a designated search area (Yes at S65), the process proceeds to S66. When there is not a designated search area (No at S65), the process proceeds to S69_2.

At S66, the detecting unit 405b designates, as a target search area, a first one of one or more search areas set in the video area 501 corresponding to the target camera. Then, the process proceeds to S67.

At S67, the detecting unit 405b executes the area processing presented as S671 to S679 in FIG. 53.

At S671, the detecting unit 405b stores a value of a variable now as a variable prev. Then, the process proceeds to S672.

At S672, the detecting unit 405b searches the target search area for the reference image. Then, the process proceeds to S673.

At S673, the detecting unit 405b determines whether or not the target search area includes an image matching the reference image. For example, whether or not the target search area includes an image matching the reference image can be determined using a method of threshold determination on similarity calculated by template matching using, for example, the sum of absolute differences (SAD) or the sum of squared differences (SSD). When the target search area includes an image matching the reference image (Yes at S673), the process proceeds to S674. When the target search area does not include an image matching the reference image (No at S673), the process proceeds to S675.

At S674, the detecting unit 405b stores a value "True" as the variable now. Then, the process proceeds to S676.

At S675, the detecting unit 405b stores a value "False" as the variable now. Then, the process proceeds to S676.

Figure 54A:
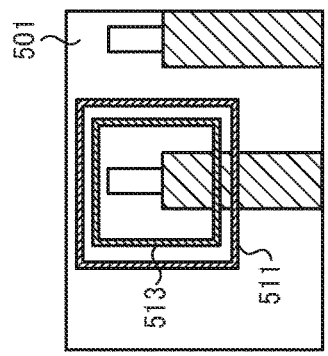
FIGS. 54A to 54D illustrate example log output operation.

At S676, the detecting unit 405b performs determination of the value of the variable prev and the value of the variable now. When the variable prev is "False" and the variable now is "True" (Yes at S676), the process proceeds to S677. By contrast, when the variable prev is "True" or the variable now is "False" (No at S676), the detecting unit 405b determines that the work (an example object) is not being detected as illustrated in FIGS. 54A and 54C and ends the area processing. Then, the process proceeds to S68.

Figure 54B:
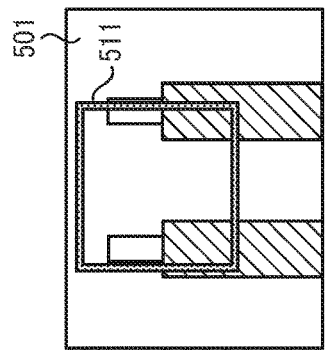
Figure 54C:
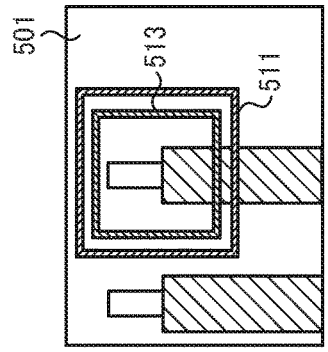
Figure 54D:
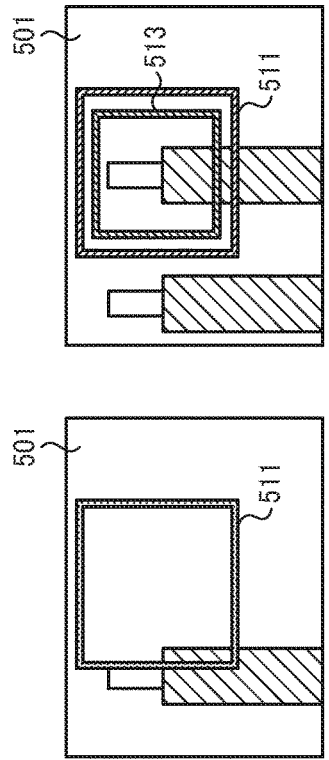

At S677, when the variable prev is "False" and the variable now is "True" (Yes at S676), the detecting unit 405b determines that the work (the object) has been detected as illustrated in FIGS. 54B and 54D. In this case, as illustrated in FIGS. 54B and 54D, the detecting unit 405b displays a match area 513 indicating the matching image in the search area 511. Then, the log output 406 increments a count (a variable inside the software) corresponding to the target camera (or the target search area). Then, the process proceeds to S678.

At S678, the log output 406 determines the work number based on the detection start date obtained at S61 and the incremented count. For example, in the example illustrated in FIG. 54D, the incremented count is "2", the detection start date is "2017/1/1 0:01", and determined work number is "201701010000002". Then, the process proceeds to S679.

At S679, the log output 406 stores the determined work number and the date as a log in a production log 703, as illustrated in FIGS. 54B and 54D. In FIGS. 54A to 54D, the process corresponding to the target camera is presented as "Process 1". Then, the area processing ends, and the process proceeds to S68.

Referring back to FIG. 52, at S68, the detecting unit 405b determines whether or not the area processing of all search areas corresponding to the target camera has completed. When the area processing is complete regarding all search areas (Yes at S68), the process proceeds to S69_2. When there is a search area regarding which the area processing is not complete (No at S68), the process proceeds to S69_1.

At S69_1, the detecting unit 405b designates, as the target search area, a next one of one or more search areas set in the video area 501 corresponding to the target camera. Then, the process returns to S67.

At S69_2, the detecting unit 405b determines whether or not the area processing has completed regarding all the data collecting cameras 2. When processing of all the data collecting cameras 2 has completed (Yes at S69_2), the process returns to S61 and repeats the object detection processing. By contrast, when the processing is not completed regarding at least one of the data collecting cameras 2 (No at S69_2), the process proceeds to S69_3.

At S69_3, the detecting unit 405b designates a next one of the data collecting cameras 2 (e.g., the data collecting camera 2b) as the target camera. Then, the process returns to S63.

Through steps S61 to S69_3, the object detection processing is repeatedly performed.

As described above, in the present variation, as the detecting unit 405b determines whether or not the designated search area includes an image matching the reference image, the work can be detected, and the production log can be generated. Then, the logs of each process are acquired from the above-described production log (e.g., the production log 703 illustrated in FIGS. 54A to 54D) through the log acquisition, and the achievement value in each process is calculated in the achievement calculation. Further, the ideal amount used as a reference to be compared with the achievement value is calculated in the ideal production calculation. Further, a chart (e.g., a heat map) is generated in the chart drawing for each process, based on the comparison between the achievement value and the reference, and the visual representation of the result of comparison is different according to the result of comparison. With such processing, regardless of the order of processes of the facilities, the state of each process can be visualized, and the user can instantly know the state of each process regardless of other processes.

Variation 3

Descriptions are given below of an information processing system according to Variation 3, focusing on differences from the above-described information processing system 1. In the above-described embodiment, descriptions are given of drawing a heat map indicating, with color difference, differences of the production from the ideal production per process and the production per unit time, thereby visualizing a state of production of each process of production facilities. In the present variation, descriptions are given of types of information represented by a heat map. Note that the general configuration of the information processing system and the hardware configuration and the functional block of the information processing apparatus according to the present variation are similar to those of the above-described embodiment.

Figure 55:
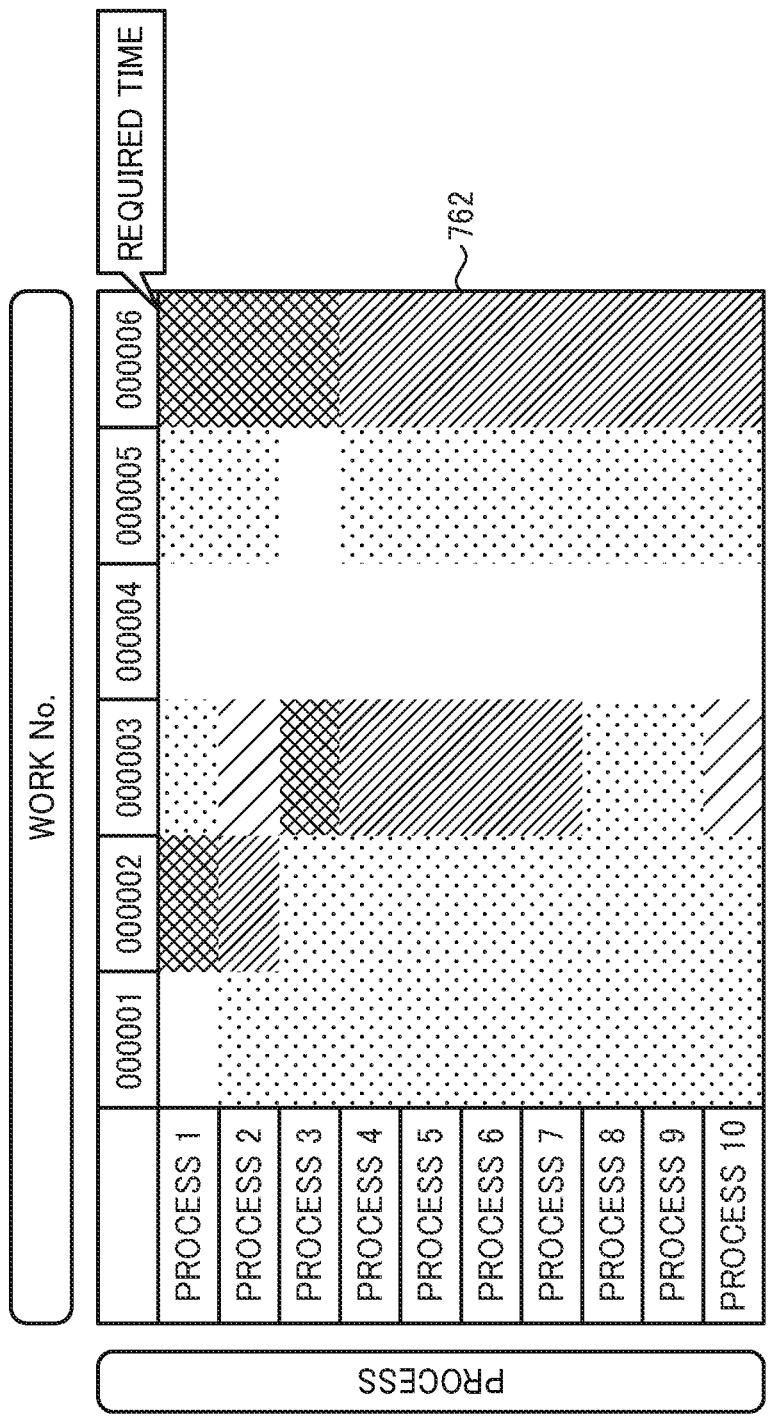
FIG. 55 illustrates an example heat map type according to Variation 3.

FIG. 55 illustrates an example heat map type according to Variation 3. The chart drawing unit 416 of the information processing apparatus 4 can color a cell corresponding to a process and a work number, with a color corresponding to the difference between an ideal required time and the time actually taken for the production (one example of state of object in process), to create, for example, a heat map 762 illustrated in FIG. 55. In this case, the achievement calculator 414 is configured to calculate, as the achievement value, the time required for each process of a work denoted by each work number, based on the log acquired by the first log acquisition unit 413. Additionally, the ideal production calculator 415 is configured to calculate an ideal required time for each process according to a predetermined method.

Although, in the above-described embodiment, the production amount is calculated for each process and each unit time as in the achievement table 730 illustrated in FIGS. 29A and 29B and the like, what is calculated is not limited thereto. For example, what is calculated is the number of occurrence of trouble per process and per unit time (one example count number and one example of state of object in process), operating time of facilities (one example count number and one example of state of object in process), the number of conforming products (one example count number and one example of state of object in process), or the number of non-conforming products (one example count number and one example of state of object in process). In this case, the ideal production calculator 415 is configured to calculate an ideal value of such an achievement value.

For example, to draw a heat map of the number of occurrence of trouble (i.e., error) per process and per unit time, the log output 406 outputs a log indicating the occurrence of error according to an error signal indicating the trouble transmitted from the PLC or the like of the facilities. Alternatively, to draw a heat map of the operating time of facilities per process and per unit time, for example, a signal tower or the like of the facilities corresponding to that process is captured with a camera, to detect turning on of the signal tower. Then, the log output 406 measures the time during which the signal tower is on and outputs the measured time as a log. Yet alternatively, to draw a heat map of the number of conforming products or non-conforming products per process and per unit time, for example an inspection machine to inspect a condition of a work in that process or a PLC of the facilities corresponding to that process outputs a signal indicating a conforming product or non-conforming product or each work, and the log output 406 outputs a log indicating whether the work is conforming or non-conforming as a log according to the signal. Note that, instead of using logs indicating the number of occurrence of trouble, the operating time of facilities, or the number of conforming products or non-conforming products, for example, such information (e.g., time data) can be directly received from the PLC or the like.

Figure 56:
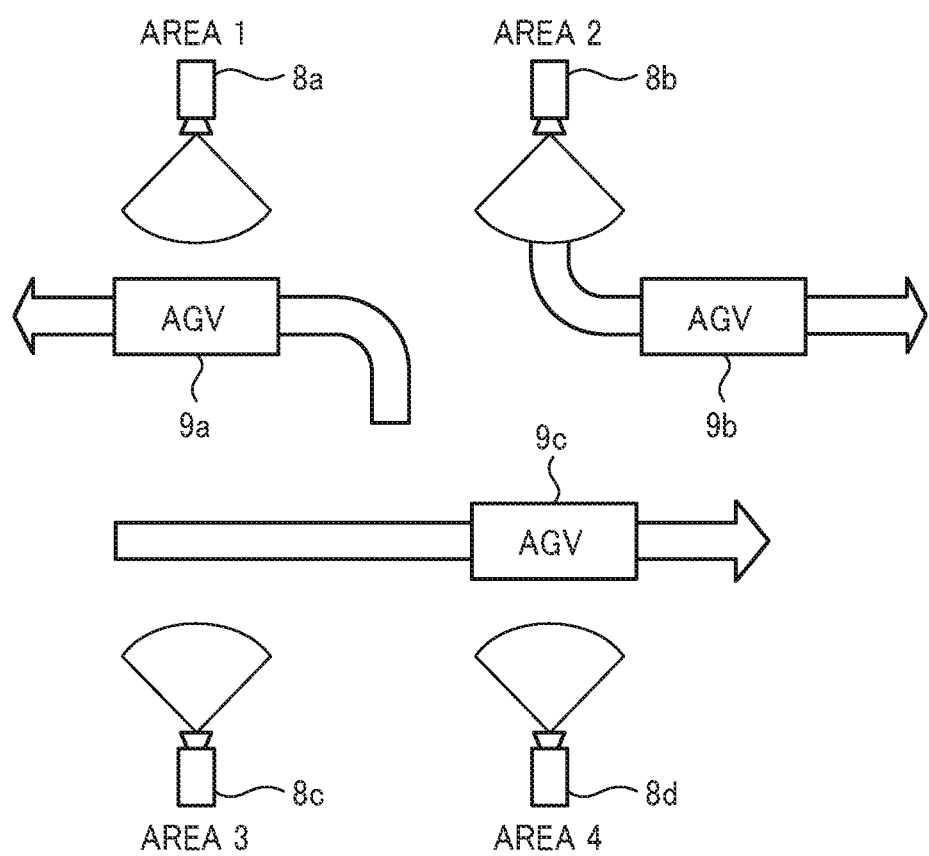
FIG. 56 illustrates an example of an AGV route.

Next, descriptions are given below of drawing a heat map regarding stagnant time of automated guided vehicles or AGVs (unattended vehicles) that run in a factory equipped with production facilities. FIG. 56 illustrates an example of AGV routes. FIG. 57 is an example heat map type according to Variation 3. FIG. 58 is another example heat map type according to Variation 3. An AGV is a cart that conveys works, for example, between processes, that is, from production facilities to perform a given process to production facilities to perform the subsequent process. The conveying can be regarded as one process.

As illustrated in FIG. 56, a data collecting camera 8*a* captures "area 1", in particular, an AGV 9*a* running in the area 1 to detect a state of running thereof. A data collecting camera 8*b* captures "area 2", in particular, an AGV 9*b* running in the area 2 to detect a state of running thereof. A data collecting camera 8*c* captures "area 3", in particular, an AGV 9*c* running in the area 3 to detect a state of running thereof. A data collecting camera 8*d* captures "area 4", in particular, the AGV 9*c* running in the area 4 to detect a state of running thereof. Thus, in this example, running of the AGV in and between areas of the facilities is regarded as processes, and the data collecting cameras 8*a* to 8*d* (an example imaging device) capture the state of the process. For the data collecting cameras 8*a* to 8*d*, cameras capable of data communication via the network 5 with the information processing apparatus 4 as illustrated in FIG. 1 will suffice. Note that the data collecting cameras 8*a* to 8*d* are simply referred to as "data collecting cameras 8) when collectively referred to, or discrimination is not necessary. Although four data collecting cameras 8 are illustrated in FIG. 56, the number of the data collecting cameras 8 is not limited thereto. The AGVs 9*a* to 9*c* are simply referred to as "AGVs 9" or "carts" when collectively referred to, or discrimination is not necessary.

The detecting unit 405 detects the AGV 9 (a cart) from the video captured by the data collecting camera 8 and identifies the AGV 9, that is, determines the identification number of the cart. To determine the identification number of the cart, for example, a plate bearing a numeral is put on an upper face of the cart, and the numeral on the plate is identified by image processing.

For example, the log output 406 measures the time during which the detecting unit 405 detects the cart and output, to a log, a stagnant time (an example of state of object in process) for each cart number.

The association unit 407 sets association among the area name being a process name, the data collecting camera 8, and a view camera, and stores, in the storing unit 428, data of the associations as an association file. Typically, use of the data collecting camera 8 as the view camera is conceivable.

The chart drawing unit 416 determines the color based on the difference from the stagnant time for each area and each cart number to draw, for example, a heat map 763 illustrated in FIG. 57.

With such processing, regardless of the order of processes of the facilities, the state of each process (stagnant of the cart) can be visualized, and the user can instantly know the state of each process (stagnant of the cart) regardless of other processes.

Although the heat map 763 illustrated in FIG. 57 indicates information on the stagnant time for each area and each cart number with color, the manner of indication is not limited thereto. Alternatively, for example, as in a heat map 764 illustrated in FIG. 58, each area on the floor on which the facilities are disposed are specified by an x-coordinate and a y-coordinate, and the state of stagnant of a cart in each area can be represented by color.

Variation 4

Descriptions are given below of an information processing system according to Variation 4, focusing on differences from the above-described information processing system 1. In the above-described embodiment, the prediction drawing processing involves drawing of the plan graph, the achievement graph, and the prediction graph. In the present variation, further, a width of prediction (prediction range) is drawn. Note that the general configuration of the information processing system and the hardware configuration and the functional block of the information processing apparatus according to the present variation are similar to those of the above-described embodiment.

Prediction Drawing Processing

Figure 59A:
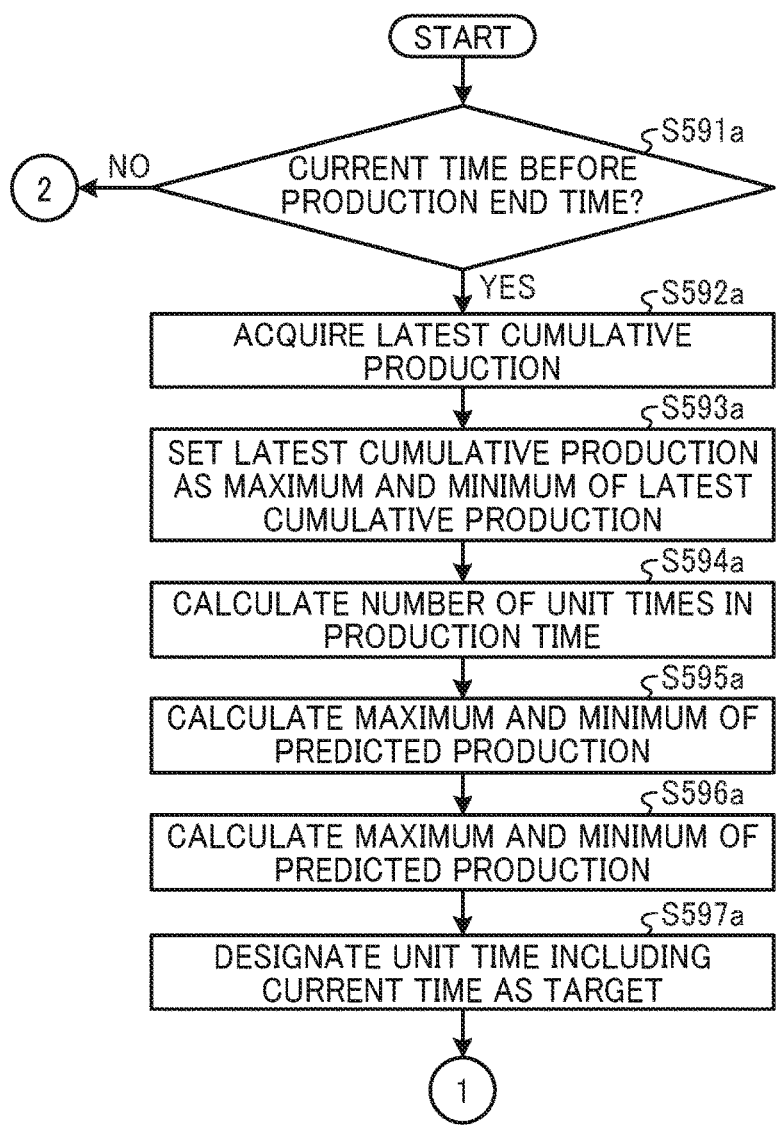
FIGS. 59A and 59B are flowcharts of an example of prediction drawing executed in predicted achievement updating according to Variation 4.
Figure 59B:
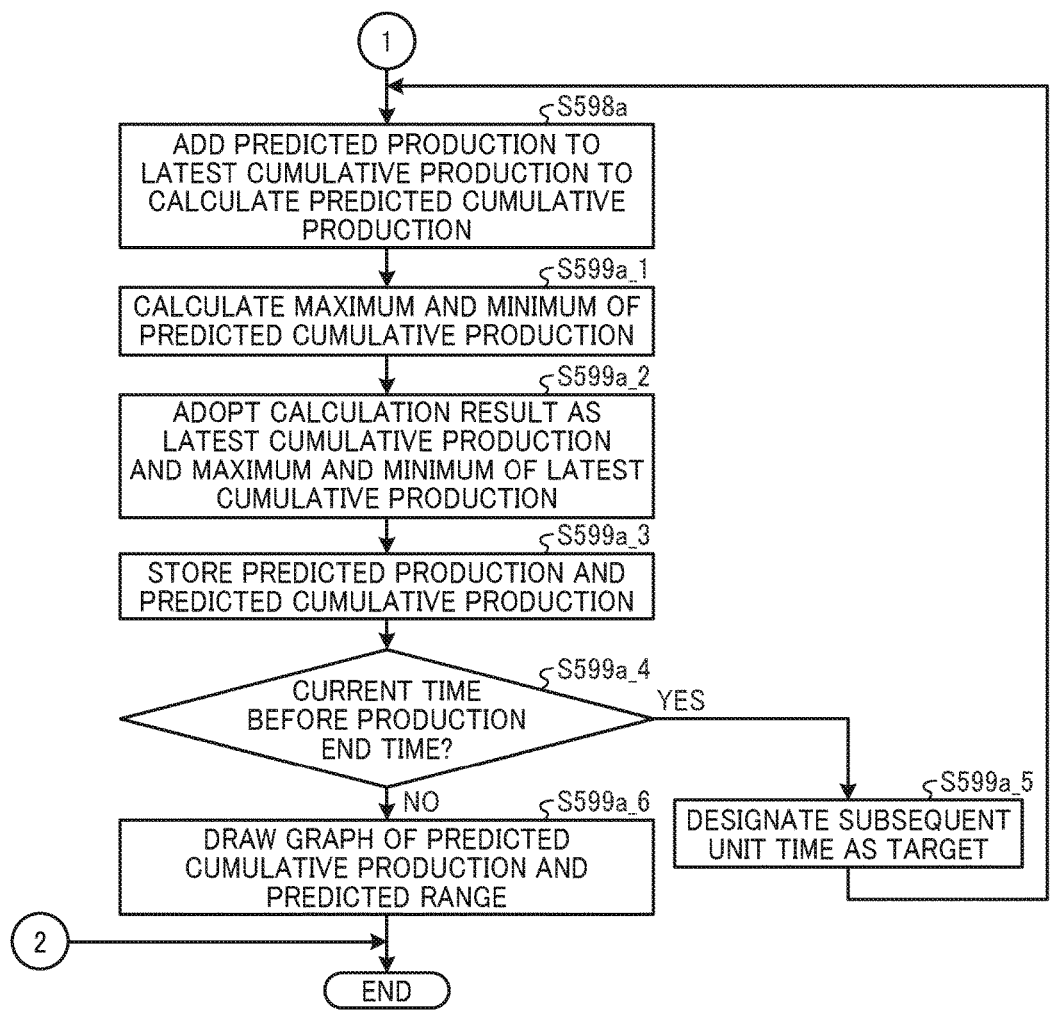
Figure 60:
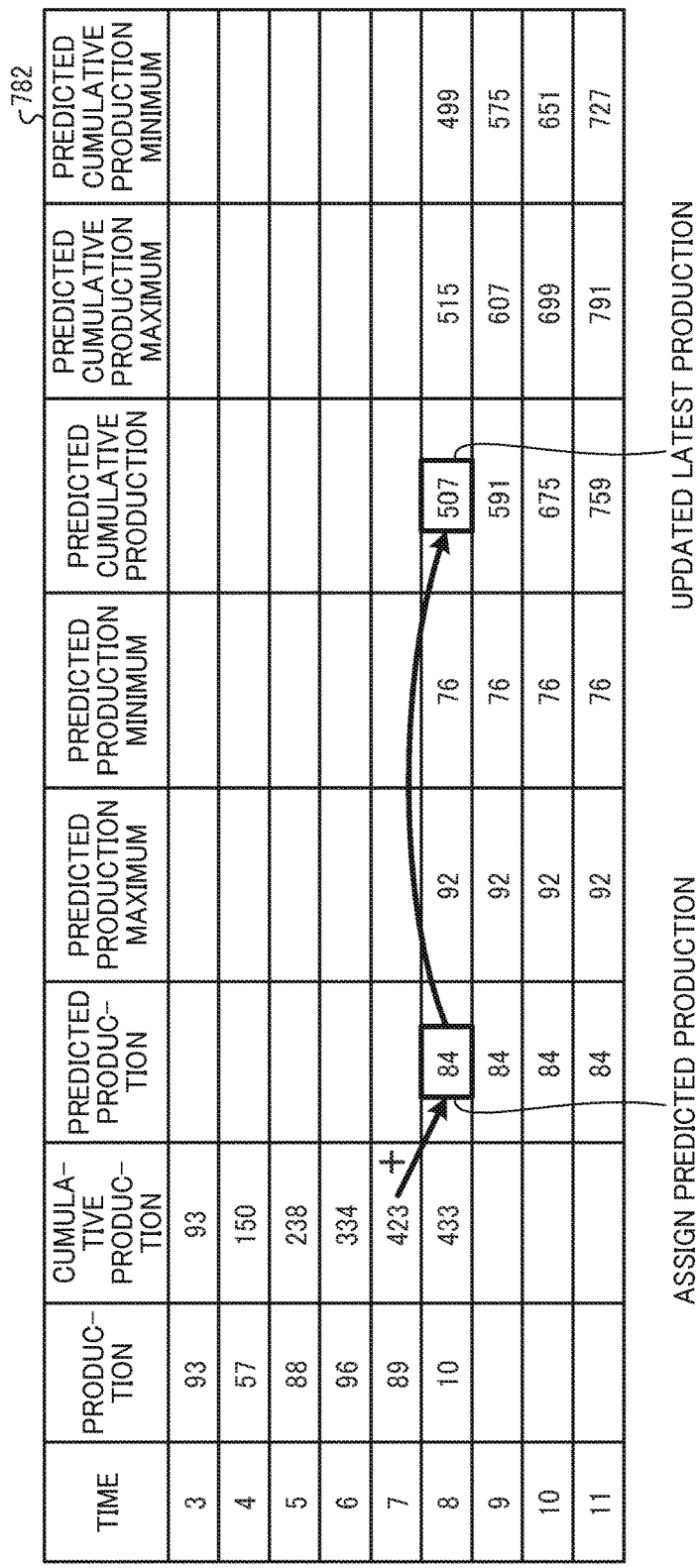
FIG. 60 illustrates an example prediction table.
Figure 61:
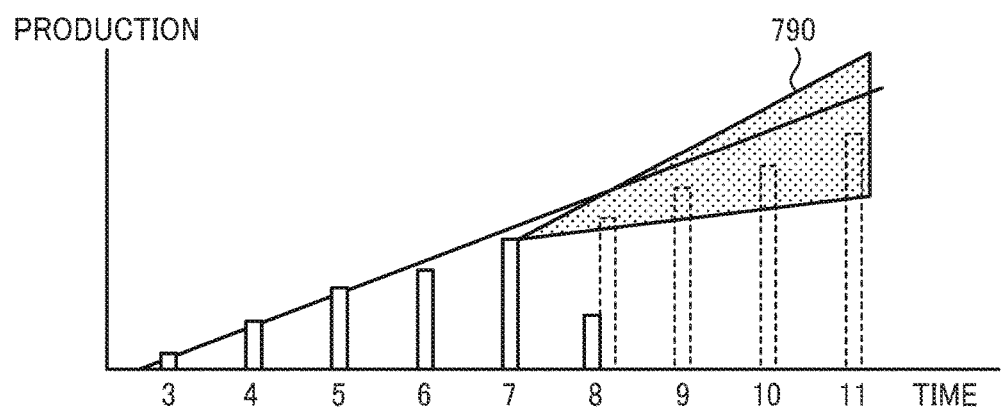
FIG. 61 is a chart for drawing a prediction graph and a prediction range added to a plan graph and an achievement graph, according to an embodiment.

FIGS. 59A and 59B are flowcharts of an example of prediction drawing executed in the predicted achievement updating according to Variation 4. FIG. 60 illustrates an example prediction table. FIG. 61 is a chart for drawing a prediction graph and a prediction range added to a plan graph and an achievement graph, according to an embodiment.

Referring to FIGS. 59A to 61, descriptions are given below of the prediction drawing in the predicted achievement updating performed by the information processing apparatus 4 according to the present variation. Note that the specified process log acquisition, the cumulative production calculation, and the plan and achievement drawing performed in the predicted achievement updating are similar to those of the above-described embodiment.

At S591a, the prediction drawing unit 425 determines whether or not the current time is before the production end time. For example, the production end time is 11 o'clock. When the current time is before the production end time (Yes at S591a), the process proceeds to S592a. When the current time has reached the production end time (No at S591a), the prediction drawing completes.

At S592a, the prediction drawing unit 425 acquires the latest cumulative production from the cumulative production table (e.g., the cumulative production table 780 illustrated in FIG. 45) created by the cumulative summing unit 423. Specifically, in the cumulative production table 780 illustrated in FIG. 45, since the current time is between 8 o'clock and 9 o'clock, the prediction drawing unit 425 acquires the cumulative production "423" between 7 o'clock and 8 o'clock as the latest cumulative production.

At S593a, the prediction drawing unit 425 sets the acquired latest cumulative production as each of a maximum and a minimum of the latest cumulative production.

At S594a, the prediction drawing unit 425 calculates the number of unit times from the production start time to the time corresponding to the latest cumulative production in the cumulative production table. In the cumulative production table 780 illustrated in FIG. 45, the prediction drawing unit 425 calculates the number of unit times "5" from the production start time "3 o'clock" to "7 o'clock" corresponding to the latest cumulative production. Then, the process proceeds to S595a.

At S595a, the prediction drawing unit 425 divides the acquired latest cumulative production by the calculated number of unit times to calculate a predicted production. In the example illustrated in FIG. 60, the predicted production is "84".

At S596a, it is assumed that the calculated predicted production includes plus and minus errors of a predetermined rate. That is, the prediction drawing unit 425 increases the calculated predicted production by the plus error to calculate a maximum of the predicted production (example of predicted maximum count). Further, the prediction drawing unit 425 reduces the calculated predicted production by the minus error to calculate a minimum of the predicted production (example of predicted minimum count). For example, when the predetermined rate is 10%, in the example illustrated in FIG. 60, the prediction drawing unit 425 increases the calculated predicted production "84" by 10% to calculate the maximum of the predicted production "92", and reduces "84" by 10% to calculate the minimum of the predicted production "76". Then, the process proceeds to S579a.

At S597a, the prediction drawing unit 425 designates the unit time including the current time as the target time. In the cumulative production table 780 illustrated in FIG. 45, since the current time is between 8 o'clock and 9 o'clock, the prediction drawing unit 425 designates the unit time starting at 8 o'clock as the target time.

At S598a, the prediction drawing unit 425 adds together the latest cumulative production and the calculated predicted production to calculate a predicted cumulative production.

At S599a_1, the prediction drawing unit 425 adds together the maximum of the latest cumulative production and the calculated maximum of the predicted production to calculate a maximum of the predicted cumulative production. Additionally, the prediction drawing unit 425 adds together the minimum of the latest cumulative production and the calculated minimum of the predicted production to calculate a minimum of the predicted cumulative production.

At S599a_2, the prediction drawing unit 425 adopts the predicted cumulative production calculated at S598a as an updated latest cumulative production. Additionally, the prediction drawing unit 425 sets the maximum and the minimum of the predicted cumulative production calculated at S599a_1, as a renewed maximum and a renewed minimum of the latest cumulative production, respectively.

At S599a_3, the prediction drawing unit 425 adds the predicted production, the maximum and the minimum of the predicted production (respectively "84", "92", and "76" in FIG. 60), the predicted cumulative production calculated, and the maximum and the minimum of the predicted cumulative production calculated (respectively "507", "515", and "499" in FIG. 60) to the cumulative production table 780 illustrated in FIG. 45. That is, the prediction drawing unit 425 stores these values on the line corresponding to the target time in the prediction table 782 illustrated in FIG. 60.

At S599a_4, the prediction drawing unit 425 determines whether or not the target time is before the production end time. When the target time is before the production end time (Yes at S599a_4), the process proceeds to S599a_5. When the current time has reached the production end time (No at S599a_4), the process proceeds to S599a_6.

At S599a_5, the prediction drawing unit 425 designates, as the target time, the subsequent unit time. Then, the process returns to S598a.

At S599a_6, the prediction drawing unit 425 draws a prediction graph (the bar chart in FIG. 61) representing the predicted cumulative production stored in the prediction table 782 together with the plan graph and the achievement graph in the image area 617. Further, the prediction drawing unit 425 extends, from the top of the achievement graph (the bar chart) representing the latest cumulative production acquired at S592a, a line representing the maximum of the predicted cumulative production and a line representing the minimum of the predicted cumulative production of the prediction table 782. Then, the prediction drawing unit 425 draws a line segment connecting the distal ends of the two lines as a prediction range 790 in the image area 617, as well as other graphs. The prediction range 790 represents the width of cumulative production predicted from the current cumulative production. Then, the prediction drawing completes.

Since the prediction range including a prediction error is drawn together with the prediction graph as described above, the user can recognize the prediction range of the cumulative production. Further, the user can compare the prediction graph with the plan graph to determine increases and decreases in the production speed.

Note that, in a case where at least a portion of the functional units of the information processing apparatus according to any of the embodiment and the variations described above is implemented by execution of a computer program, the program can be prestored in a ROM or the like.

Alternatively, the computer program executed in the information processing apparatus according to any of the embodiment and the variations described above can be provided as a file being in an installable format or an executable format and stored in a computer-readable recording medium, such as a compact disc read only memory (CD-ROM), a flexible disk (FD), a compact disc recordable (CD-R), and a digital versatile disk (DVD).

Further, the program executed in the information processing apparatus according to any of the embodiment and the variations described above can be stored in a computer connected to a network such as the Internet, to be downloaded via the network.

Further, the program executed in the in the information processing apparatus according to any of the embodiment and the variations described above can be provided or distributed via a network such as the Internet.

The program executed in the in the information processing apparatus according to any of the embodiment and the variations described above is in the form of module including at least a portion of the above-described functional units. As actual hardware, when the CPU (a processor) reads out the program from the ROM and executes the program, the above-described functional units are loaded and implemented (generated) on the main memory.

Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. An information processing apparatus comprising circuitry configured to:
    acquire time data relating to a state of an object in each process of an operation performed on the object, the operation including at least one process;
    calculate an achievement value indicating a state of each process, based on the time data acquired;
    compare the achievement value of each process with a reference value; and
    generate a chart that visually represents a result of comparison for each process, the visual representation of the result of comparison being different according to the result of comparison.

2. The information processing apparatus according to claim 1, wherein the circuitry is configured to:
    acquire, as the time data, a log of detection of the object;
    calculate, as the achievement value, a count number of the object per unit time from the log;
    compare the count number corresponding to each process and each unit time with the reference value; and
    generate the chart visually representing the result of comparison per process and per unit time.

3. The information processing apparatus according to claim 2, wherein the circuitry is further configured to:
    select, according to an input by a user via an input device, a second setting of the unit time different from a first setting of the unit time being reflected on the chart;
    calculate, as the achievement value, a count number of the object in the unit time according to the second setting, from the log;
    compare the count number corresponding to each process and each unit time according to the second setting with the reference value; and
    regenerate the chart visually representing the result of comparison per process and per unit time according to the second setting.

4. The information processing apparatus according to claim 2, wherein the circuitry is configured to:
    calculate an ideal count number, as the reference value, based on the count number corresponding to each process and each unit time;
    compare the count number corresponding to each process and each unit time with the ideal count number; and
    generate the chart visually representing the result of comparison per process and per unit time.

5. The information processing apparatus according to claim 2, wherein the circuitry is further configured to:
    compare a frame of a video captured by an imaging device with reference data to detect the object; and
    generate the log as the time data in response to detection of the log including at least a time of detection of the object.

6. The information processing apparatus according to claim 5, wherein the circuitry is further configured to:
    set a target area for detecting the object on the frame of the video captured by the imaging device;
    set a reference color range as the reference data to be compared with a color of an image in the target area; and
    detect the object when the color of the image in the target area is within the reference color range.

7. The information processing apparatus according to claim 5, wherein the circuitry is further configured to:
    set a target area for detecting the object on the frame of the video captured by the imaging device;

set a reference image as the reference data to be compared with a color of an image in the target area; and detect the object when an image matching the reference image is retrieved in searching of the target area.

8. The information processing apparatus according to claim 5, further comprising an input device to be operated by a user;

wherein the circuitry is further configured to:

select, on the chart, a partial chart corresponding to one of the at least one process and one of unit times according to an input to the input device; and play a video corresponding to the unit time on the partial chart, the video captured by the imaging device.

9. The information processing apparatus according to claim 8, wherein the circuitry is further configured to:

identify, based on the time data being logs of detection of the object, a time interval satisfying a predetermined condition in the unit time on the partial chart, the time interval between adjacent two logs;

identify a time specified by the log corresponding to the time interval identified; and play the video corresponding to the unit time of the partial chart, from the identified time.

10. The information processing apparatus according to claim 8, wherein the circuitry is further configured to:

identify, based on the time data being logs of detection of the object, a time specified by a first one of the logs in the unit time on the partial chart; and play the video corresponding to the unit time of the partial chart, from the identified time.

11. The information processing apparatus according to claim 8, wherein the circuitry is further configured to set associations among, at least, the process, a first imaging device to capture the video used for detecting the object, and a second imaging device to generate the video to be played.

12. The information processing apparatus according to claim 2, wherein the circuitry is configured to:

acquire, as the time data, a log of detection of the object in a specified process of the at least one process;

calculate a cumulative count number per unit time of the object from the log acquired;

draw, as an achievement graph, the cumulative count number per unit;

divide the cumulative count number by a number of unit times up to the unit time corresponding to the cumulative count number to calculate a predicted count number;

add the predicted count number to the cumulative count number to calculate a predicted cumulative count number; and draw the predicted cumulative count number as a prediction graph.

13. The information processing apparatus according to claim 12, wherein the circuitry is further configured to:

increase the predicted count number by a predetermined rate to calculate a predicted maximum count;

reduce the predicted count number by the predetermined rate to calculate a predicted minimum count; and generate a predicted range of the cumulative count number based on the predicted cumulative count number, the predicted maximum count, and the predicted minimum count, wherein predicted range is superimposed on the prediction graph.

14. The information processing apparatus according to claim 1, wherein the circuitry is configured to acquire the time data transmitted from a facility performing the operation on the object.

15. The information processing apparatus according to claim 1, wherein the circuitry is configured to generate, as the chart, a heat map colored differently for each process and for each unit time according to the result of comparison.

16. A method of processing information, the method comprising:

acquiring time data relating to a state of an object in each process of an operation including at least one process;

calculating an achievement value indicating a state of each process, based on the time data acquired; and comparing the achievement value of each process with a reference value; and generating a chart that visually represents a result of comparison for each process, the visual representation of the result of comparison being different according to the result of comparison.

17. A non-transitory recording medium storing a plurality of program codes which, when executed by one or more processors, cause the processors to perform a method comprising:

acquiring time data relating to a state of an object in each process of an operation including at least one process;

calculating an achievement value indicating a state of each process, based on the time data acquired; and comparing the achievement value of each process with a reference value; and generating a chart that visually represents a result of comparison for each process, the visual representation of the result of comparison being different according to the result of comparison.

* * * * *